US012774633B2

(12) United States Patent
Johnsen et al.

(10) Patent No.: US 12,774,633 B2
(45) Date of Patent: Oct. 27, 2026

(54) DISPENSER COMPRISING ONE OR MORE PROTRUDING MEMBERS EXTENDING INTO SPACER STORAGE COMPARTMENT

(71) Applicant: VKR Holding A/S, Hørsholm (DK)

(72) Inventors: Simon Johnsen, Hørsholm (DK); Henrik Aslak Jensen, Hørsholm (DK)

(73) Assignee: VKR HOLDING A/S, Hørsholm (DK)

( * ) Notice: Subject to any disclaimer, the term of this patent is extended or adjusted under 35 U.S.C. 154(b) by 110 days.

(21) Appl. No.: 18/978,053

(22) Filed: Dec. 12, 2024

(65) Prior Publication Data

US 2025/0188794 A1 Jun. 12, 2025

(30) Foreign Application Priority Data

Dec. 12, 2023 (EP) .................................... 23215760

(51) Int. Cl.

| | |
|---|---|
| ***E06B 3/673*** | (2006.01) |
| ***C03C 27/10*** | (2006.01) |
| ***E06B 3/66*** | (2006.01) |
| ***E06B 3/663*** | (2006.01) |

(52) U.S. Cl.

CPC .......... *E06B 3/67326* (2013.01); *C03C 27/10* (2013.01); *E06B 3/6612* (2013.01); *E06B 3/66304* (2013.01)

(58) Field of Classification Search

CPC .. E06B 3/67326; E06B 3/66304; C03C 27/10
See application file for complete search history.

(56) References Cited

FOREIGN PATENT DOCUMENTS

EP 4357576 A1 * 4/2024 ........... E06B 3/6612

* cited by examiner

*Primary Examiner* — Daniel Mcnally
(74) *Attorney, Agent, or Firm* — CANTOR COLBURN LLP

(57) ABSTRACT

The present disclosure relates to a method of manufacturing a vacuum insulating glass unit (1). The method comprises providing a first glass sheet (3) and dispensing a plurality of spacers (2) comprising predefined, pre-shaped contact surfaces (2*a*, 2*b*) on a major surface (3*a*) of the provided glass sheet (3) by means of at least one dispenser (10) of a spacer dispensing system (200). The dispenser (10) comprises a housing (12) comprising a guidance space (13) placed between a first housing surface (17*a*) of an upper part (12*a*) of the housing (12) and a second housing surface (17*b*) of a bottom part (12*b*) of the housing (12), wherein the upper part (12*a*) of the housing (12) comprises a spacer storage compartment (11) comprising a plurality of said spacers (2) which are randomly orientated in the spacer storage compartment (11). A collection sheet (15) provides a bottom part of the spacer storage compartment (11). At least one protruding member (75) extends into the spacer storage compartment (11) with a distance (P_DIS) to the collection sheet (15) so that an intermediate space (76) is provided between the collection sheet (15) and the protruding member (75). The dispensing of spacers (2) comprises providing a first relative movement between the collection sheet (15) and the housing (12) so as to collect a spacer (2) from the spacer storage compartment (11), and providing a further, relative movement between the collection sheet (15) and the housing (12) so as to deliver the collected spacer (2) to a spacer outlet (16). A collection hole (15*a*) passes at least a part of the intermediate space (76) during the first relative movement before entering the guidance space (13).

16 Claims, 18 Drawing Sheets

DISPENSER COMPRISING ONE OR MORE PROTRUDING MEMBERS EXTENDING INTO SPACER STORAGE COMPARTMENT

CROSS REFERENCE TO RELATED APPLICATION

This application is related to and claims the benefit of European Patent Application Number 23215760.2, filed on Dec. 12, 2023, the contents of which are herein incorporated by reference in their entirety.

The present disclosure relates to a method of manufacturing a vacuum insulating glass unit, and to a dispenser for dispensing spacers.

BACKGROUND

Vacuum insulating glass (VIG) units are generally known to provide an insulating glass unit with desirable features such as a space saving unit with good heat insulating capabilities. Such VIG units may comprise spacers distributed in an evacuated gap between two glass sheets of the VIG unit. These spacers may be very small, such as below 0.5 mm in height. This may result in issues when providing automation equipment such as a spacer dispensing solution, since a spacer dispensing solution for use in larger scale VIG unit manufacturing should preferably be both reliable and robust. Moreover it should also preferably be fast.

Different spacer dispensing solutions in VIG unit manufacturing have been disclosed. For example, WO2019218901 discloses a dispenser solution for spacers for VIG units where a vibration arrangement may line up and convey the spacers. WO21208628 discloses a solution for separating spacers for VIG units. A vibrator is used and a separation chamber component is arranged obliquely to the horizontal plane. Other types of spacer dispensing solutions comprises a radial drum solution as disclosed in CN 205258287U, where a radial drum having a horizontal rotation axis collects spacers from a spacer storage and the drum is rotated around the horizontal axis so the collected spacers are delivered. U.S. Ser. No. 11/396,477 discloses a solution where spacers are arranged stacked in a spacer column of a magazine, and pushed horizontally to leave the magazine from the bottom of the magazine to the glass sheet surface. CN106045286 discloses a further VIG unit spacer dispensing solution comprising a reciprocating collection member, or a rotating collection member with a collection opening for receiving a spacer.

The above solutions may suffer from various drawbacks such as being mechanically complex, risk inaccurate spacer placement, may be less reliable, may be space consuming and/or the like. The present disclosure provides a solution that may e.g. help to reduce or avoid one or more of the above mentioned drawbacks. The present disclosure may additionally or alternatively provide a solution that may help to increase reliability and/or speed when dispensing spacers.

SUMMARY

The present disclosure relates to a method of manufacturing a vacuum insulating glass unit. The method comprises providing a first glass sheet and dispensing a plurality of spacers comprising predefined, pre-shaped contact surfaces on a major surface of the provided glass sheet by means of at least one dispenser of a spacer dispensing system. The dispenser comprises a housing comprising a guidance space placed between a first housing surface of an upper part of the housing and a second housing surface of a bottom part of the housing. The upper part of the housing comprises a spacer storage compartment comprising a plurality of said spacers, and the spacers may be randomly orientated in the spacer storage compartment. The dispenser moreover comprises a spacer outlet, for example an outlet arranged at the bottom part of the housing. The dispenser also comprises a collection member, such as a connection sheet. The collection sheet may provide a bottom part of the spacer storage compartment. The collection sheet may comprise at least one collection hole extending between opposing major surfaces of the collection sheet. The collection sheet may be arranged in the guidance space. At least one protruding member extends into the spacer storage compartment with a distance to the collection sheet so that an intermediate space is provided between the collection sheet and the protruding member.

The dispensing of spacers comprises providing a first relative movement between the collection sheet and the housing by means of a drive motor so that the collection hole is arranged at the bottom of the spacer storage compartment and collects a spacer from the spacer storage compartment prior to entering the guidance space. The dispensing of spacers moreover comprises providing a further, relative movement between the collection sheet and the housing so that the collection hole with the collected spacer enters the guidance space and is aligned opposite the spacer outlet so as to deliver the collected spacer to the spacer outlet and hereby towards the major surface of the glass sheet.

The collection hole may pass at least a part of the intermediate space during the first relative movement before entering the guidance space.

The method of manufacturing a vacuum insulating glass unit further comprises providing a second glass sheet and sealing together the first glass sheet and the provided second glass sheet at the periphery of the glass sheets with the plurality of dispensed spacers arranged between major surfaces of the glass sheets so that a gap is provided between the first and second glass sheets, and evacuating the gap.

When producing Vacuum Insulated Glass units (VIG units) in a larger, commercial scale, VIG unit manufacturing reliability and manufacturing speed is increasingly important. It has come to the attention of the inventors that a dispenser of the type comprising a collection member such as a collection sheet and a housing with a guidance space may suffer from issues in terms of consistently delivering spacers from a storage comprising randomly orientated spacers.

The inventors have found that providing a protruding member that extends into the spacer storage compartment with a distance to the collection sheet may help to increase the chance of successfully collecting a spacer in the spacer storage before the collection hole enters the guidance space. This may especially be the case when the spacers to be dispensed are randomly orientated in the spacer storage compartment.

The protruding member may e.g., directly or indirectly help to arrange or rearrange spacers in the collection hole that may not be arranged as desired. This may e.g. help to improve dispensing reliability and/or enable a faster manufacturing of VIG units. Additionally or alternatively, the protruding member may help to reduce the risk of that a jamming situation occur. If a spacer get stuck, this may damage the spacer and/or influence negatively on the manufacturing process, e.g. due to the need of solving the jamming situation.

In some embodiments, the spacers in the spacer storage to be dispensed may comprise predefined, oppositely directed, contact surfaces. The protruding member may help to increase the chance that the spacer is arranged with a desired orientation in the collection hole. For example so that the spacer supports on a contact surface of the spacer at a wall surface underneath the collection sheet.

In one or more embodiments of the present disclosure, the at least one protruding member may be fixed relative to the housing. This may provide a simple and advantageous fixation of the protruding member. This may e.g. in some embodiments be provided if the collection sheet is moved relative to the housing by the drive motor.

In one or more embodiments of the present disclosure, the at least one protruding member is fixed to or integrated in the housing. In some embodiments hereof. The protruding member is attached to or integrated in the upper part of the housing. This may e.g. provide a mechanically simple solution.

In one or more embodiments of the present disclosure, the at least one protruding member comprises a pin. The inventors have found that a pin may provide a simple and advantageous protruding member for improving the consistency/reliability in picking a spacer from the spacer storage.

In one or more embodiments of the present disclosure, the protruding member may be or comprise a metal member such as a steel member. This may provide improved strength and/or elastic properties. In some embodiments, the protruding member may be or comprise a metal pin.

In some embodiments, the protruding member may consist of a metal member such as a metal pin.

In one or more embodiments of the present disclosure, the protruding member may be electrically conducting. This may e.g. help to reduce the electrical resistance between the housing and the protruding member. This may e.g. help to reduce or avoid issues caused by static electricity.

In one or more embodiments of the present disclosure, the collection hole follows, such as moves along, a predefined traveling path in the spacer storage compartment, and wherein the protruding member extends in a direction transverse to the traveling path of the collection hole.

This may help to increase consistency/reliability in picking a spacer from the spacer storage. The inventors have tested the use of a pin arranged like this, and the test indicated an improved spacer delivery consistency.

In some embodiments, a longitudinal direction of the protruding member, such as a pin, may extends in a direction transverse to the traveling path.

In one or more embodiments of the present disclosure, some of the randomly orientated spacers in the storage may support on top of the protruding member 75.

In some embodiments of the present disclosure, the spacers in the spacer storage compartment may partly or fully surround the protruding member.

The protruding member may in embodiments extend in between the spacers in the spacer storage compartment.

In one or more embodiments of the present disclosure, the protruding member overlaps the traveling path.

The inventors have seen indications that this may provide a more reliable, improved collection of spacers.

In one or more embodiments of the present disclosure, the protruding member, such as a pin, has a width, such as a diameter, of less than 3 mm, such as less than 2 mm, such as less than 1 mm. This may help to provide improved spacer collection consistency.

In some embodiments, said width/thickness extends in a direction away from a surface of the collection sheet.

The inventors have provided tests using a pin having a diameter of between 0.5 mm and 0.9 mm, e.g. between 0.8-0.9 mm. Here, the inventors saw indications of improved spacer collection consistency.

In one or more embodiments of the present disclosure, the protruding member, such as a pin, has a width, such as a diameter, of between 0.3 mm and 5 mm, such as between 0.5 mm and 2 mm, such as between 0.7 and 1.2 mm.

In one or more embodiments of the present disclosure, the protruding member extends from a side wall of the housing, wherein said side wall comprises a surface facing the spacer storage compartment.

In one or more embodiments of the present disclosure, the protruding member comprises or is a peg.

In one or more embodiments of the present disclosure, the protruding member has a length of at least 0.5 mm, such as at least 1 mm, such as at least 3 mm, for example at least 5 mm. This may e.g. help to provide a resiliency of the protruding member and/or enable suitable coverage of the protruding member.

In some embodiments, the said length may extend in a length direction away from a side surface.

In one or more embodiments of the present disclosure, the protruding member, such as a pin, is suspended as a cantilever beam.

In additional or alternative embodiments of the present disclosure, the collection hole may pass below a part of a half part or quarter part of the protruding member that is proximate a free end of the protruding member.

This may e.g. provide an increased flexibility and/or resiliency of the protruding member. This may e.g. provide one or more of improved re-arrangement of a spacer in the collection hole, improved reliability of the dispenser and/or help to reduce jamming situations.

The protruding member may e.g. hence, in some embodiments of the present disclosure, be supported by/fixed to the housing at just one end of the protruding member.

In other embodiments, the protruding member may be fixated at and/or in opposing walls of the spacer storage arranged at opposing sides of the spacer storage.

In one or more embodiments of the present disclosure, the minimum distance between the protruding member and the collection sheet may be less than 5 mm, such as less than 2 mm.

In some embodiments of the present disclosure, the protruding member may be resilient so as to be displaceable by forces from a spacer acting on the protruding member. This may e.g. help to reduce risk of spacer damage and/or help to provide improved rearranging/manipulation of a spacer in a collection hole that is not arranged as desired therein.

In one or more embodiments of the present disclosure, the distance between the protruding member and the collection sheet may be less than 5 mm such as less than 3 mm.

In one or more embodiments of the present disclosure, the distance between the protruding member and the collection sheet may be less than 1 mm such as less than 0.6 mm, such as less than 0.4 mm or 0.3 mm or less.

In one or more embodiments of the present disclosure, the spacers in the spacer storage may have a spacer width that is larger than the spacer height, where the spacer height is defined between oppositely directed predefined contact surfaces of the spacer.

In one or more embodiments of the present disclosure, the protruding member may be arranged with a distance to the collection sheet so as intersect with a spacer that extend into the collection hole and supports at least partly on the side surface.

In one or more embodiments of the present disclosure, the distance between the protruding member and the collection sheet may be smaller than the width of the spacers.

In one or more embodiments of the present disclosure, the distance between the protruding member and the collection sheet may be larger than the height of the spacers.

This may e.g. help to provide that the protruding member may help to arrange the spacer more advantageously or as desired in the collection hole.

In one or more embodiments of the present disclosure, the distance between the protruding member and a surface of a bottom wall of the housing may be smaller than the width of the spacers. Additionally or alternatively, in one or more embodiments of the present disclosure, the distance between the protruding member and a surface of a bottom wall of the housing may be larger than the height of the spacers.

The bottom wall part may in embodiments of the present disclosure be a wall part comprising a surface on which the spacer is configured to support, such as slide, during travel towards the spacer outlet. In some embodiments, the bottom wall part may be a housing wall.

This may e.g. help to provide that the protruding member may help to arrange the spacer more advantageously in the collection hole.

In some embodiments, the collection sheet may be placed between the protruding member and said surface of a bottom wall of the housing.

In further embodiments, a convex side surface of the spacer extends between the predefined contact surfaces. The convex surface may make it more easy for the protrusion to arrange the spacer in a desired orientation in the collection hole.

In one or more embodiments of the present disclosure, the spacers in the spacer storage have a spacer width that is larger than the spacer height. The spacer height may be defined between oppositely directed predefined contact surfaces and a side surface, such as a convex side surface, of the spacer may extend between the predefined contact surfaces.

In some embodiments of the present disclosure, the protruding member may intersect with a spacer extending into the collection hole and supporting at least partly on the side surface.

In one or more embodiments of the present disclosure, the minimum distance between the protruding member and the collection sheet may be between 0.1 mm and 5 mm, such as between 0.2 and 0.5 mm.

In one or more embodiments of the present disclosure, said first and further relative movement between the collection sheet and the housing may be a rotational movement around a rotation axis, such as wherein the collection sheet is rotated relative to the housing by means of the drive motor.

This may help to provide a reliable, fast and/or space saving spacer delivery solution where spacers may be placed randomly and intermixed in the spacer storage compartment and picked one by one from the spacer storage by means of the collection hole "sweeping" the spacer storage compartment bottom.

In other embodiments of the present disclosure, said first and further relative movement between the collection sheet and the housing may be or comprise reciprocating, linear movements where the collection sheet and hence the collection hole reciprocates between the spacer storage compartment and the outlet.

In one or more embodiments of the present disclosure, one or both of the opposing major surfaces of the collection sheet may be coated with a wear resistant coating, such as an electrically conducting, wear resistant coating.

This may e.g. help to provide a wear resistant solution and/or a coating that is electrically conducting in order to reduce or prevent buildup of static electricity. The coating may also help to provide low friction.

In one or more embodiments of the present disclosure, one or both of the opposing major surfaces of the collection sheet is/are coated with a chromium nitride (CrN) coating. This may e.g. provide a wear resistant and/or electrically conducting solution.

In some embodiments, the coating may be provided by means of a High Power Impulse Magnetron Sputtering (HIPIMS) technology.

In one or more embodiments of the present disclosure, a charge modulation system may reduce and/or maintain a difference in electrostatic charge potential between the glass sheet and the dispenser to be below 10 kV, such as below 5 kV, such as below 2 kV.

This may help to reduce or avoid static charge issues.

In one or more embodiments of the present disclosure, the charge modulation system comprises one or more of:

A grounding connection

One or more ionizer devices, such as one or more ionizer bars providing a flow of ions with controlled polarity towards the dispensing system such as towards the dispenser(s), and/or towards the glass sheet A humidity control system maintaining the relative humidity of the ambient air surrounding the dispenser (10) above 40%, such as above 50%, for example between 40% and 70%, In one or more embodiments of the present disclosure, said housing may be grounded.

In one or more embodiments of the present disclosure, said protruding member is connected to a grounding connection through the housing. This may e.g. help to reduce or even omit static charge/static electricity build-up In one or more embodiments of the present disclosure, the first and further relative movement between the collection sheet and the housing is a rotational movement around a rotation axis. In further embodiments hereof, the spacer storage compartment may be elongated and extend partly around the rotation axis. In still further embodiments, the spacer storage compartment may be arc shaped.

In one or more embodiments of the present disclosure, the spacer storage compartment may be shaped so that the collection hole enters into the guidance space at an entrance position located underneath a wall between ends of the elongated spacer storage compartment. This may e.g. help to reduce risk of jamming.

In some embodiments, the wall surface underneath which the collection hole enters into the guidance space may extend with an angle different from 90 degrees, such as with an angle of less than 90 degrees, e.g. less than 45 degrees or less than 25 degrees relative to the traveling path. This may e.g. help to reduce an advantageous entrance angle which may reduce e.g. risk of jamming situations.

In one or more embodiments of the present disclosure, each of the plurality of spacers in the spacer storage compartment may have a spacer height extending between the contact surfaces, and wherein each of said spacers has a spacer width, wherein the height of the guidance space is smaller than the spacer width.

Additionally or alternatively, in some embodiments of the present disclosure, the guidance space may have a height which is less than 1.4 times the spacer height.

In one or more embodiments of the present disclosure, one of the contact surfaces of the collected spacer may support on and slide on a surface of the dispenser, such as on the second housing surface, in the guidance space during the further rotational movement.

In one or more embodiments of the present disclosure, the collection sheet may comprise an upwardly facing first major surface and a downwardly facing, oppositely directed second major surface, wherein the second housing surface covers at least 90%, such as at least 98% of the surface area of the second major surface, and/or wherein the first housing surface covers at least 40%, such as at least 60%, such as at least 75% of the surface area of the first major surface of the collection sheet.

In one or more embodiments of the present disclosure, the collection sheet has an outer maximum disc diameter, and wherein the housing has a width, such as a diameter, that is larger than the disc diameter.

In one or more embodiments of the present disclosure, the collection sheet may be disc shaped.

In one or more embodiments of the present disclosure, the housing encloses at least 80% such as at least 95% of the outer boundary, such as periphery, of the collection sheet by means of a wall part, such as an annular wall part, arranged opposite to the outer boundary of the disc shaped collection sheet. In some embodiments the housing may fully enclose the outer boundary, such as periphery, of the collection sheet by means of a wall part, such as an annular wall part, arranged opposite to the outer boundary of the disc shaped collection sheet.

In one or more embodiments of the present disclosure, the housing has a maximum width, such as a maximum outer diameter, that is 50 mm or less, such as 40 mm or less, for example 30 mm or less.

In one or more embodiments of the present disclosure, the spacer height of the spacers in the spacer storage compartment may be less than 0.4 mm, such as less than 0.25 mm, for example 0.2 mm or less.

In one or more embodiments of the present disclosure, the maximum width, such as the maximum diameter of the spacers, is at least 2 times larger, such as at least 2.5 times larger than the height of the spacers.

In one or more embodiments of the present disclosure, the maximum width, such as the maximum diameter, of the spacers is between 2 times and 5 times, such as between 2 times and 4 times larger than the height of the spacer 2.

In one or more embodiments of the present disclosure, the spacer storage compartment may be defined between opposing side wall surfaces of the housing, and wherein at least a side wall surface enclosing and facing a part of the spacer storage compartment and which is placed proximate a rotation axis of the collection sheet is convexly shaped, such as wherein at least a part of the convexly shaped side wall surface is coaxial with the rotation axis.

In one or more embodiments of the present disclosure, the spacer storage compartment is arranged in, such as integrated in, such as milled into, the upper part of the housing.

In one or more embodiments of the present disclosure, the thickness of the collection sheet may be within ±15%, such as within ±10%, such as within ±5% or within ±3% of the spacer height.

In one or more embodiments of the present disclosure, the thickness of the collection sheet is between 1 and 1.4 times the spacer height, such as between 1 and 1.3 times the spacer height.

In one or more embodiments of the present disclosure, detection of a jamming situation may be provided during said first and/or further relative movement, and/or a jamming controller provides one or more anti-jamming operations when predetermined criteria is complied with.

This may provide e.g. improved consistency of spacer delivering over time. Tests have indicated that a combination of detecting a jamming situation and providing anti-jamming operations if needed, and using a protruding member, may help to increase dispenser reliability and hence help to enable a more efficient VIG unit manufacturing.

In one or more embodiments of the present disclosure, the detection of a jamming situation may comprise monitoring one or more parameters. These/this parameter(s) may be based on input data.

This may provide an advantageous, automatized jamming monitoring providing detection of a jamming situation and thereby enabling detection of when a anti-jamming operation may be beneficial to provide.

The predetermined criteria may be based on the one or more monitored parameters. In some embodiments, the input data comprises input from one or more sensors.

In one or more embodiments of the present disclosure, the detection of a jamming situation may be provided based on input from one or more sensors.

This may provide e.g. reliable and/or efficient jamming detection.

In one or more embodiments of the present disclosure, the one or more sensors comprises a torque sensor. A torque sensor may provide an advantageous way of determining if a jamming situation occur. When a jamming situation occur, this may be caused by a spacer being stuck in the dispenser. A stuck spacer may result in an increase in power/current consumption by the driver, by increased loads, such as torsion forces, in a driving part connected directly or indirectly to the a driven part (such as the collection sheet) of the dispenser, or the like. This may be registered in an advantageous way by means of a torque sensor.

In one or more embodiments of the present disclosure, one or more sensors, such as comprising a torque sensor, is configured to provide input data based on one or more of power consumption, voltage and/or consumed electric current of the drive motor.

This may provide advantageous and/or cost efficient detection of a jamming situation. In one or more embodiments of the present disclosure, the one or more anti-jamming operations may comprise that a relative movement between the collection sheet and the housing is provided in a direction opposite to the first driving direction, such as by means of the drive motor.

Experiments have shown that this may help to resolve a jamming situation. This may e.g. be caused by that one or more spacers in or near the collection opening are moved to be re-orientated, and/or that spacers in the storage may help to push/arrange a spacer in the collection hole into a proper orientation.

In one or more embodiments of the present disclosure, the movement between the collection member and the housing in the direction opposite to the first driving direction is followed by resuming a relative movement between the collection member and the housing by means of a driver in the first driving direction.

In one or more embodiments of the present disclosure, a relative movement between the glass sheet surface and the spacer outlet is provided in a direction along the glass sheet surface by means of a displacement motor, such as an electrical motor, and a plurality of spacers from the spacer storage are distributed with a mutual spacer distance on the glass sheet surface by means of the dispenser through the spacer outlet.

The present disclosure moreover relates, in a second aspect, to a dispenser for dispensing spacers on a major surface of a glass sheet during manufacturing of a vacuum insulating glass unit. The dispenser comprises:

- a spacer storage compartment for containing a plurality of said spacers,
- a housing comprising a guidance space placed between a first housing surface of an upper part of the housing and a second housing surface of a bottom part of the housing,
- a spacer outlet,
- a collection sheet providing a bottom part of the spacer storage compartment, wherein the collection sheet comprises at least one collection hole extending between opposing major surfaces of the collection sheet, wherein the collection hole is a through hole and wherein the collection sheet is arranged in the guidance space.

A relative movement between the collection sheet and the housing is configured to be provided so that the collection hole is arranged at the bottom of the spacer storage compartment, and so that a further relative movement between the collection sheet and the housing provides that the collection hole enters the guidance space and is arranged opposite to the spacer outlet.

The upper part of the housing comprises said spacer storage compartment. The dispenser comprises at least one protruding member extending into the spacer storage compartment with a distance to the collection sheet so that an intermediate space is provided between the collection sheet and the protruding member. In some embodiments, the collection hole may be configured to pass at least a part of the intermediate space.

In one or more embodiments of the second aspect, the dispenser is for dispensing spacers that randomly intermixed in the spacer storage compartment.

In one or more embodiments of the second aspect, the dispenser is for dispensing spacers that comprises predefined contact surfaces, such as spacer that have a spacer width that is larger than the spacer height.

In one or more embodiments of the second aspect, the dispenser is used in, is configured to be used in a method according to one or more embodiments of the present disclosure as described above.

In one or more embodiments of the second aspect, the dispenser is a dispenser as described above according to one or more embodiments of the present disclosure.

The present disclosure moreover relates to a method of manufacturing a vacuum insulating glass unit. The method comprises providing a first glass sheet and dispensing a plurality of spacers comprising predefined, pre-shaped contact surfaces on a major surface of the provided glass sheet by means of at least one dispenser of a spacer dispensing system. The dispenser comprises a housing comprising a guidance space placed between a first housing surface of an upper part of the housing and a second housing surface of a bottom part of the housing. The upper part of the housing comprises a spacer storage compartment comprising a plurality of said spacers, and the spacers may be randomly orientated in the spacer storage compartment. The dispenser moreover comprises a spacer outlet, for example an outlet arranged at the bottom part of the housing. The dispenser also comprises a collection member, such as a connection sheet. The collection sheet may provide a bottom part of the spacer storage compartment. The collection sheet may comprise at least one collection hole extending between opposing major surfaces of the collection sheet. The collection sheet may be arranged in the guidance space. The dispensing of spacers comprises providing a first relative movement between the collection sheet and the housing by means of a drive motor so that the collection hole is arranged at the bottom of the spacer storage compartment and collects a spacer from the spacer storage compartment prior to entering the guidance space. The dispensing of spacers moreover comprises providing a further, relative movement between the collection sheet and the housing so that the collection hole with the collected spacer enters the guidance space and is aligned opposite the spacer outlet so as to deliver the collected spacer to the spacer outlet and hereby towards the major surface of the glass sheet.

In one or more embodiments of the third aspect, one or both of the opposing major surfaces of the collection sheet may be coated with a chromium nitride (CrN) coating. This may e.g. provide a wear resistant and/or electrically conducting solution.

In one or more embodiments of the third aspect, one or both of the housing surfaces facing the collection sheet may be coated with a chromium nitride (CrN) coating. This may e.g. provide a wear resistant and/or electrically conducting solution.

In one or more embodiments of the third aspect, the wall surface underneath which the collection hole enters into the guidance space may extend with an angle different from 90 degrees, such as with an angle of less than 90 degrees, e.g. less than 45 degrees or less than 25 degrees relative to the traveling path. This may e.g. help to reduce an advantageous entrance angle which may reduce e.g. risk of jamming situations.

The method of manufacturing a vacuum insulating glass unit according to the third aspect may further comprises providing a second glass sheet and sealing together the first glass sheet and the provided second glass sheet at the periphery of the glass sheets with the plurality of dispensed spacers arranged between major surfaces of the glass sheets so that a gap is provided between the first and second glass sheets, and evacuating the gap.

In one or more embodiments of the third aspect, the dispenser may be a dispenser as described e.g. previously according to one or more embodiments above.

DESCRIPTION OF THE DRAWINGS

The present disclosure will in the following be described in greater detail with reference to the accompanying drawings:

FIGS. 1*a*-2*a*: illustrates a dispenser for dispensing spacers according to embodiments of the present disclosure, FIGS. 2*a*-2*b*: illustrates a spacer comprising predefined, pre-shaped contact surfaces according to embodiments of the present disclosure.

DETAILED DESCRIPTION

Figure 1A:
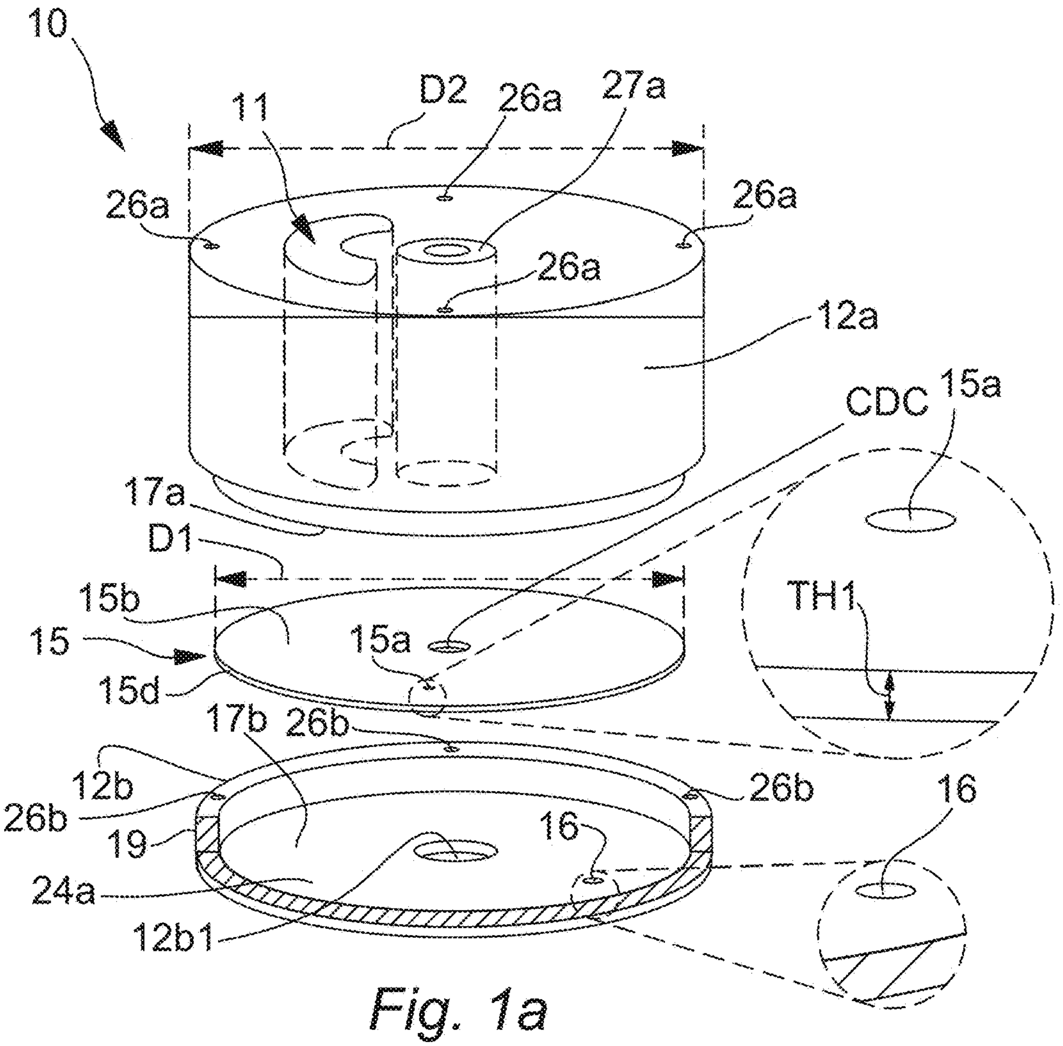
Figure 1B:
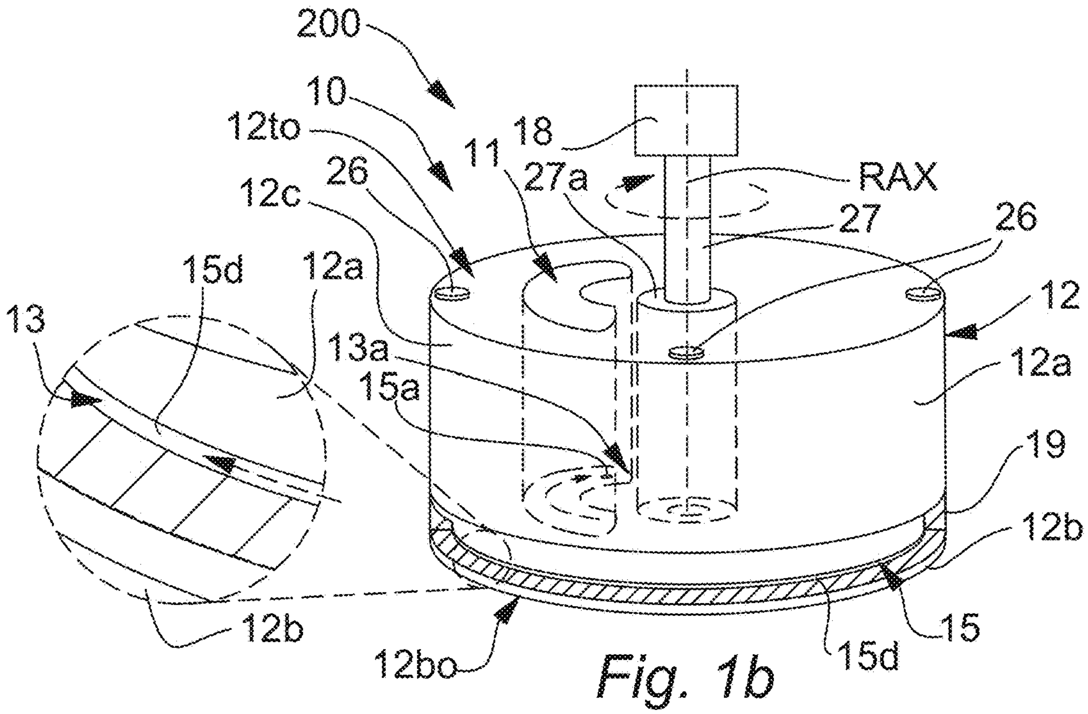

FIGS. 1*a* and 1*b* illustrates schematically and in perspective a dispenser 10 according to embodiments of the present disclosure for dispensing spacers 2 onto a glass sheet for use in a Vacuum insulating glass unit, also referred to as a VIG unit.

FIG. 1*a* illustrates an exploded, unassembled view of the dispenser 10, so that the different parts of the dispenser according to various embodiments can be seen. Both in FIGS. 1*a* and 1*b*, a bottom part of the housing 12*b* comprises a cut-out in a wall 19 for viewing purpose only, so that the structure of the lower part pf the dispenser 10 is more visible, also after assembling. Though, it is understood that the wall 19 may be annular and substantially complete.

As can be seen, the dispenser comprises a housing 12. The housing 12 comprises an upper part 12*a* such as a body part 12*a* and a bottom part 12*b*. The upper body part 12*a* is configured to be attached to the lower body part 12*b* by mechanical fastening means 26, such as releasable fastening means such as one or more threaded bolts, screws, clips or the like. The fastening means in FIGS. 1*a* and 1*b* comprises bolts, and the upper body part 12*a* comprises through going holes 26*a* through which the bolts extends, and the bottom part 12*b* comprises threaded holes 26*b* in the outer wall 19 for receiving and engaging with the bolts 12*a*. Thereby, the upper body part 12*a* can be attach to the bottom part 12*b* to form the dispenser housing 12 as seen in FIG. 1*b*.

The upper body part 12*a* comprises a spacer storage compartment 11. This storage compartment is configured to store a plurality of spacers 2 therein. The spacers for VIG units are small (ad explained in more details below), such as having a spacer height H1 less than 0.4 mm, such as less than 0.25 mm, for example 0.2 mm or less. More than 10.000, such as more than 20.000, for example more than 40.000 spacers may be stored in the storage 11 at the same time.

A guidance space 13 is placed between the upper body part 12*a* of the housing 12 and the bottom part (12*b*) of the housing. In the embodiments of FIGS. 1 and 1*a*, the guidance space 13 is placed between a first housing surface 17*a* of the upper body part 12*a* of the housing 12 and a second housing surface 17*b* of the bottom part 12*b* of the housing 12. Hence, when the upper body part 12*a* and the bottom part are assembled, the guidance space is defined/provided.

As can be seen, the annular wall 19 of the bottom part 12*b* may extend around and encircle/enclose the guidance space when the dispenser is assembled.

The dispenser 10 also comprises a collection sheet 15. This collection sheet 15 may e.g. as illustrated in FIG. 1*a*, in embodiments of the present disclosure, be disc shaped. The collection sheet 15 has an outer boundary 15*d*. In this embodiment, the collection sheet comprises/describes a circular outer periphery 15*d*. The collection sheet comprises a first major surface 15*b* facing the upper body part 12*a* and a downwardly facing, oppositely directed, major surface (not visible in FIGS. 1*a* and 1*b*) facing the bottom part 12*b*. The major surfaces of the collection disc are preferably parallel.

In some embodiments of the present disclosure (not illustrated), the collection sheet 15 may have another shape than disc shape. E.g., in some embodiments of the present disclosure, the collection sheet 15 may have a polygonal shape, such as a symmetric polygonal shape.

The size such as the diameter and thickness TH1 of the collection sheet 15 is adapted so that the collection sheet 15 can be rotated around it's centre CDC in the guidance space 13, around a rotation axis RAX. Hence, the major surfaces of the collection sheet 15 comprises/defines a plane that are substantially perpendicular to the rotation axis RAX. The rotation axis RAX is preferably arranged to extend through the collection sheet centre CDC.

A shaft 27 extends through the upper body part 12*a* and may be connected/attached to the upper body part by means of a bearing 27*a* such as roller bearing or another suitable type of bearing that enables relative rotation between the housing 12 and the shaft 27 around the rotation axis RAX. The rotation axis is in FIGS. 1*a* and 1*b* coincident with a centre axis of the housing, but in other embodiments, the rotation axis may be displaced relative to a centre axis of the housing.

The collection sheet 15 may as illustrated e.g. have hole or the like at the centre CDC, to enable fastening of e.g. a shaft or the like to the collection sheet 15. As can be seen, the bottom wall 24 of the bottom part 12*b* may be provided with a recess or a hole (the latter being illustrated in FIG. 1*a*) at the centre, so as to e.g. enable space for a fastening part (not illustrated) for fastening the collection sheet 15 to a shaft 27*a* at the centre CDC. The hole 12*b*1 may hence be arranged at the centre of the bottom wall 24*a*. It is understood that the bottom wall 24*a* in FIG. 1*a* comprises the major surface 17*b* for facing the guidance space 13 upon housing part 12*a*, 12*b* assembly.

As can be seen, the outer periphery of the housing 12 is circular and has an outer diameter D2, and the housing 12 may as illustrated be substantially cylindrical. Here, the outer sidewall 12*c* of the dispenser extending between top 12*to* and bottom 12*bo* of the dispenser housing is curved to provide the cylinder shape. However, in other embodiments, the outer side wall 12*c* of the housing 12 may have another shape (not illustrated in FIGS. 1*a* and 1*b*), e.g. rectangular, for example square shaped or the like and have a width that may also be referred to as D2.

The housing 12 may in embodiments of the present disclosure have a maximum width D2, such as a maximum outer diameter, that is 50 mm or less, such as 40 mm or less, for example 30 mm or less. The housing 12 may in embodiments of the present disclosure have a maximum width D2 that is between 20 mm and 70 mm, such as between 20 mm and 50 mm. such as between 25 mm and 45 mm for example 30 mm.

The width D2 may in an embodiment of the present disclosure be determined/defined along a plane extending in a direction transverse to, such as perpendicular to, the rotation axis RAX1.

The maximum width D2 may in an embodiment of the present disclosure be determined/defined in a direction transverse to, such as perpendicular to, the rotation axis RAX1, such as in a direction extending transverse to, such as perpendicular to, the rotation axis RAX1.

The bottom part 12*b* comprises a spacer outlet 16 for dispensing spacers one at a time towards a glass sheet surface. The spacer outlet is arranged in the major surface 17*b* facing towards the upper body part 12*a* and the collection sheet 15.

The as can be seen from FIG. 1*b*, the collection sheet 15 is arranged in the guidance space between 13 between the surfaces 17*a*, 17*b*. The collection sheet 15 comprises a collection hole 15*a* extending between the opposing major surfaces 15*b*, 15*c* (15*c* not illustrated in FIGS. 1*a* and 1*b*) of the collection sheet 15. The collection hole 15*a* is a through hole allowing a spacer to enter through the collection hole 16. In FIG. 1, the collection sheet comprises a single collection hole 15*a*.

In other embodiments, the collection sheet 15 may comprise a plurality of collection holes 15*a*. In some embodiments, these 15*a* may be distributed with a mutual distance of e.g. π (pi), ½π or less. For example, the collection sheet may comprise 3 collection holes arranged with 120° there between, four collection holes arranged with 90° there between or the like. The collection sheet 15 may comprise between one and ten collection holes 15*a*, such as between one and six collection holes, such as between two and six collection holes (not illustrated). However, it is understood that the collection sheet 15 may also comprise just one collection hole 15*a* as illustrated. See also FIG. 28.

It is understood that in embodiments of the present disclosure, one or both surfaces 17*a*, 17*b* may be uncoated or coated. If the surface(s) 17*a*, 17*b* is/are coated, they may be coated e.g. by an electrically conducting layer or an electrically substantially electrically un-conducting layer. In additional or alternative embodiments, if the surface(s) 17*a*, 17*b* is/are coated, the coating may comprise a friction-reducing layer such as a polymer, such as Polytetrafluoroethylene (PTFE) or other suitable materials.

It is understood that in embodiments of the present disclosure, one or both surfaces 15*b*, 15*c* of the collection sheet may be coated or uncoated. If these/this surface(s) 17*a*, 17*b* is/are coated, the coating may e.g. comprise a friction-reducing layer such as a polymer, such as Polytetrafluoroethylene (PTFE) or other suitable materials. In embodiments the coating may comprise a magnetic material.

In some embodiments, the coating of the surfaces 17*a*, 17*b* and/or the coating at/of the opposing major surfaces 15*b*, 15*c* of the collection sheet 15 may comprise or be a chromium nitride (CrN) coating. In some embodiments, the coating may be provided by means of a High Power Impulse Magnetron Sputtering (HIPIMS) technology.

The collection sheet may hence comprise an intermediate structural sheet layer, such as a metal layer, such as a structural steel layer, and said coating(s) on one or both sides of the intermediate structural sheet layer.

The collection sheet 15 provides a bottom part of the spacer storage compartment 11, and hence a plurality of the spacers 2 in the storage compartment are configured to be in touch with and support on the major surface 15*b* of the collection sheet, such as due to gravity. Hence, the size and/or shape of the spacer storage compartment 11 proximate the collection sheet 15 provides that a plurality of spacers are in touch with the surface 15*b*. Hence, e.g. more than 50, such as more than 200, such as more than 500 or more than 1000 spacers may be in touch with the collection sheet surface 15*b*.

In FIG. 1*b* a relative rotational movement between the collection sheet 15 and the housing 12 is provided by keeping the housing 12 un-rotating/stationary (with respect to at least rotation). The disc shaped collection sheet 15 is rotated inside the guidance space 13 by means of the shaft 27 and a driver motor 18 such as an electrical motor 18, such as a servo motor, stepper motor or the like. In other embodiments of the present disclosure, the relative rotational movement between the collection sheet 15 and the housing 12 may be provided by keeping the collection sheet un-rotating/stationary (with respect to at least rotation) and instead rotate the housing and hence the spacer outlet 16 by means of a driver motor 18. However, rotating the collection sheet may e.g. enable more easy attachment of sensors and/or other equipment to the housing 12.

The relative rotation around the rotation axis RAX provides that the collection hole 15*a* enters into the bottom of the spacer storage compartment 11 with the spacers in the storage compartment resting on the surface 15*b*. Hence, a relative movement between the spacers 2 at the bottom of the compartment 11, which supports on the surface 15*b* of the collection sheet in the compartment 11, and the collection sheet surface 15*b*, is provided during this "first" movement. Hence, a spacer 2 is collected in the collection hole 15*a* during the rotational movement when the collection hole 15*a* "moves through"/swipes the compartment 11 bottom. The collection hole 15*a* then leaves the spacer storage bottom (with a collected spacer therein) and enters the guidance space 13 again at a guidance space entrance 13*a* due to a further rotation around the rotation axis RAX.

The dispenser 10 hence dispenses collected spacers consecutively one by one through the spacer outlet 16. This is provided when needed and controlled by a hardware controller that controls a driver 18.

It is understood that these movements in some embodiments may comprise a continuous movement in the same direction, or one or more movements that are separated by a pause in movement.

One or more of the housing top part 12*a*, bottom part 12*b* and/or the collection sheet 15 may in embodiments of the present disclosure be made from metal such as steel, such as stainless steel, brass or aluminium. In some embodiments, the entire housing 12 and the collection disc 15 may be made from the same metal material or from different metal materials. The material may be non-magnetic.

Figure 2A:
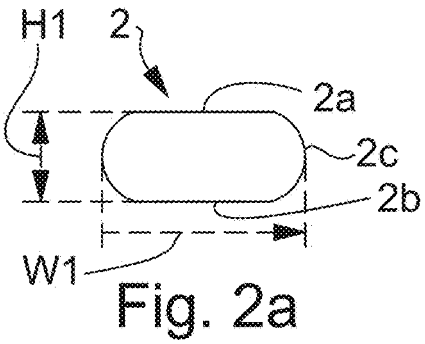
Figure 2B:
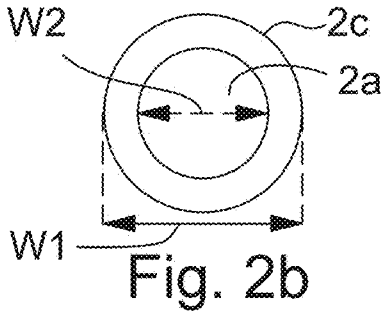

FIGS. 2*a* and 2*b* illustrates schematically a spacer 2 to be dispensed by the dispenser 10, according to embodiments of the present disclosure. The spacer 2 comprises opposing predefined, pre-shaped contact surfaces 2*a*, 2*b* which are the contact surfaces for contacting and separating major glass sheet surfaces facing the evacuated gap of a VIG unit. In FIGS. 2*a* and 2*b*, the contact surfaces 2*a*, 2*b* are substantially flat.

The spacer 2 has a spacer height H1 extending between the predefined contact surfaces 2*a*, 2*b*. This height H1 may in embodiments of the present disclosure be less than 0.4 mm, such as less than 0.25 mm, for example 0.2 mm or less.

As can be seen, the spacer 2 has a spacer width W1. As the spacer 2 in embodiments of the present disclosure may have an outer circular side periphery (see FIG. 2*b*) described by the side surface/side edge surface 2*c* extending between the contact surfaces 2*a*, 2*b*, the width W1 may be a diameter. The Width W1 is the maximum spacer width.

In embodiments of the present disclosure, the maximum width W1, such as the maximum diameter, of the spacer 2 may be larger than the height H1 of the spacer 2, such as at least 1.3, times, such as at least 1.5 times or at least 1.8 times larger than the height H1 of the spacer 2.

The spacer side surface 2*c* as illustrated extends between the contact surfaces 2*a*, 2*b*, and may as illustrated, in embodiments of the present disclosure, be curved and convexly extending, such as bulging, between the contact surfaces 2*a*, 2*b*. Hence, the width W2 (such as diameter) of the contact surfaces 2*a*, 2*b* may be less than the maximum width W1 (such as diameter) of the spacer 2. For example, the width (such as diameter) W2 of the contact surfaces 2*a*, 2*b* may be less than 0.95 times, such as less than 0.8 times, for example less than 0.6 times the maximum width W1 (such as diameter) of the spacer 2.

In some embodiments, the width W2 (such as diameter) of the contact surfaces 2*a*, 2*b* may be larger than 0.4 times, such as larger than 0.5 times, for example larger than 0.6 times the maximum width W1 (such as diameter) of the spacer 2.

In some embodiments, the width W2 (such as diameter) of the contact surfaces 2*a*, 2*b* may be less than 0.7 times, such as less than 0.6 times, for example less than 0.5 times the maximum width W1 (such as diameter) of the spacer 2.

The thickness TH1 of the collection sheet 15 may in embodiments of the present disclosure be within ±15%, such as within ±10%, such as within ±5% or within ±3% of the spacer height H1.

The thickness TH1 (see FIG. 1*a*) of the collection sheet 15 may in embodiments of the present disclosure be 1.4 times or less of the spacer height H1.

The thickness TH1 of the collection sheet 15 may in embodiments of the present disclosure be less than the spacer height H1. The thickness TH1 of the collection sheet 15 may in embodiments of the present disclosure be between 1 and 1.4 times the spacer height H1, such as between 1 and 1.3 times the spacer height H1, for example between 1 and 1.15 times the spacer height H1.

The spacer 2 may e.g. have spacer height H1 extending between the predefined contact surfaces 2*a*, 2*b* that may be less than 0.4 mm, such as less than 0.25 mm, for example 0.2 mm or less.

The thickness TH1 of the collection sheet 15 may in embodiments of the present disclosure be less than 0.6 mm such as less than 0.35 mm, for example 0.28 mm or less.

The thickness TH1 may in embodiments of the present disclosure be between 0.05 mm and 0.8 mm, such as between 0.1 mm and 0.6 mm, for example between 0.1 mm and 0.3 mm The thickness TH1 may in embodiments of the present disclosure be less than the spacer width W1.

The spacer 2 may be made from a metal, such as steel, such as stainless steel, or iron, or a polymer material. The spacer may be made from a material that provides no or low outgassing in the evacuated gap of the VIG unit, in order to maintain the desired vacuum integrity of the VIG unit.

As can be seen, the collection sheet 15 comprises an upwardly facing first major surface 15*b* and a downwardly facing, oppositely directed second major surface 15*c*.

The second housing surface 17*b* facing towards the top 12*to* of the housing may in embodiments of the present disclosure cover a major part of the major surface of the collection disc. For example, the surface 17*b* may in embodiments of the present disclosure cover at least 85% or at least 90%, such as at least 98% of the surface area of the second major surface 15*c* of the collection sheet.

The first housing surface 17*a* facing the bottom part with the spacer outlet 16 may in embodiments of the present disclosure cover at least 40%, such as at least 60%, such as at least 75% of the surface area of the first major surface 15*b* of the disc shaped collection sheet 15.

One or more of the spacer storage compartment 11 and optional holes for sensors, pressurized air and/or the like may cause a reduced covering of the surface 15*b* by the surface 17*a* compared to the covering of the surface 15*c* by the housing surface 17*b*.

The collection sheet 15 has an outer maximum disc diameter (D1) and the housing 12 has a width D2, such as a diameter, which is larger than the collection sheet diameter D1.

The housing 12 encloses at least 80% such as at least 95%, such as e.g. more than 99% of the outer boundary, such as periphery, 15*d* of the collection sheet 15. The housing may in embodiments of the present disclosure fully enclose the outer boundary 15*d*, such as outer periphery, of the collection sheet 15. This may be provided by means of the wall 19 part, such as an annular wall part, that is arranged opposite to the outer periphery 15*d* of the disc shaped collection sheet 15. The wall part 19 may be part of, such as unitary with the bottom part 12*b* as illustrated, or may be unitary with the upper body part 12*a*.

The guidance space 13 may be obtained upon assembly of the upper housing part 12*a* and the lower bottom part 12*b*.

Figure 3A:
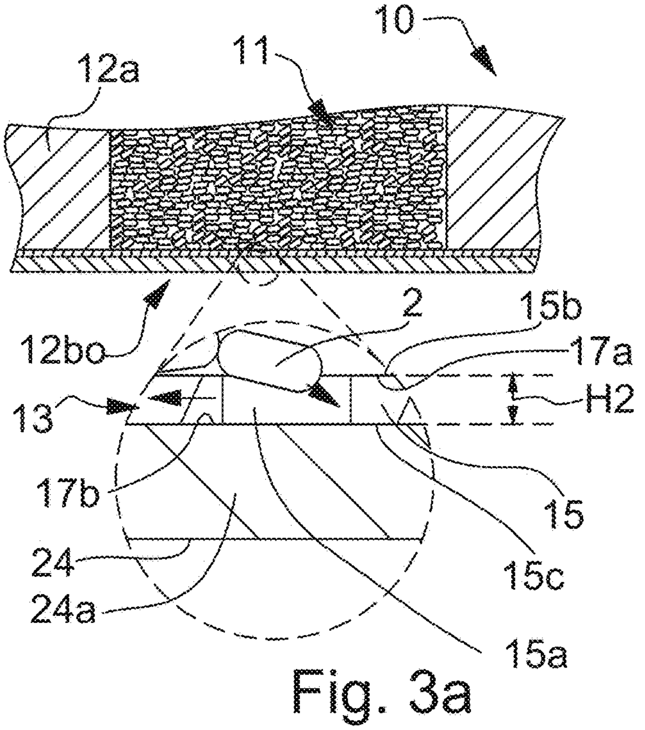
FIGS. 3*a*-3*c*: illustrates a spacer collection and dispensing process according to various embodiments of the present disclosure.
Figure 3B:
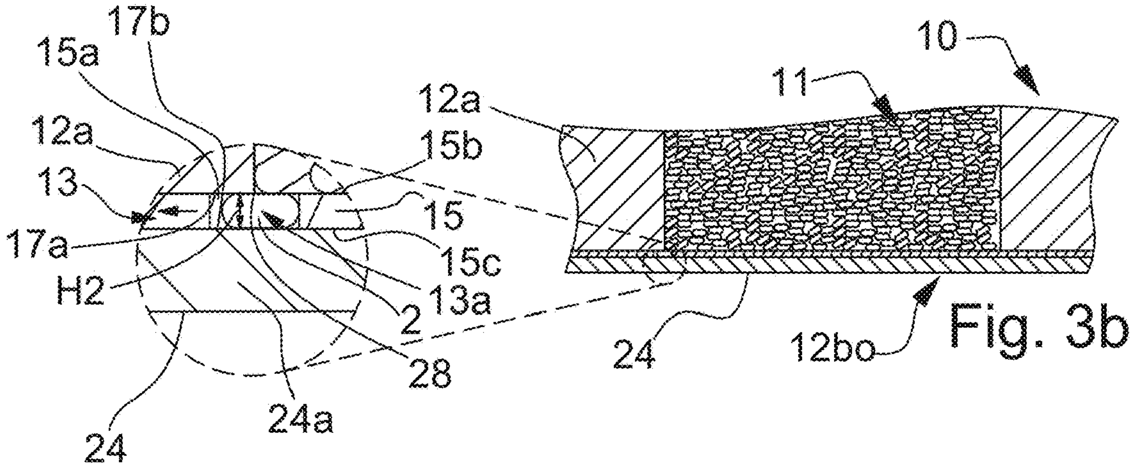
Figure 3C:
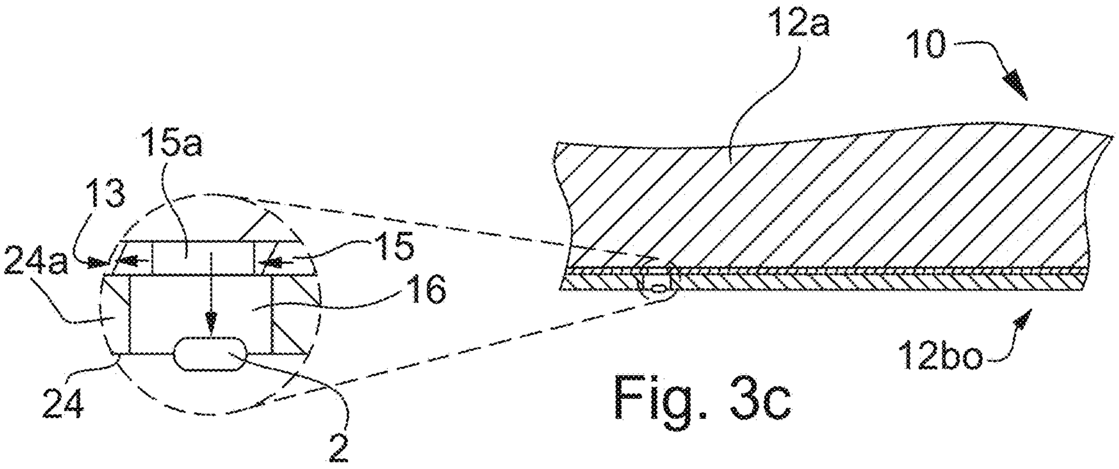

FIGS. 3*a*-3*c* illustrates schematically a spacer collection and dispensing process according to various embodiments of the present disclosure. Here, a spacer collection is provided at the storage compartment 11 when the collection hole 15*a* moves through/swipes the storage 11 bottom to collect a spacer 2, see FIG. 3*a*. The collected spacer 2 enters the guidance space (see FIG. 3*b*) at an entrance 13*a*, and the collected spacer 2 is dispensed through the spacer outlet 16 at the dispenser bottom 12*bo* (se FIG. 3*c*), according to various embodiments of the present disclosure.

In FIG. 3*a*, the collection sheet 15 is rotated which provides that the collection hole 15 moves from the guidance space 13 and into the spacer storage compartment 11 at the bottom and moves relative to the plurality of spacers 2 in the storage compartment 11. This movement provides that a spacer 3 enters into the collection hole 15*a* at the bottom of the storage 11. The collection hole 15*a* has a width, such as a diameter, that enables only one spacer to move into the collection hole 15*a*. In some embodiments the collection hole height may be 1.4 times the spacer height H1 or less, such as substantially corresponding the spacer height. This may depend on the sheet 15 thickness and/or the arranging of the sheet 15.

The diameter/width of the collection hole 15*a* (which may be a circular hole) is fitted/configured to be larger than the spacer width W1 such as spacer diameter. However, not larger than preventing two spacers 2 from entering into the collection hole at once. For example, the collection hole 15*a* may have a width, such as a diameter that is between 1.01 and 1.6 times, such as between 1.1 and 1.5 times, for example between 1.2 and 1.4 times the spacer width W1.

In some embodiments of the present disclosure, the collection hole 15*a* may have a maximum width such as diameter that is between 0.01 mm-0.3 mm larger, such as between 0.05 mm-0.2 mm larger, for example between 0.08 mm-0.13 mm larger than the spacer width W1 such as spacer diameter. For example, for spacers with a diameter of 0.5 mm, the collection hole diameter may be 0.6 mm, i.e. 0.1 mm larger than the spacer diameter.

The spacers 2 in the spacer storage compartment 11 may in embodiments of the present disclosure be randomly intermixed and/or randomly orientated (e.g. as illustrated). This may be provided by loading, pouring or the like the spacers 2 into the storage compartment 11. When the collection hole 15*a* enter through the bottom of the spacer storage 11, this movement may help to provide that one of the randomly orientated spacers 2 enters into/is collected by the collection hole 15*a*.

The collection sheet 15 (and the collection hole 15*a*) moves due to the rotation around the rotation axis RAX (see FIG. 1*b*) further through the compartment 11 bottom, now with the collected spacer 2. The collected spacer prevents further spacers of the storage 11 from entering into the collection hole. A predefined, pre-shaped, such as flat, contact surface 2*a* or 2*b* of the collected spacer 2 supports on the bottom part surface 17*b* facing the collected spacer and being arranged opposite the major surface 15*c* of the collection sheet 15 and slides over the surface 17*b*.

In FIG. 3*b*, the spacer enters the guidance space 13 at a guidance space entrance 13*a*. The spacers 2 in the storage 11 has the maximum spacer width W1 and spacer height H1. The guidance space 13 has a height H2 that is less than 1.4 times the spacer height H1. Also, the height H2 of the guidance space 13 may be smaller than the spacer width W1, at least at the edge 28 at the entrance 13*a*.

In some embodiments, the guidance space height H2 may be configured so that the collection sheet 15 can move therein. The guidance space 13 height H2 may hence be larger than the spacer height H1 but may be smaller than the spacer width W1.

In embodiments of the present disclosure, the guidance space 13 has a height H2 at the collection hole entrance 13*a* to the guidance space 13 from the spacer storage compartment 11 which is less than 1.4 times the spacer height H1, the height H2 of the guidance space 13 at the entrance is smaller than the spacer width W1. This height may be substantially constant for the entire guidance space 13 between the surfaces 17*a*, 17*b*, or may at least be the case/present for/at the collection hole entrance 13*a* to assure that only one spacer enters the guidance space. In some embodiments, the height H2 may be larger at other locations than at the entrance 13*a*.

The edge 28 (See FIG. 3*b*) of the housing 12 proximate the guidance space 13 (and the surface of the housing above the entrance 13*a*) at the entrance 13*a* will, due to the said guidance space 13 height H2, retain/detain spacers 2 in the spacer storage compartment 11. This helps to provide that only one spacer 2 at the time is allowed to enter into the guidance space, and that spacer 2 is the spacer collected in the collection hole 15*a*.

Hence, the distance between the surface 15*b* of the collection sheet 15 and the housing surface 17*a* is less than the spacer height H1, such as less than half of the spacer height.

In embodiments of the present disclosure, guidance space 13 has a height H2 that is between 1.05 and 1.4 times, such as between 1.1 and 1.3 times the spacer height H1.

It is understood that in embodiments of the present disclosure, the spacers 2 may have a spacer height H1 of less than 0.5 mm such as less than 0.3 mm, such as less than 0.25 mm. For example, the spacer height H1 may be 0.2 mm or less.

The surfaces 17*a* and 17*b* may help to maintain guidance of the collection sheet 15 and the collected spacer 2, and/or help to maintain collection sheet integrity and/or shape over time.

In embodiments of the present disclosure, the height H2 of the guidance space 13 is less than 0.5 mm, such as less than 0.3 mm, such as less than 0.25 mm.

In embodiments of the present disclosure, the height H2 of the guidance space 13 is less than 1.5 times, such as less than 1.3 times the thickness TH1 of the disc shaped collection sheet 15.

In FIG. 3*c*, the spacer has been moved to be aligned with/opposite to the spacer outlet 16 at the bottom part 12*b* in the bottom 12*bo* of the housing 12. This provides that the collected spacer 2 is dropped into the spacer outlet 16 from the collection hole 15*a*, and from there out of the spacer outlet. The spacer outlet 16 may in embodiments of the present disclosure be larger than the collection hole, which may increase the chance of the spacer 2 dropping into the outlet 16 from the collection hole 15*a*. The collection hole hence both provides a collection sheet inlet for a spacer at the spacer storage, and a collection sheet outlet at the spacer outlet 16.

Gravity may induce the dropping of the collected spacer into the spacer outlet, but one or more of applied vibrations, pressurized air and/or the like may in further embodiments of the present disclosure help the spacer 2 to drop into the outlet.

As can be seen, the spacer 2 is designed with the predefined, pre-shaped contact surfaces 2*a*, 2*b*. These 2*a*, 2*b* are shaped so that when the dispenser 10 dispenses the spacer 2, the spacer 2 will generally land on the glass sheet surface 3*a* and support on one of the first and second contact surface 2*a*, 2*b*.

In some embodiments, if the side edge surface (see e.g. FIGS. 2*a* and 2*b* and other figures described further below) are convexly shaped and extending between the contact surfaces, this may increase the chance of the spacer not staying at the side surface 2*c* when it is dispensed.

Figure 4A:
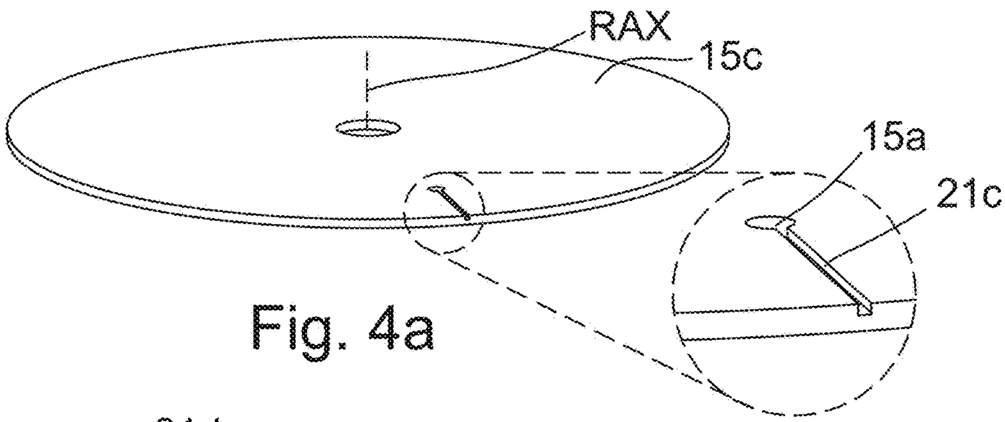
FIGS. 4*a*-4*b*: illustrates a dispenser comprising a vacuum path according to various embodiments of the present disclosure.
Figure 4B:
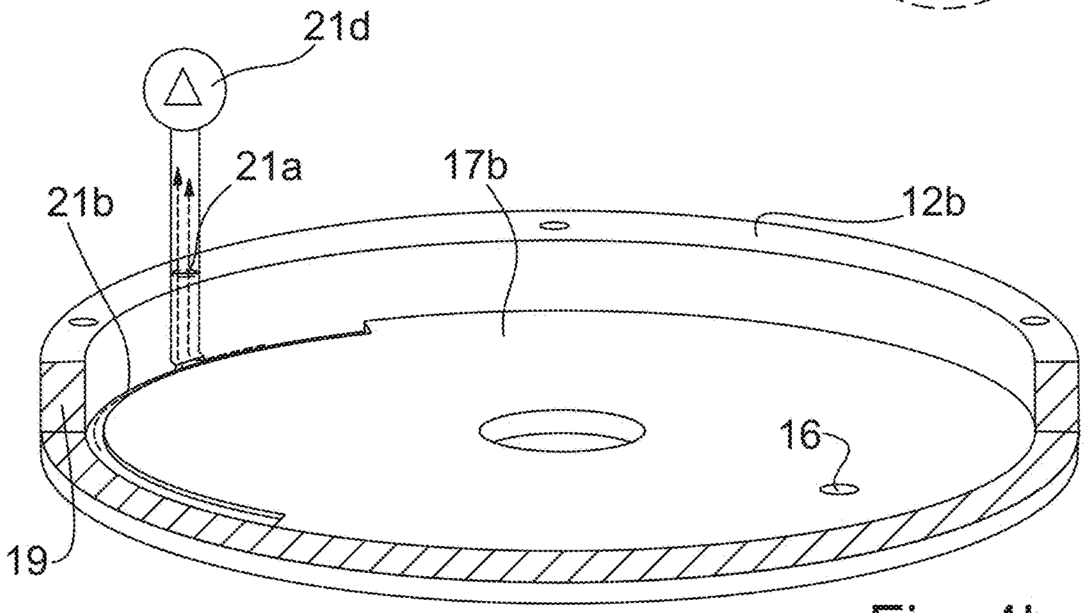

FIGS. 4*a*-4*b* illustrates schematically and in perspective the dispenser 10 comprising a vacuum path according to embodiments of the present disclosure. Here, vacuum path 21*a*, 21*b*, 21*c*, such as one or more vacuum channels are connected to a vacuum pump 21*d*, and the vacuum pump provides suction in the vacuum path so as to help a spacer 2 of the spacer storage compartment 11 to enter into the collection hole 15*a*.

As illustrated in FIG. 4*a*, the collection sheet may comprise a part 21*c* of the vacuum path integrated therein, in the illustrated example a such as a channel, such as a recessed channel/slit extending from the collection hole 15*a* and towards the periphery 15*d* of the collection sheet. This channel may help to provide a suction in the collection hole when the hole is arranged to collect spacer from the spacer storage 11. In FIG. 4*a*, the collection sheet is turned upside down, and the surface 15*c* is the surface that will face away from the spacer storage 11 during dispenser operation.

In other embodiments, the vacuum channel in the sheet 15 may extend from the collection hole towards the centre portion of the collection sheet, and the vacuum path may hence e.g. be arranged together with and/or inside a shaft for rotating the sheet, or a stationary part extending from the centre of the sheet 26 dependent on the constitution of the dispenser.

FIG. 4*b* illustrates an additional or alternative embodiment of the present disclosure wherein the housing 12 comprises at least a part 21*b* of the vacuum path. Here the housing bottom part 12*b* comprises a recessed channel 21*b*, in the illustrated example an elongated, curving channel, arranged to abut the guidance space 13. The channel 21*b* provides a fluid communication between the collection hole 15*a* of the collection sheet 15 and a suction outlet of the housing connected to the vacuum pump 21*d* when the collection hole 15*a* is arranged at the bottom of the spacer storage compartment 11 to collect a spacer 2 from the bottom of the spacer storage compartment 11. This channel 21*b* may additionally or alternatively be arranged at the upper part 12*a*.

The housing 12 may additionally or alternatively comprise a vacuum space, such as a vacuum channel, arranged opposite to a major surface of the collection sheet, wherein the vacuum in the vacuum space provides a suction at the collection hole 15*a* when the collection hole is arranged at the bottom of the spacer storage compartment to collect a spacer from the bottom of the spacer storage compartment.

It is understood that in some embodiments of the present disclosure, the vacuum path may be designed so that when the collection hole is not arranged at the bottom of the spacer storage compartment, but e.g. is arranged in the guidance space opposite the spacer outlet or in the guidance space between opposing surfaces of the bottom part of the housing and the upper body part, the vacuum/suction in the collection hole may be reduced or omitted/prevented.

The vacuum path may comprises an elongated, curved vacuum channel 21*b* extending around the rotation axis RAX, such as at least 45° around the rotation axis, for example at least 80° around the rotation axis RAX.

The vacuum path may comprise comprises an elongated, curved vacuum channel 21*b* extending less than 270° around the rotation axis RAX, such as less than 190° around the rotation axis RAX.

Figure 5:
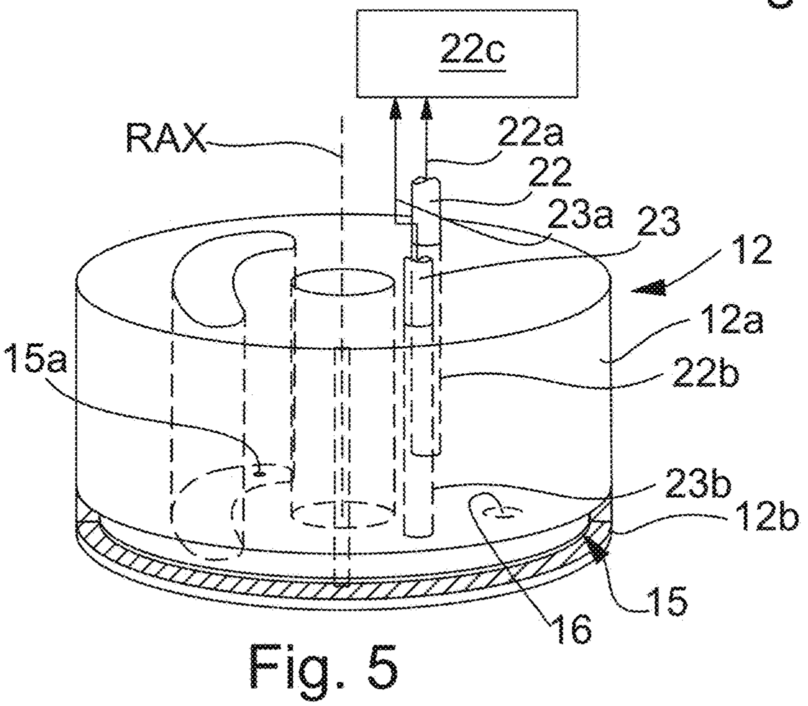
FIG. 5: illustrates a dispenser comprising a sensor system according to embodiments of the present disclosure.

FIG. 5 illustrates schematically an embodiment of the present disclosure, where the dispenser 10 comprises a part of a sensor system. The sensor system comprises one or more sensors. 22, 23. For example one or more sensors 22, 23 such as one or more optical sensors, ultrasonic sensor(s) and/or the like. The sensor(s) 22, 23 is/are configured to detect if a collected spacer 2 is present in the collection hole 15*a*, and the sensor system provides one or more sensor outputs 22*a*, 23*a* comprising information of if a collected spacer 2 is present in the collection hole 15*a*.

In FIG. 5, the spacer sensor 22 is configured to detect if a collected spacer 2 is present in the collection hole prior to the collection hole being arranged opposite to the spacer outlet 16. This may e.g. be provided during the further rotational movement provided in order to move the collected spacer from the storage 11 to the spacer outlet. The spacer sensor 22 provides a sensor output comprising information of if a collected spacer is present in the collection hole 15*a*.

In FIG. 5, the spacer sensor 23 is configured to detect if a collected spacer 2 is present in the collection hole 15*a* after the collection hole has been arranged opposite to the spacer outlet 16. The spacer sensor may also be considered/referred to as an unloading sensor. The unloading sensor 23 detects if a collected spacer 2 is present in the collection hole 15*a* subsequent to the collection hole 15*a* being arranged opposite to the spacer outlet 16.

The output 22*a* from the sensor 22 and/or the output 22*a* from the sensor 23 is received by a controller 22*c*, such as a hardware processor 22*c*, such as a micro controller, microprocessor, FPGA or the like. The controller 22*c* can hence, based on the sensor output 22, determine if a spacer should be dispensed dependent on if a spacer is present in the collection hole 15*a* or not.

If a spacer 22 was detected in the collection hole by sensor 22, but a spacer was not detected by sensor 23, it may be concluded that a spacer has been collected and dispensed.

If a spacer 22 was detected in the collection hole by sensor 22, but a spacer 2 is still detected by sensor 23, it may be concluded that a spacer has clogged the collection hole or the spacer outlet 16 (in the latter case a spacer or a foreign object may clog the spacer outlet 16).

If a spacer 22 was not detected in the collection hole by sensor 22, it may be concluded that the collection sheet did not succeed in collecting a spacer from the storage 11, and a further turn around the rotation axis may be needed to try to collect a new spacer e.g. by means of the same or another collection hole of the collection sheet.

Hence, the controller 12*c* may provide a warning, a control output and/or the like so that the glass sheet will not be moved further before a spacer 2 has been collected and dispensed, it may provide a warning that the glass sheet may not have received the desired number of spacers and/or the like.

In embodiments of the present disclosure, output from the sensor system 22, 23 may be used by a counter (e.g. a counter of the controller 22*c*) for counting the number of spacers 2 dispensed by the dispenser.

In FIG. 5, the sensor or sensors 22, 23 of the sensor system is/are arranged in and/or supported in the upper body part 12*a*, such as in a bore or channel 22*b*, 23*b* arranged opposite to a major surface 15*b* of the collection sheet 15 facing away from the spacer outlet 16. In other embodiments of the present disclosure, the sensor or sensors, or a part thereof, may be arranged in the bottom part 12*b*, such as in the bottom wall comprising the surface 17*b* (see e.g. FIG. 1*a*).

The sensor 22 and/or 23 may have a detection/monitoring zone and/or monitoring/detection direction. The sensor(s) 22, 23 may be arranged so that this detection/monitoring zone and/or monitoring/detection direction is placed opposite to the travel path of the collection hole 15*a* to be able to detect if a spacer is present in the hole 15*a*. Hence, when the hole 15*a* travels in it's travel path (or the housing is rotated dependent on the rotation solution), the hole enters in and out of the detection/monitoring zone of the sensor or sensors 22, 23. Hence, when the housing or collection sheet has rotated 360 degrees around the rotation axis RAX, it will have entered the detection zone of the sensor(s) 23, 22.

In some embodiments of the present disclosure, the sensor output may be correlated with information of the rotational position of the housing and/or collection sheet, for in order to determine when the collection hole should be within the monitoring zone.

In embodiments of the present disclosure, the sensor/sensors 22, 23 and/or a controller 22*c* may be calibrated or in other ways adapted to be able to distinguish between detecting the major surface 15*b* of the collection sheet and the surface 17*b* of the housing. In some embodiments, the sensor or sensors 22, 23 may be a distance sensor.

In embodiments, the sensor or sensors 22, 23 may e.g. be sensor(s) configured to provide different sensor output 22*a* 23*a* dependent on the characteristics of the surface 15*b*, 17 and or contact surface 2*a*/2*b*. Here, at least two of these surfaces may provide/comprise different surface characteristics that will trigger the sensor(s) to provide different output 22*a*, 23*a*. For example based on difference in surface structure, surface colour, surface reflection properties and/or the like. For example one of the surfaces 2*a*/2*b*, 17*b*, 15*b* may be configured so that it will return an optical sensor signal, such as a changed polarization, when compared to the returned another of the surfaces.

Figure 6:
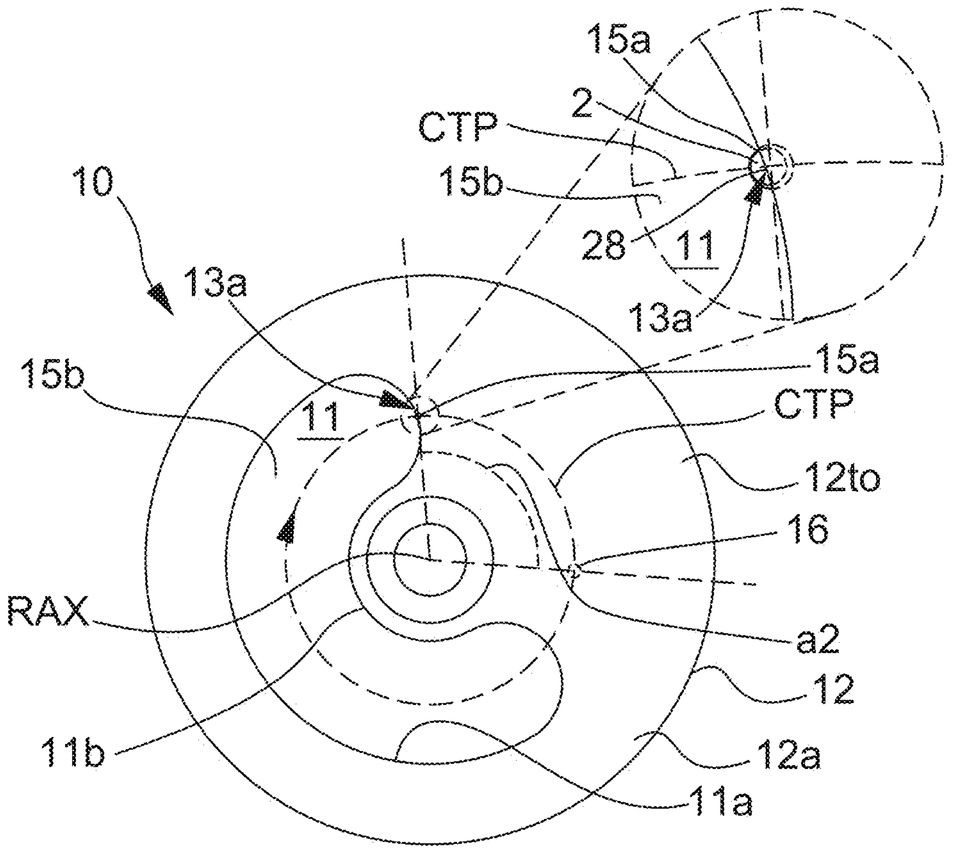
FIG. 6: illustrates a repeated travel path of a collection hole of a dispenser according to embodiments of the present disclosure.

FIG. 6 illustrates schematically a dispenser 10 according to embodiments of the present disclosure, seen towards the housing 12 top 12*to*. In FIG. 6, the continuous/repeated travel path CTP of the collection hole 15*a* is illustrated by a dashed circle. The circular continuous/repeated travel path/travelling path CTP has the center coinciding with the rotation axis RAX. In FIG. 6, the collection hole 15 is illustrated at the position where the collection hole 15*a* with a collected spacer enters into the guidance space 13. See also FIG. 3*b*. The rotational angle a2 between the collection sheet 15 and the housing 12 around the rotation axis RAX from the storage 11 (may be measured from edge 28) to align the collected spacer 2 in the collection hole 15*a* opposite to the spacer outlet 16 may in embodiments of the present disclosure be at least 85°, such as at least at least 120°, for example at least 170°.

Figure 7:
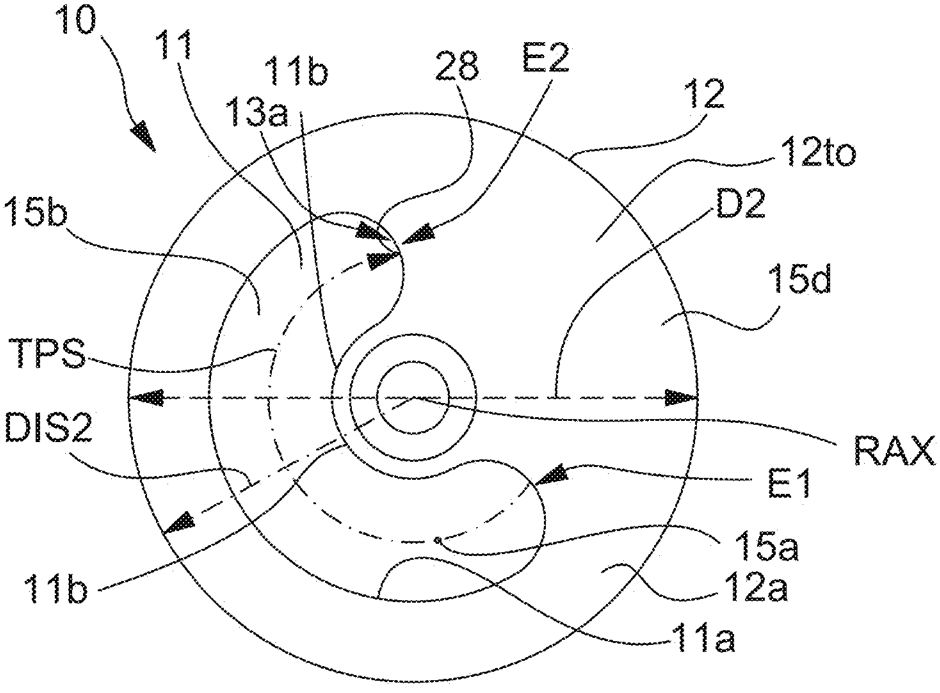
FIG. 7: illustrates a curved traveling path of a collection hole at the bottom of a spacer storage compartment according to embodiments of the present disclosure.

FIG. 7 illustrates schematically a dispenser 10 according to embodiments of the present disclosure, seen towards the housing 12 top 12*to*. In this embodiment, the length of the curved traveling path TPS of the collection hole 15*a* at the bottom of the spacer storage compartment 11 is illustrated.

The length of this travel path TPS is a subset of the continuous/repeated travel path CTP for the collection hole 15 illustrated in FIG. 6.

The length of the travel path TPS in the storage 11 may in embodiments of the present disclosure be at least 0.7 times, such as 0.9 times, such as at least 1.2 times, such as at least 1.8 times, the distance DIS2 between the rotation axis RAX and the outer periphery of the dispenser housing 12. For example, in FIG. 7, as the housing 12 is here depicted as having a circular outer periphery, the length of the collection hole 15*b* travel path TPS in the storage 11 may be at least 0.9 times, such as at least 1.2 times, such as at least 1.8 times, the housing 12 radius, i.e. D2/2.

In embodiments of the of the present disclosure, the length of the travel path TPS of the collection hole 15*a* in/across the storage bottom 11 may be more than 90° such as more than 140° such as more than 170°.

It is generally understood that the spacer storage compartment 11 in embodiments of the present disclosure may be integrated in, such as milled into, the upper part, and the storage compartment 11 comprises a loading opening spacer inlet at the dispenser housing 12 top.

In FIGS. 6 and 7, side wall surfaces 11*a*, 11*b* of the upper body part 12*a* abuts and faces the spacer storage compartment 2. The spacer storage compartment 11 is defined between the opposing side wall surfaces 11*a*, 11*b*, and the side wall surface 11*b* facing and enclosing a part of the spacer storage compartment 2, and which is placed proximate the rotation axis RAX is convexly shaped. In the example of FIGS. 6 and 7, a part of the convexly shaped side wall surface 11*b* is shaped to be coaxial with the rotation axis RAX, in other embodiments, a part of the convexly shaped side wall surface 11*b* may be shaped to be non-coaxial with the rotation axis RAX. The opposing surface 11*a* is concavely shaped, it 11*a* may be shaped to be coaxial with the rotation axis RAX (as illustrated), but in other embodiments it 11*a* may not be coaxial with the axis RAX.

As can be seen from among others FIGS. 6-7, the spacer storage compartment 11 may in embodiments of the present disclosure be elongated and extend partly around the rotation axis RAX, and this may provide that the spacer storage compartment 11 is arc shaped, and may be longer (e.g. defined by length of the travel path TPS) than it is wide. The opposing side walls are connected at end parts of the storage 11.

In embodiments of the present disclosure, the storage 11 may as e.g. illustrated in FIGS. 6 and 7 be shaped and placed so that the collection hole 15*a* enters the compartment at one storage compartment 11 end E1. The hole 15*a* then leaves the storage at the other/another storage compartment 11 end E2 below/opposite to the edge 28 with a collected spacer therein.

In FIGS. 6 and 7, the collection hole 15*a* enters the guidance space 13 at the entrance 13*a* at the end part E2 of the elongated and curved spacer storage 11. In FIGS. 6 and 7, the spacer storage 11 is curved/arc shaped and describes a part of a circle that extends substantially coinciding with the rotation axis RAX around which the sheet 15 may be rotated.

In other embodiments, at least a part of the spacer storage 11 may be curved/arc shaped and/or may comprise a part, such as a straight part or a curved part shaped to be non-coincident with the rotation axis RAX. This may e.g. be provided at the area where the collection hole exits the spacer storage, so that the collection hole exits the spacer storage 11 at another location than at an end E2 of the elongated storage 11, for example underneath an edge of the side wall 11*b*. See e.g. FIGS. 22 and/or 27A-28.

Figure 8:
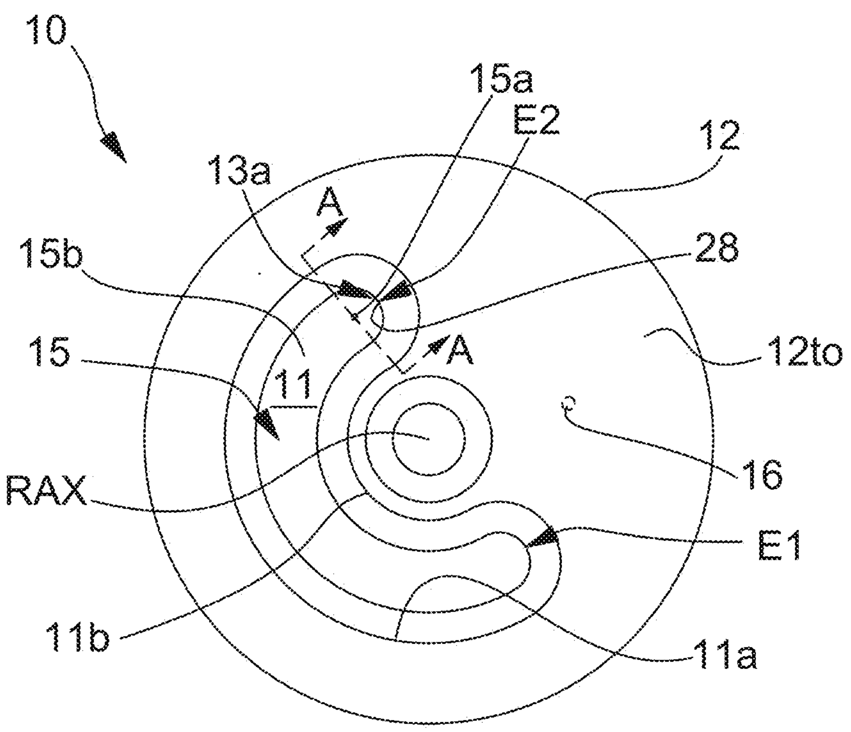
FIGS. 8-9: illustrates side wall surfaces enclosing a spacer storage compartment which narrows towards a collection sheet, according to embodiments of the present disclosure.
Figure 9:
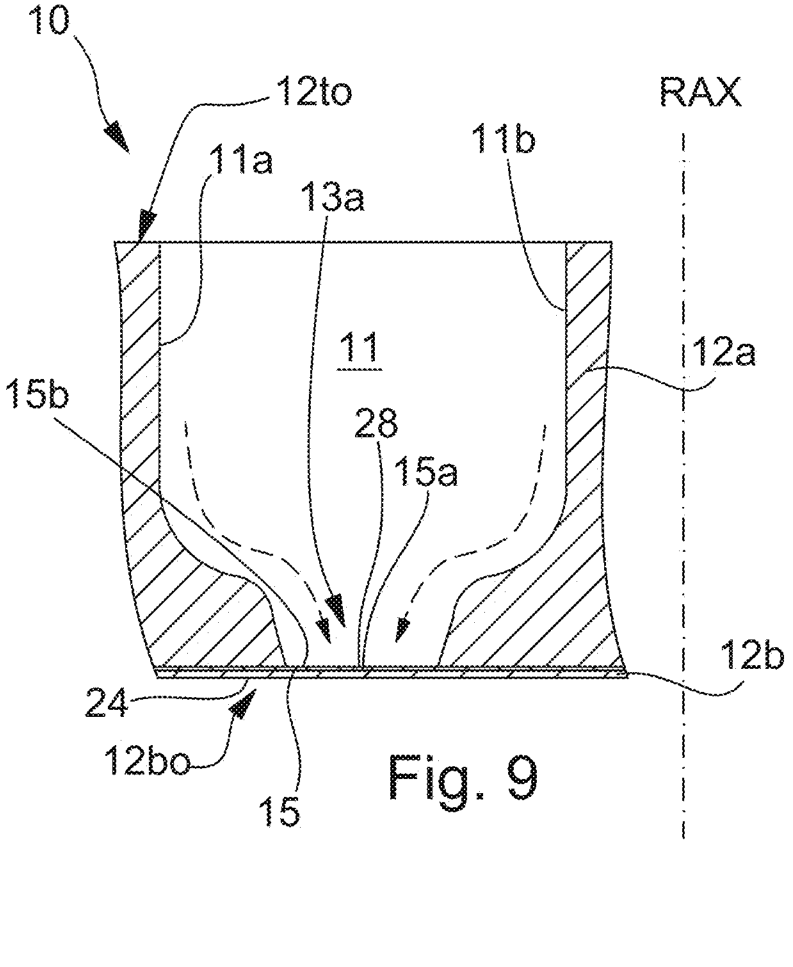

FIGS. 8 and 9 illustrates schematically embodiments of the dispenser according to embodiments of the present disclosure, where the side wall surfaces 11*a*, 11 *b* enclosing the spacer storage compartment 11 narrows in a direction towards the disc shaped collection sheet 15 surface 17*b*. Hence, the distance between the surfaces 11*a*, 11*b* may reduce, such as gradually reduce, towards the collection sheet 15. This may e.g. provide a funnel shaped storage compartment 11.

FIG. 8 illustrates the dispenser seen towards the dispenser housing top 12*to*, and FIG. 9 illustrates schematically a cross sectional view A-A of a part of the housing 12 illustrated in FIG. 8, seen in a direction towards the storage 11 end E2 and towards the entrance 13*a* for the collection hole 15*a* to the guidance space.

The narrowing of the walls 11*a*, 11*b* in a direction towards the disc shaped collection sheet 15 surface 15*b* This provides, in FIGS. 8-9, that the compartment 11, proximate the housing top 12*to* may be larger than at the compartment bottom proximate the sheet surface 15*b* as e.g. illustrated in FIG. 9.

In embodiments of the present disclosure, the volume of the uppermost 25% of the storage compartment 11 proximate the housing 12 top 12*to* may be at least 10% such as at least 30% such as at least 50% larger than the volume of the lowermost 25% of the storage compartment 11 proximate the sheet 15 surface 15*b* at the storage bottom.

This provides that over time when spacers 2 are collected from the storage 11 by means of the hole 15*a*, the spacers in the storage 11 will be gradually guided towards the storage bottom at the sheet surface 15*a*, and the funnel shape may moreover provide that the spacers at the lower parts of the storage are guided towards the travel path of the collection opening as illustrated by dashed arrows in FIG. 9.

Gravity acts on the spacers 2 in the storage 11 and provides that the weight of the spacers 2 in the storage acts towards the sheet surface 15*a*, which may help, e.g. together with the funnel shape (if present), to increase the chance of collecting a spacer by the collection hole 15*a*.

Figure 10:
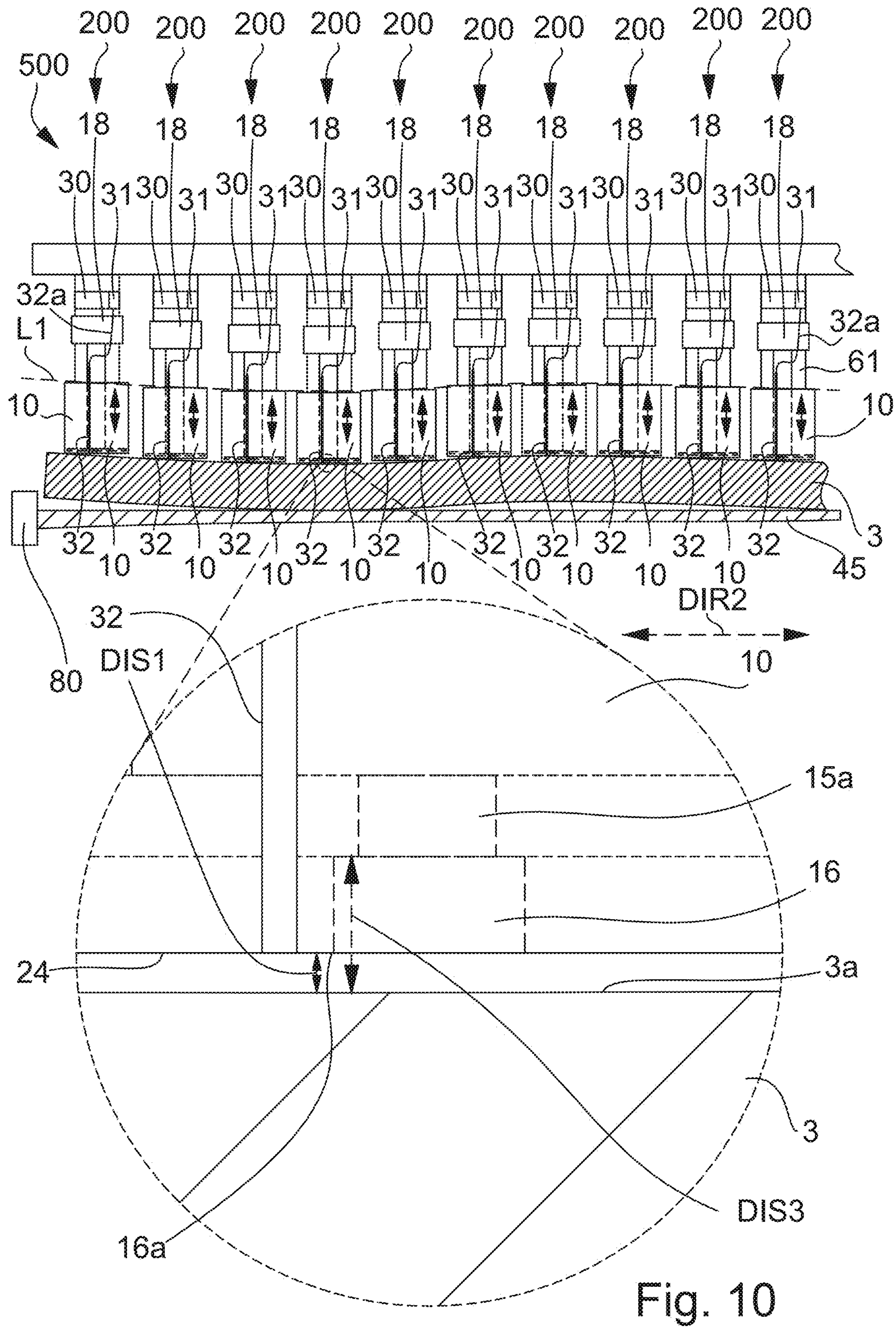
FIG. 10: illustrates a dispenser array according to embodiments of the present disclosure.

FIG. 10 illustrates schematically an embodiment of the present disclosure wherein a plurality of dispensers 10 of dispenser systems 200 are arranged in an array 500, in this case side by side, transverse to the movement direction of the glass sheet (or the array 500) in a direction along the glass sheet surface 3. Hence, the dispensers 10 of the array may dispense a row of spacers, for example simultaneously, onto the glass sheet surface. This may e.g. increase manufacturing speed when compared to using only one or a few dispensers to place the spacers at the glass sheet surface 3*a*.

The dispensers are arranged e.g. side by side in a dispenser distribution direction DIR2 that may be transverse to the movement MOV1 (see e.g. FIG. 11) direction with which a motor or the like provides a relative displacement between the array 15 and the glass sheet 3 along the glass sheet surface 3*a*.

The array 50 may in embodiments of the present disclosure comprise between 4 dispensers and 80 dispensers, such as between 4 dispensers and 50 dispensers, such as between 4 dispensers and 30 dispensers. Each dispenser may be part of/comprised in an individual spacer dispensing system 200.

The spacer dispensing systems 200 may each comprise a spacer storage 11, for example a spacer storage arranged in the housing 12 as previously described, and the storage 11 comprises a plurality of spacers 2. Moreover, the spacer dispensing system 200 may comprise a dispenser 10, such as a dispenser of the type described above in accordance with various embodiments. Each dispensing system 200 comprises a spacer outlet 16 for dispensing spacers 2 collected from the spacer storage 11, In the illustrated embodiment a spacer outlet 16 provided in a dispenser housing 12.

In FIG. 10, one or more, such as each, dispensing system 200 may comprise a distance adjustment motor 30 configured to move the spacer outlet 16 of the respective system 200 towards and/or away from the glass sheet surface 3*a*. In other embodiments of the present disclosure, the motor 30 may be omitted, and the outlets may hence not be moved towards or away from the glass sheet surfaces, at least not individually.

Distance controllers 31 are configured to control distance adjustment motors 30 to move the spacer outlet 16 towards and/or away from the glass sheet surface 3*a* during the spacer placement sequence based on output 32*a* from a distance sensor 32. This distance control is configured so as to adapt the surface 3*a* to spacer outlet 16 distance DIS1 to the local surface topology of the major glass sheet surface 3 opposite to the spacer outlet 16 one or more times, such as continuously, during a spacer placement sequence.

It is generally understood that a spacer placement sequence comprises placing a plurality of spacers 2 at the major glass sheet surface 3*a* by means of the dispenser(s) 10. Here, the spacer placement sequence comprises providing relative movement between the glass sheet surface 3*a* and the spacer outlet 6 in a direction along the glass sheet surface by means of a displacement motor 80, such as an electrical motor, and distributing a plurality of spacers 2 from the spacer storage 11 with a mutual spacer distance DIS4 (see FIG. 11) on the glass sheet surface 3*a* by means of the dispenser 10 through the spacer outlet 16.

The glass sheet is placed on a support 45, such as conveying means, for example a movable table or plate, a conveyer band or chains, rollers and/or the like, e.g. so that the surface 3*a* extends horizontally, and the motor 80 moves the glass sheet relative to the systems 200. In other embodiments, the motor 80 may be configured to move the array 500/system(s) 200 instead.

In the example of FIG. 10, the array 500 may place/dispense, such as drop, a row of spacers 2 onto the surface, then the glass sheet 3 (or array) is moved a predetermined distance, a new spacer 2 row is dispensed and so on until the desired amount of spacers are distributed at the surface 3*a*. Instead of stepwise, predefined movement of the glass sheet or array, a continuous movement may also be provided and the dispensing of spacers may be timed according to the relative displacement speed along the surface 3*a*.

For example, the glass sheet 3 may be a tempered glass sheet, for example a thermally tempered glass sheet. Such glass sheets may provide advantages with regards to strength, and tempered glass sheets may be cost efficient. However, for example thermally tempered glass may have a glass sheet surface 3*a* with an unevenness of at least 0.1 mm, such as at least 0.2 mm, for example at least 0.3 mm. In some embodiments, the glass sheet 3, 4 surface 3*a*, 4*a* unevenness may even be equal to or larger than the spacer height H1.

The distance controller 31 may e.g. help to provide that the dispenser outlet 16 can get close enough to the glass sheet surface 3*a* to reduce the risk of spacer 2 misplacement during the spacer placement sequence when arranging spacers s on the glass sheet surface.

For example, the distance setting may be set to e.g. 0.1 mm, and hence, the distance controller provides adjustment/adaption of the spacer outlet 16 to glass surface 3*a* distance during the spacer placement sequence so that the outlet is maintained substantially at 0.1 mm from the glass sheet surface during spacer dispensing in spite of the glass sheet surface being uneven.

In one or more embodiments of the present disclosure, the distance controller 21 controls the distance adjustment motor 30 to move the spacer outlet 16 towards and/or away from the glass sheet surface during the spacer placement sequence based on a distance setting DSE and output from a distance sensor.

In one or more embodiments of the present disclosure, distance sensor 32 may comprise an optical sensor, such as a fibre optic sensor, or an ultrasonic sensor or another suitable type of sensor.

Figure 11:
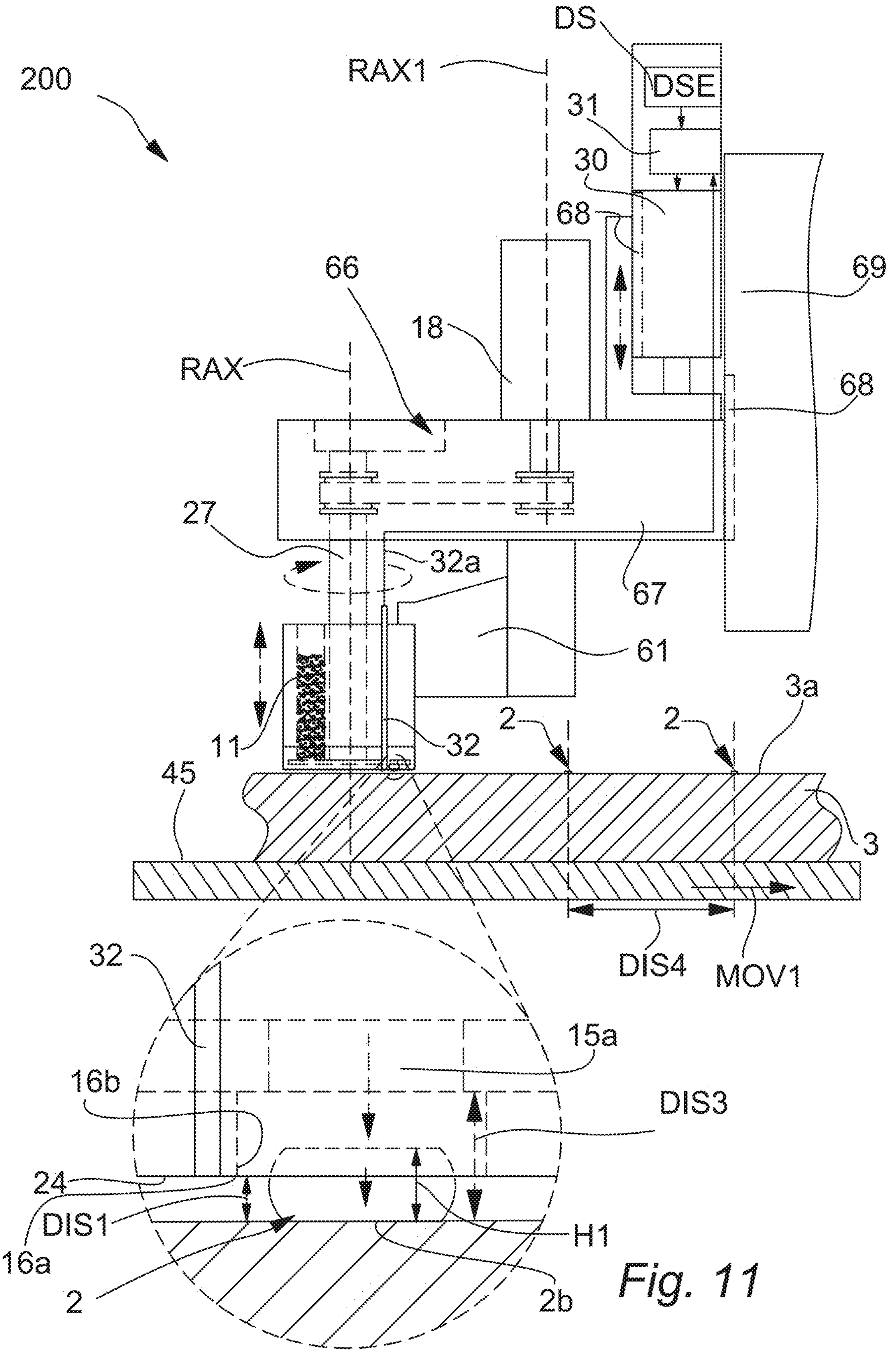
FIG. 11: illustrates a dispenser system according to embodiments of the present disclosure.

The spacers 2 are placed one by one, consecutively, at the glass sheet surface 3*a* by means of the respective dispenser, see also FIG. 11. A relative movement between the glass sheet surface 3*a* and the spacer outlet in a direction along the glass sheet surface by means of a displacement motor is provided between each consecutive placement of a spacer by means of the dispenser.

The distance controller may comprise one or more hardware processors, such as one or more microcontrollers, Field-Programmable Gate Arrays (FPGA), Programmable Logic controllers (PLC), microprocessors and/or the like. For example, the hardware processor may comprise one or more general-purpose hardware processors.

Generally, a system controller (not illustrated in FIG. 10) comprising one or more hardware processors (such as one or more of the above mentioned types) may based on a computer implemented software program and control circuitry control the movement and/or movement speed of the displacement motor and the dispensing of spacers, e.g. in order to time the spacer dispensing and start/stop and/or movement speed of the displacement motor. The system controller may e.g. control one or more of the displacement motor 80, a drive motor 18, a vacuum pump 21*d*, a compressor for providing pressurized air a and or the like as described in this document based on a computer implemented software program in a data storage and possibly also one or more sensor input. Such sensor input may comprise be position information, speed information, input from sensors detecting if a spacer has been collected and/or dispensed, and/or the like.

In some embodiments of the present disclosure, the distance controller 31 and the system controller may be the same controller or may be provided by means of different hardware controllers, such as distributed hardware controllers.

For example, in some embodiments, the distance adjustment motor, such as a servo motor, may comprise a hardware controller and regulation circuitry, and may handle the distance control based on direct sensor input or sensor input suppled from another hardware controller. Such a controller may e.g. receive distance-setting input supplied from e.g. a separate hardware controller.

As can be seen in FIG. 10, the dashed line L1 illustrates that the dispensers 10 have been adapted in height relative to the glass sheet surface, so that each outlet 16 has substantially the same distance DIS1 to the glass sheet surface 3*a*, and hence, the dispensers 10 are displaced/height adjusted individually relative to a horizontal plane (not illustrated).

In several of the figures described above, the disc shaped collection sheet 15 is arranged at the lower fourth, such as the lower sixth, such as the lower eighth of the housing 12, proximate the bottom wall 24*a* of the housing.

In one or more embodiments of the present disclosure, the horizontal distance between adjacent spacer outlets 16 in the spacer array 500 may be between 20 mm and 70 mm, such as between 25 mm and 45 mm. This In this case, the adjacent outlets 16 are aligned and abuts the same horizontal plane.

In one or more embodiments of the present disclosure, the horizontal distance between adjacent spacer outlets of more than 50% or more than 60% of the spacer outlets of the spacer dispensing array 500 may be between 20 mm and 70 mm, such as between 25 mm and 45 mm.

FIG. 11 illustrates schematically a dispensing system 200 according to further, various embodiments of the present disclosure.

The distance controller 31 comprises distance regulation circuitry. This may provide closed loop distance control, such as by means of one or more of Proportional, Integral and/or derivative (PID) control. This closed loop control is based on the output 32*a* from the distance sensor 32 and at least a distance setting DSE stored in a data storage DS during the spacer placement sequence. Naturally, other regulation settings may be stored in the data storage that may be used by the controller 31. The controller 31 hence may control the distance adjustment motor 30 based on the setting DSE and the sensor output 32*a* during the spacer placement sequence.

The distance controller 31 may monitor a distance representative of a distance DIS1 between the glass sheet surface 3*a* and the spacer outlet 16. For example, a predefined distance may be used for the monitoring, and this distance may e.g. be larger than the distance DIS1. This may e.g. be acceptable as long as a distance offset is known.

In one or more embodiments of the present disclosure, the distance setting DSE comprises one or more distance set points such as a distance target setting or a distance range setting representing a desired distance.

The distance sensor 32 may in embodiments of the present disclosure monitor the distance DIS1 between the glass sheet surface 83*a* and the spacer outlet 16 directly or indirectly.

The dispenser housing 10 is attached to a dispenser holding part 61 of the dispenser system 200. The dispenser holding part 61 is attached to or integrated in a height adjustable movable frame part 67. This part 67 that can be displaced vertically by the motor 31 relative to a fixed frame part 69. The movable frame part 67 is connected to, such as attached to, the fixed frame part 69 by means of a displaceable connection such as a rail solution, an actuator and/or the like 68. The movable frame part 67 may thus hang directly or indirectly from the fixed frame part 69. The fixed frame part may in embodiments of the present disclosure comprise a plurality of dispensing systems 200, such as an array 500 as previously described.

The drive motor 18 may as illustrated, in embodiments of the present disclosure, be attached to the movable frame part 67.

FIG. 11 moreover discloses an embodiment of the present disclosure, wherein the rotation axis RAX1 of the drive motor 18 is displaced, in this embodiment displaced parallel, relative to the rotation axis RAX. Hence, the dispenser system 200 may comprise an interconnecting drive arrangement 66 comprising one or more of a chain drive, belt drive, a toothed wheel system such as a gearing system and/or the like which transfers the rotary motion of the motor 18 to the collection sheet 15 through the shaft 27. The dispenser 10 is in FIG. 11 placed below a movable frame part 67.

In other embodiments, RAX1 and RAX may be coincident.

FIG. 11 illustrates a further embodiment of the present disclosure, wherein the distance controller 31 controls the distance DIS1 between the glass sheet surface 3*a* and the spacer outlet 16 to be less than the spacer height H1 of the spacers 2 (H1>DIS1), at least while the spacers 2 are delivered to, such as dropped onto, the glass sheet surface 3*a* by the dispenser. A wall surface or an edge/corner 16*b* of the dispenser 10, which encloses the dispenser 10 outlet 16, prevents the dispensed spacer 2 from rolling, bouncing or the like beyond the outer periphery described by the dispenser opening 16. The spacer outlet opening size and/or shape may thus defines define the maximum limit for a possible spacer movement and displacement of the spacer during dispensing the spacer, for example until the spacer rests as desired on the glass sheet surface.

In other embodiments, DIS1 may be larger than H1.

During a spacer placement sequence, and/or between spacer placement sequences, the distance controller 31 may hence displace the dispenser(s) towards and/or away from the glass sheet surface 3*a*.

It is generally to be understood that the dispenser 10 used in the system(s) 200 according to various embodiments of the present disclosure may in embodiments of the present disclosure be of the rotary type as e.g. described according to various embodiments above and/or further below. However, in other embodiments of the present disclosure, the dispensers 11 used in the system(s) 200 where for example distance control is provided may be of another type such as of the reciprocating collection member/sheet dispenser type or another type.

The distance sensor 32 may in embodiments of the resent disclosure be attached to the dispenser housing, and hence move together with the housing when the motor 30 displaces the housing towards and away from the glass sheet surface 3*a*.

In some embodiments, the sensor 32 may be arranged in the housing 12 of the dispenser 10. In other embodiments it may be attached to/at the outside of the dispenser 10 housing. In still further embodiments of the present disclosure, the sensor 32 may be attached directly or indirectly to the height adjustable movable frame part 67 for example attached to the dispenser holding part 61.

In FIG. 10, the spacer dispensing array 500 comprises a plurality of spacer dispensing systems 200, for example a plurality of systems 200 as illustrated in FIG. 11. A distance controller 31 provides an individual adjustment of the spacer outlet 16 of the dispenser 10 of the respective spacer dispensing system 200 of the dispensing array in a direction towards and/or away from the glass sheet surface 3*a*. This is based on output 32 from a plurality of distance sensors 32 during the spacer placement sequence. For example, each dispensing system 200 may comprise its own sensor assigned to provide sensor output for use as a regulation parameter for the dispenser comprised in that system.

As can be seen from FIG. 10 the plurality of spacer dispensing systems 200 of the array 500, such as all spacer dispensing systems 200 of the array 500, may each comprises an individual distance controller 31 for providing distance regulation of the spacer output 16 of the respective system.

The distance controller 31 may individually, directly or indirectly, monitor the distance DIS1 between the glass sheet surface 3*a* and the spacer outlet 16 of the dispenser 10 of the respective individual spacer dispensing system 200 based on output from a distance sensor 32*a*. Each individual distance controller 31 may hence in embodiments of the present disclosure individually control the/an individual distance adjustment motor 30 to move the spacer outlet 16 of the dispenser 10 of that spacer dispensing system 200 towards and/or away from the glass sheet surface 3*a*, for example during the spacer placement sequence.

Individual distance adjustment by means of a distance controller may be based on sensor output 32*a* from an individual distance sensor 32 assigned each spacer dispensing system 200. In other embodiments, sensor output from a single sensor 32 may be used as input for regulating spacer outlets 16 of two or more systems. For example, adjacent dispensers may be placed close enough so that a single sensor input may be suable for providing spacer outlet 16 to glass sheet surface 3*a* distance control. The reason for this may be that the surface variation of the surface 3*a* may not vary so much per distance, and/or the outlet may not be arranged so close DIS1 to the surface 3*a* during dispensing, that the surface variation within the spacer distance DIS4 may be critical or become an issue. Hence, for example, in some embodiments, the sensor output 32*a* from a single sensor 32 may be used for, for example common, distance regulation of two or more adjacent dispenser outlets of the array 500, such as for example between two and six, such as between two and four, for example between 2 and 3, adjacent distance outlets (16). This regulation may be provided by e.g. providing a single motor 30 for regulating outlet 16 to glass sheet surface 3*a* distance of a plurality of spacer outlet 16 of adjacent dispensers 10 during the dispensing sequence. In such embodiments (not illustrated), these dispensers may be attached to and moved by means of a common movable frame part 67.

It is understood that in still further embodiments, distance adjustment may be provided for a whole row/array of dispensers, e.g. based on sensor feedback. Hence, no individual distance DIS1 control may be provided during a spacer placement sequence.

In one or more embodiments of the present disclosure, the spacer outlets 16 of the dispensing systems 200 are arranged in a line extending transverse to, such as perpendicular to, the direction of the relative movement MOV1 between the glass sheet surface and the spacer outlet along the glass sheet surface provided by means of a displacement motor 80. In other embodiments, the outlets may be e.g. arranged staggering transverse to, such as perpendicular to, the direction of the relative movement MOV1.

Generally, in one or more embodiments of the present disclosure, the distance DIS4 between adjacent dispensed spacers on the glass sheet surface 3*a* along the movement direction MOV, such as between more than 50% or more than 60%, such as more than 90% of the dispensed spacers 2 may be between 20 mm and 70 mm, such as between 25 mm and 45 mm.

Generally, in one or more embodiments of the present disclosure, the distance DIS4 between adjacent dispensed spacers on the glass sheet surface 3*a* transverse to the movement direction MOV, such as between more than 50% or more than 60%, such as more than 90% of the dispensed spacers 2 may be between 20 mm and 70 mm, such as between 25 mm and 45 mm.

Generally, the distance DIS4 between more than 60%, such as more than 90% or more than 95% of all the dispensed adjacent spacers 2 on the glass sheet surface 3*a* may in one or more embodiments of the present disclosure be between 20 mm and 70 mm, such as between 25 mm and 60 mm, such as between 25 mm and 45 mm.

It is to understood that in other embodiments of the present disclosure, no distance adjustment may be provided by means of the distance controller during the spacer placement sequence.

Hence, for example, the spacer outlet(s) 16 may be maintained a predefined distance from the support 45 (at least corresponding to the glass sheet thickness+spacer height+a smaller distance for clearance). A distance controller may hence adapt the distance DIS1 to fit the glass sheet height and spacer height, but may not provide adjustment during the spacer placement sequence as such. The smaller distance for clearance may in embodiments of the present disclosure be at least half the spacer height H1 (H1/2) or at least H1×2. It may however in embodiments be less than H1×30 such as less than H1×20 or less than H1×10 or less than H1×5.

FIG. 11 illustrates moreover schematically an embodiment of the present disclosure wherein the housing 12 of the dispenser 10 is attached to a dispenser holding part 61 of the dispenser system 200. The holding part 61 holds/fixates the housing 12 in a fixed, un-rotational position and the shaft 27 hence rotates the collection disc 15 inside the housing. If the height adjustment 31 is provided in embodiments of the present disclosure as e.g. described above, the holding part 61 may be attached to or be integrated in adjustable movable frame part 67.

The dispenser holding part 61 is separate to a shaft 27 for rotating the disc shaped collection sheet 15 and/or the housing 12 around the rotation axis RAX.

Figure 12:
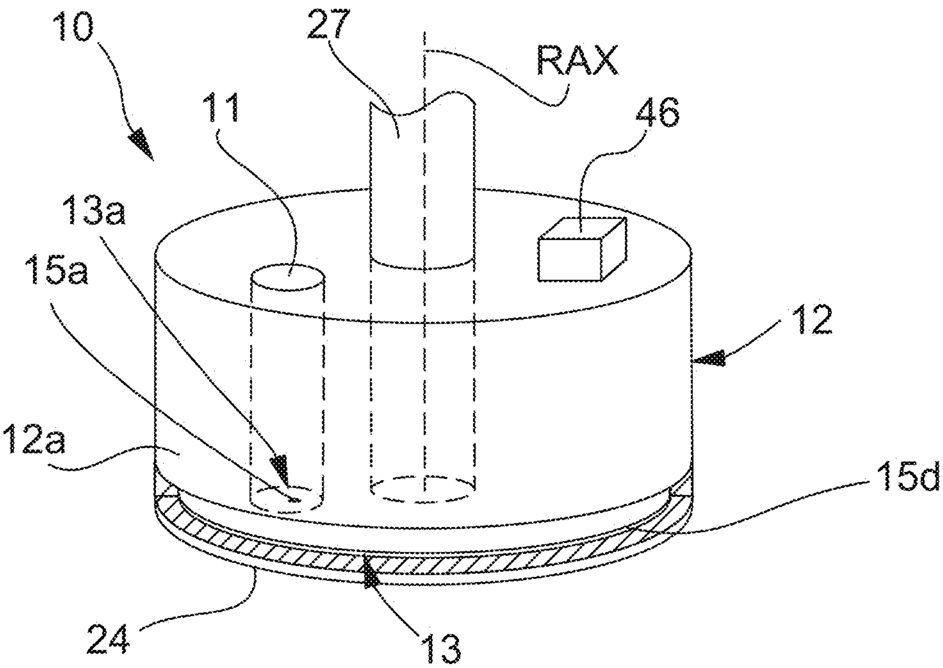
FIG. 12: illustrates a spacer dispenser comprising a vibrator, according to embodiments of the present disclosure.

FIG. 12 illustrates schematically a dispenser/spacer dispenser 10 comprising a vibrator 46 according to embodiments of the present disclosure. The vibrator 45 is controlled by a hardware controller to vibrate (e.g. a central system controller or a distributed controller of at a dispensing station). This provides that at least a part of the dispenser 10, such as the dispenser housing and/or the collection sheet 15 vibrates. This may in embodiments of the present disclosure help to increase the chance of a spacer moving into the collection hole. The vibrations may be provided by the vibrator 46 while the collection hole moves through/swipes the storage 11 bottom. Additionally or alternatively, the vibrations may provide that the spacers 2 are “shaken” and moves inside the storage 11 to change e.g. orientation. The vibrations provided by the vibrator 46 may in embodiments of the present disclosure be above 1 Hz, such as above 100 Hz, such as above 1000 Hz. The vibrations provided by the vibrator 46 may in embodiments of the present disclosure be between 0.5 Hz and 10000 Hz, such as between 1 Hz and 1000 Hz, for example between 5 Hz and 500 Hz or between 1 Hz and 250 Hz.

The vibrator 46 may in embodiments of the present disclosure comprise a motor with an unbalanced mass such as an unbalanced flywheel. I other embodiments of the present disclosure, the vibrator 46 may be of the Linear Resonant Actuator (LRA) vibrator type.

In FIG. 12, the vibrator is illustrated as being attached to the housing. In other embodiments, it may e.g. be attached to the shaft 27.

In further embodiments, the vibrator may comprise or be provided by means of the drive motor 18 for driving the collection sheet 15 (see e.g. FIG. 11). The motor may be controlled by a controller in order to provide vibration of the collection sheet 15. E.g. by means of changing drive direction with a predefined frequency.

In some embodiments, the vibrator may be used as an anti-jamming operation in order to solve an issue with a jamming of a spacer in the dispenser.

FIG. 12 illustrates a further embodiment of the present disclosure, wherein the spacer storage compartment 11 has a circular shape as opposed to the previously described elongated shape. the spacer storage compartment 11 may in further embodiments of the present disclosure comprise another shape such as a polygonal shape, for example a rectangular shape, a triangular shape, a hexa- or pentagonal shape or the like.

Figure 13:
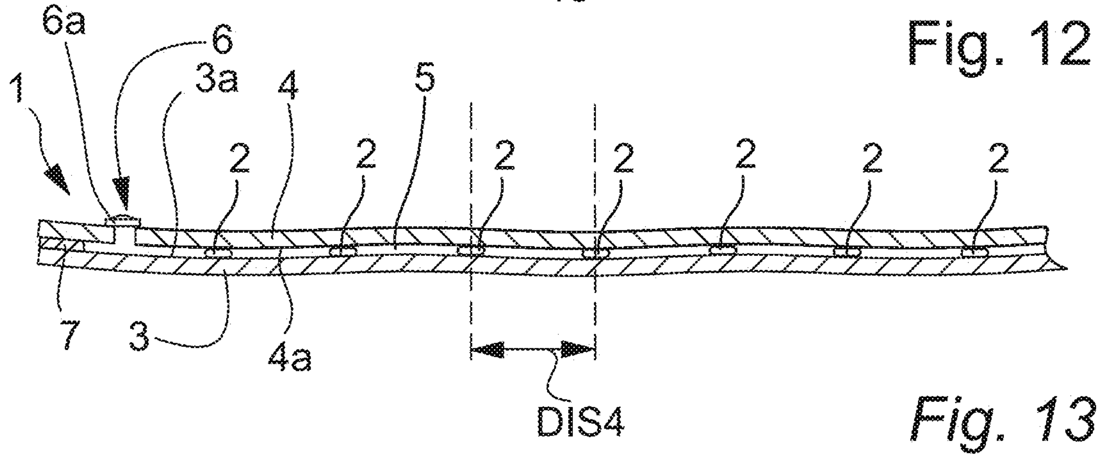
FIG. 13: illustrates a Vacuum Insulating Glass (VIG) unit according to embodiments of the present disclosure.

FIG. 13 illustrates schematically a vacuum insulated glass (VIG) unit 1 according to embodiments of the present disclosure. The VIG unit 1 comprises the first glass sheet 3*a* having a first major surface 3*a*, and a second glass sheet 4 comprising a second major surface 4*a*. These major glass sheet surfaces 3*a*, 4*a* faces each other and the evacuated gap 5. The spacers 2 arranged on the surface 3*a* by means of the dispensing system(s) 200 comprising the dispenser 10 according to various embodiments described above are placed in the gap 5.

The glass sheets 3, 4 are sealed together at the periphery of the glass sheets 3, 4 with the plurality of dispensed spacers arranged between the major surfaces 3*a*, 4*a* in the gap 5. The sealing together of the first and second glass sheets may comprise use of an edge seal material 7 such as a solder glass edge seal material or a solder metal edge seal, or it may comprise fusing the glass sheets directly together. In some embodiments, the sealing together may comprise locally heating at least at the edge seal location, or heating the entire VIG unit assembly to a desired temperature in e.g. a furnace. The sealing together of the glass sheet 3, 4 edges may provide a fused, rigid edge seal. Other airtight edge seal solutions may alternatively be provided.

The glass sheets 3, 4 may be annealed glass sheets or tempered glass sheets, such as thermally tempered glass sheets. One or both glass sheets 3, 4 may have a thickness between 1 mm and 6 mm, such as between 2 mm and 4 mm, for example between 2.5 mm and 3.5 mm including both end points. The glass sheets 3, 4 may be of the same or different thickness.

Figure 17:
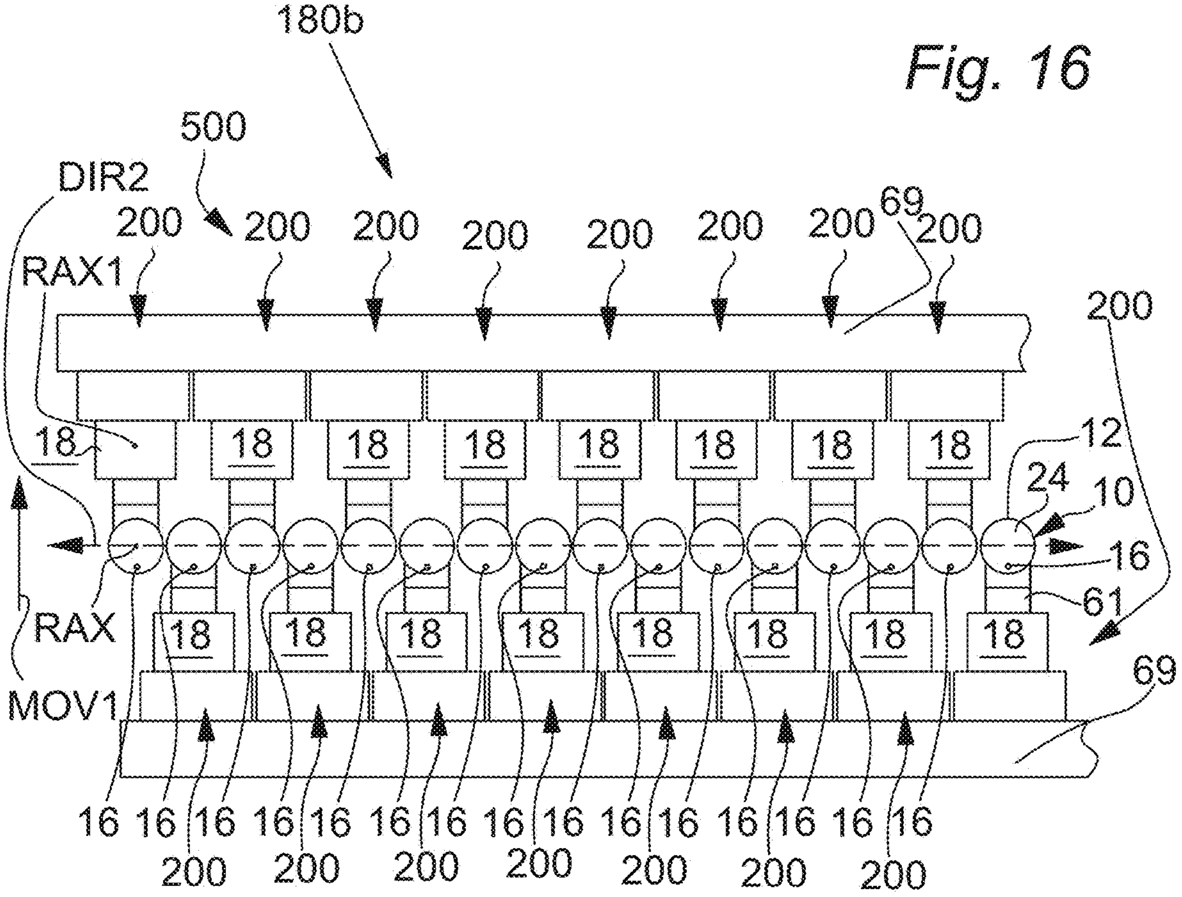
FIG. 17: illustrates schematically a dispensing array comprising a plurality of dispensing systems according to further embodiments of the present disclosure.

The gap 5 has been evacuated to a reduced pressure. In embodiments of the present disclosure, the pressure in the gap 5 may be below 0.05 mbar, such as below 0.005 mbar, such as 0.003 or 0.001 mbar or below. This may be obtained by means of an evacuation pump (not illustrated. For this evacuation of the gap, the pump may have been connected directly or indirectly to an evacuation outlet 6, and after the evacuation, the evacuation outlet 6 is sealed by a sealing 6*a*, such as at least partly by means of a solder material. In FIG. 17, the evacuation outlet 6 is illustrated in a glass sheet, in other embodiments, the evacuation outlet may be provided in the edge seal material or between the edge seal material and one of the glass sheets 3, 4. In some embodiments, the evacuation of the gap 5 may be provided by means of a suction cup arranged to cover an evacuation opening 6. In other embodiments, the evacuation may be provided inside an evacuation chamber, such as where the entire VIG unit assembly is placed inside the evacuation chamber. In some situations, the sealing of the gap and/or fusing at the edges by an edge seal may also be obtained in such a vacuum chamber.

The spacers 2 placed by means of the dispenser(s) 10 maintains a distance between the glass sheet surfaces 3*a*, 4*a* across the evacuated gap when the gap has been evacuated.

The distance between the glass sheet surfaces 3*a*, 4*a* may in embodiments of the present disclosure be 0.5 mm or below, such as 0.3 mm or below, for example 0.2 mm or below.

The evacuation of the gap 5 may in embodiments of the present disclosure be provided by means of one or more one or more of: a vacuum chamber, such as a vacuum chamber containing the entire VIG unit assembly therein, one or more vacuum pumps in communication with the gap, for example by means of a suction cup. Additionally, one or more getters may be arranged in the gap to provide further pressure reduction in the gap and/or to maintain vacuum integrity.

It is generally to be understood that the VIG unit may e.g. be transparent to at least visible light.

Figure 14:
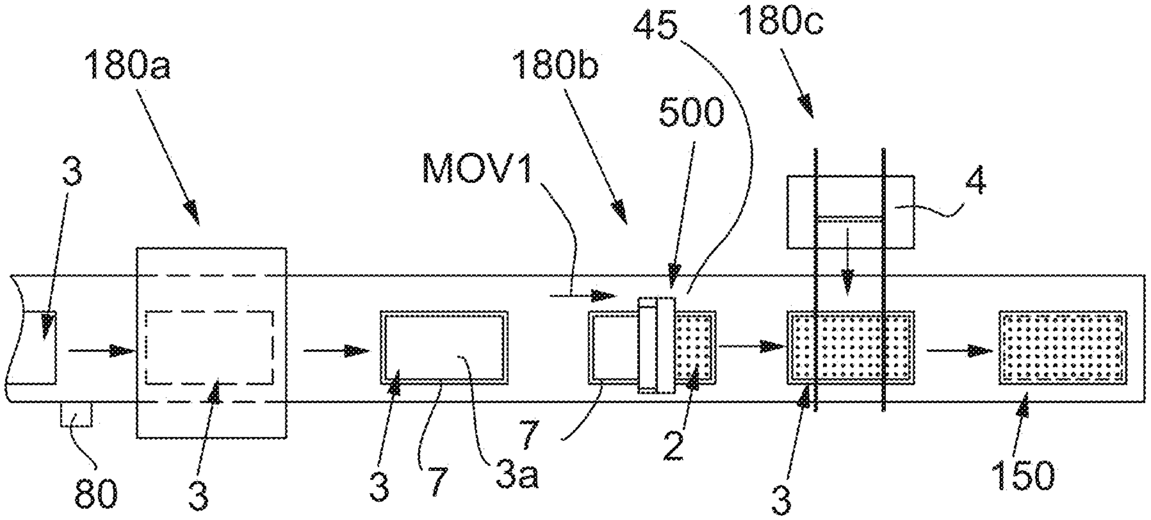
FIG. 14: illustrates a manufacturing line for manufacturing VIG units according to embodiments of the present disclosure.

FIG. 14 illustrates schematically a manufacturing line for a VIG unit according to embodiments of the present disclosure. The first glass sheet 3 first enters a first station 180*a* where edge seal material 7 such as solder glass edge seal material or metal solder edge seal material is provided to the upwardly facing major surface 3*a*. Then the glass sheet 3*a* is moved to a spacer placement station 180*b* where one or more spacer dispensers 10, such as a dispenser system array 500 as previously described, dispenses spacers onto the major surface 3*a*. This is provided so that the spacers 2 are provided with a mutual distance DIS4 in rows and/or columns on the glass sheet surface 3*a*, or in another desired pattern. The relative movement MOV1 may be provided by means of a motor 80 as e.g. previously described. The previously described spacer placement sequence to place the spacers 2 at the surface 3*a* may be provided at the station 180*b*.

At glass pairing station 180*c*, the glass sheets 4 and 3 are paired by placing the second glass sheet 4 on top of the first glass sheet 3 to cover the spacers 2. The glass sheet 4 may e.g. rest on the edge seal material 7. The glass pairing station may comprise automation systems such as one or more of a robotic arm, one or more linear displacement members, one or more rails and/or the like for transporting the glass sheet 4 to the position opposite the surface 3*a* and lowering the glass sheet towards the surface 3*a*.

After this, the edge seal material 7 of the VIG unit assembly 150 may be heated and the gap is evacuated to a reduced pressure. It is understood that the edge seal material, if even needed, may be placed/applied subsequent to placing the spacers at station 18*a* instead. It may even in some embodiments be provided in an evacuation chamber or be omitted if the glass sheets are fused directly together by an glass sheet 3, 4 edge melting operation.

Figure 15:
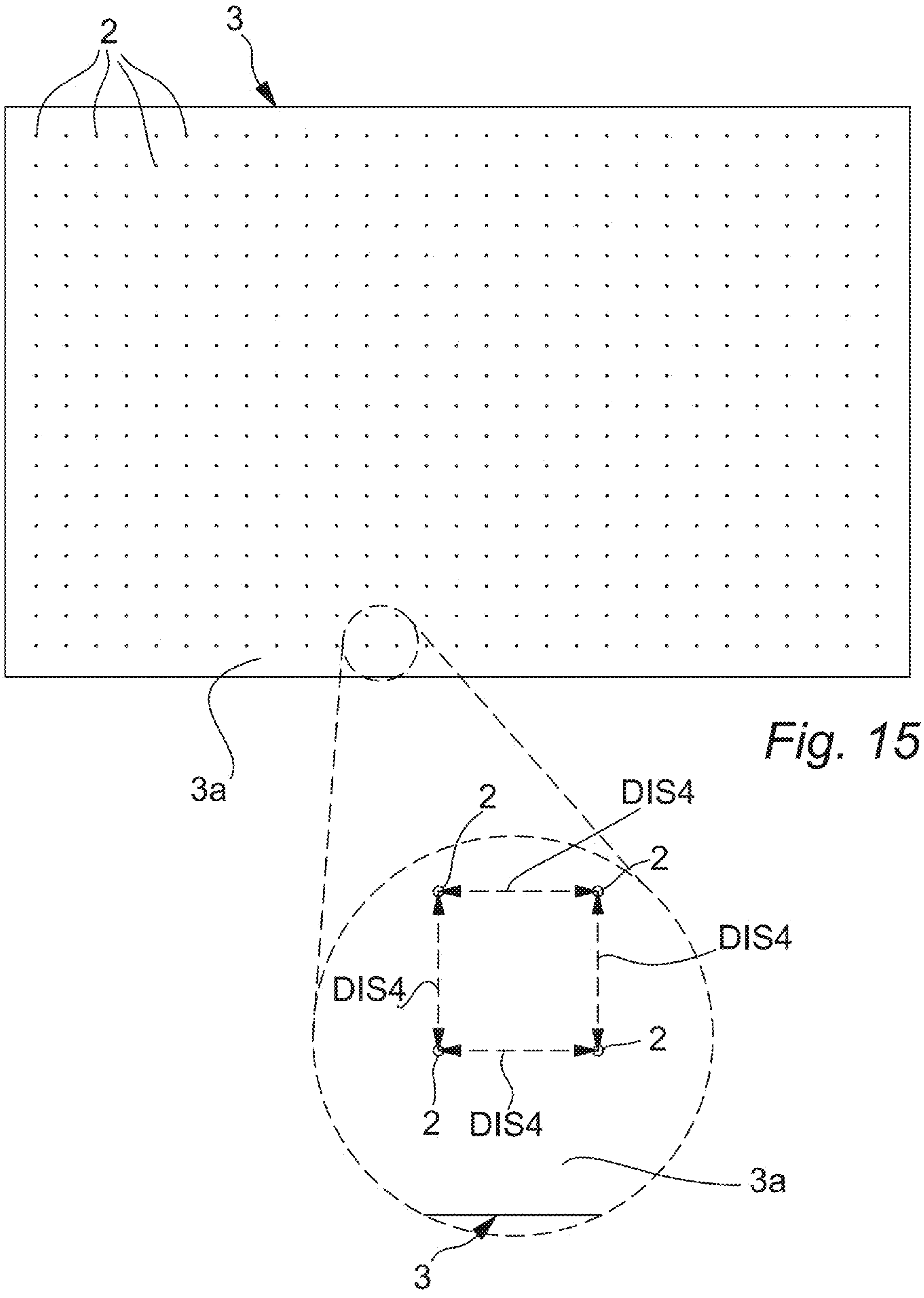
FIG. 15: illustrates a glass sheet having a major glass sheet surface that has been subjected to a spacer placement sequence provided by means of one or more dispensers, according to embodiments of the present disclosure.
Figure 19:
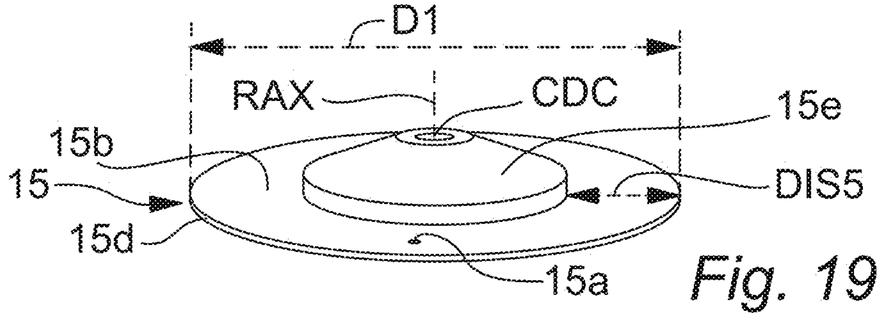
FIG. 19: illustrates a collection sheet comprising a thickened centre part according to embodiments of the present disclosure.

FIG. 15 illustrates a glass sheet 3 having a major glass sheet surface 3*a* that has been subjected to a spacer placement sequence provided by means of one or more dispensers 10, 500 described according to various embodiments above. In this example, the glass sheet has been provided with a full set of spacers 2 compared to the glass sheet surface 3*a* area. In the example of FIG. 19, 18×29 spacers 2=522 spacers have been placed to sufficiently cover the glass sheet surface to provide load distribution between the spacers 2 when the gap evacuation is provided.

In FIG. 15, the spacers 2 are placed in a rectangular pattern in rows and columns. In the example of FIG. 15, if an array (see e.g. FIG. 10) of dispensers 10 is provided, the array may comprise at least 18 dispenser systems 200. If smaller glass sheets than the illustrated is provided, then fewer dispensers may be used in the array. If larger glass sheets are to be used, the array may in embodiments of the present disclosure comprise even more dispensers, or the array may in embodiments of the present disclosure be moved to arrange further spacers along a row than the number of dispensers in the array allows. In some embodiments, the array may comprise more than 19 dispensers, such as more than 30 dispensers or the like.

It is understood that if smaller glass sheets 3 are then to be supplied with spacers in a spacer placement sequence, and hence the number of dispensers in the array is larger than the number of spacers to be arranged in e.g. a row, the number of used dispensers 10 of the array may be reduced so that some of the dispensers are unused for that glass sheet.

Figure 16:
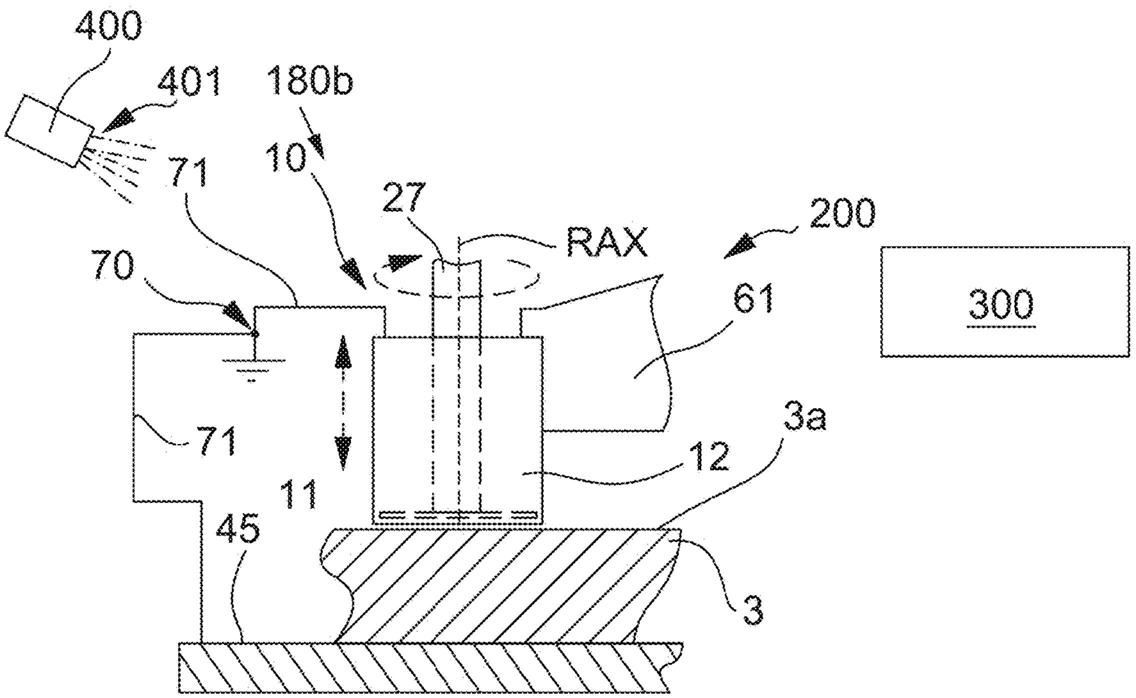
FIG. 16: illustrates static charge reduction, according to embodiments of the present disclosure.

FIG. 16 illustrates schematically static charge reduction according to various embodiments of the present disclosure. In FIG. 16, the dispenser 10, such as the housing 12 and/or collection sheet 15, is/are connected directly or indirectly to ground by means of a grounding connection 70, such as e.g. by means of a grounding wire 71 or the like. In additional or alternative embodiments, the grounding connection may be provided through conducting bearings and/or the like, and through the shaft 27. Hence, for example, the grounding may be provided by means of one or more electric wires 71 from a frame part of the dispensing system and to the grounding connection 70, such as from a frame part 69 and/or 67 as previously described. In other embodiments, the housing 12 may comprise a grounding wire connection terminal at e.g. the upper 12*a* or lower 12*b* part of the housing (see e.g. FIG. 1*a* and/or 1*b*) for fastening or soldering a ground connection wire.

FIG. 16 illustrates a further embodiment of the present disclosure, wherein the transportation support 45 is connected directly or indirectly to ground 70, such as by means of one or more wires 72, and/or by means of bearings, metal brushes and/or the like. The ground connection 70 may as illustrated in still further embodiments be a common ground connection for the dispenser/dispensing system 200 and the transportation/support equipment 45 in order to reduce static charge between the glass sheet 3 and the dispensing system 200, such as the dispenser 10. Such grounding connection(s) 70, 71 and/or 72 and thereby reduction in static charge may e.g. help to reduce spacer dispensing and/or placing issues.

FIG. 16 illustrates a further embodiment of the present disclosure where an ionizer device 400 (one or more may be provided) is provided at a spacer dispensing station 180*b* comprising one or more dispensers 10 such as an array 500 of spacer dispensers as previously described. The ionizer/ionizing device 400 provides ions of controlled polarity towards the dispensing system 200 such as towards the dispenser(s) 10, and/or towards the glass sheet 3. The ions of controlled polarity may additionally or alternatively be provided towards the glass sheet handling system 45. The ionizer(s) 400 may thereby change the electrostatic potential at/in the glass sheet/handing system 45 and/or dispensing system such as the dispenser 10. The ionizing device(s) 400 may provide a pressurized flow of ions. For example, the ionizing device(s) 400 may comprise one or more ionizing bars each comprising one or more flow outlet(s) arranged so as to provide at least one line of flow outlet extending towards one or more of the glass sheet 3, dispensing system, handing system/support and/or the like. The properties of the ion flow from the ionizer bar(s) 400, e.g. charge properties, flow direction, operating length and/or the like provided by the ionizing/ionizer bar(s) may be controlled individually by one or more settings of the ionizer bar. In one or more embodiments, the ionizer bar flow outlets comprises one or a plurality of nozzles 401.

FIG. 16 illustrates a further embodiment of the present disclosure, wherein, for example in addition or as an alternative to the grounding connection 70 and/or ionizer device(s) 400, the spacers 2 may be dispensed by the dispenser 10 while the relative humidity of the ambient air surrounding the dispenser 10 is above 40%, such as above 50%, for example between 40% and 90% or between 40% and 70%. In some embodiments, the relative humidity may be determined substantially at atmospheric pressure and/or at an ambient temperature between 15° C. and 30° C., such as between 18° C. and 23° C., such as at 20° C. This may be obtained by means of a humidity control system 300 which provides/controls a relative humidity of the ambient air near the dispenser 10 and glass sheet 3. In some embodiments, the humidity control system 300 may be configured to introduce water into the ambient air surrounding the VIG unit assembly 1 through one or more discharge openings of one or more water discharge arrangements of the humidity control system 300.

One or more of the ionizer device(s) 400, humidity control system 30 and/or the grounding connection 70 may together or alone reduce and/or maintain a difference in electrostatic charge potential between the glass sheet 3 and the dispensing system 200, such as between the between the glass sheet 3 and the one or more dispensers 10 or array 500 to be below a maximum allowed voltage value. This maximum allowed voltage value may in embodiments of the present disclosure be 10 kV, such as 8 kV, such as 5 kV or 2 kV or 1 kV.

One or more of the ionizer device(s) 400, humidity control system 30 and/or the grounding connection 70 may together or alone reduce and/or maintain a difference in electrostatic charge potential between the glass sheet 3 and the dispensing system 200, such as between the between the glass sheet 3 and the one or more dispensers (10) or array 500 to be below 10 kV, such as below 5 kV, such below 2 kV. In certain embodiments, the maximum voltage allowed between the glass sheet 3 and the dispensing system 200, such as between the between the glass sheet 3 and the one or more dispensers (10) or array 500 may be below 1 kV such as below 0.5 kV.

The one or more ionizing device(s) 400, one or more humidity control system(s) 300 and/or one or more grounding connections 70, 71, 72 may be considered a charge modulation system, or considered comprised in a charge modulation system for controlling the electrostatic charge potential between the glass sheet 3 (and/or glass sheet handling system 45) and the dispensing system 200, such as between the glass sheet 3 (and/or glass sheet handling system 45) and the one or more dispensers (10) or array 500 to be below a maximum allowed voltage value as e.g. disclosed above.

In one or more embodiments, for example the ionizer bar may be omitted, and e.g. only the grounding connection(s) 70 and/or humidity control may be used.

Additionally or alternatively, in some embodiments of the present disclosure, the charge modulation system may be configured to reduce static electricity/charge between components of the dispenser 10. For example, a grounding connection 70 and/or an ionizer bar may help to provide this. Hence, substantially no static electricity/charge may build up between the spacers in the spacer storage 11, the collection sheet 15 and the housing 12.

FIG. 17 illustrates schematically a dispensing array comprising a plurality of dispensing systems 200 according to embodiments of the present disclosure. In FIG. 17, the array 500 comprises 16 dispensing systems 200, but fewer or more may be provided in the array 500. FIG. 17 is seen towards the bottom surfaces 24 of the dispenser 10. As can be seen, the dispenser comprises a dispenser housings 12 (for figure clarity, not all features are assigned a reference number), such as housing 12 for providing e.g. dust protection and/or the like as e.g. previously disclosed in relation to one or more of the figures described above.

The spacer outlet 16 may as illustrated, in embodiments of the present disclosure, be arranged in the respective dispenser housing bottom surface 24, As can be seen from FIG. 17, the outlets 16 may be aligned on a line, so that they 10 dispenses a row of spacers (se e.g. FIG. 15) if dispensing simultaneously and/or if the glass sheet 3 (not illustrated in FIG. 22) is kept stationary/still during spacer 2 dispensing.

The dispenser system 200 may as illustrated in FIG. 11 comprise an interconnecting drive arrangement 66 comprising one or more of a chain drive, belt drive, a toothed wheel system such as a gearing system and/or the like which transfers the rotary motion of the motor 18 to the collection sheet 15 through the shaft 27 which rotates around the axis RAX. An interconnecting drive arrangement (see e.g. ref. 66 of FIG. 11) may comprise one or more of a chain drive, belt drive, a toothed wheel system such as a gearing system and/or the like which transfers the rotary motion of the motor 18 around the axis RAX1 to a shaft or the like for rotating the collection sheet 15 inside the housing 12 (or for rotating the housing 12) around an axis RAX. Axes RAX1 and RAX may be parallel as illustrated, or they may be non-parallel, or even perpendicular, dependent on the drive system 18, 66 setup. In certain other embodiments (not illustrated in FIG. 17, see e.g. FIG. 1*b*), the axes RAX and RAX1 may be coincident.

The drive arrangement comprising the drive motor 18, such as an electric motor, frame parts, such as height adjustable frame parts and/or the like if present (see e.g. FIGS. 10 and 11) may as illustrated in embodiments of the present disclosure be arranged staggered on opposing sides on the extension direction DIR2 line (see dashed double arrow line DIR2) of the dispenser array 500. One or more of the motor 18, frame arrangement and/or the like may in embodiments of the present disclosure be wider than the maximum width D2, such as the diameter (see e.g. FIG. 1*a*) of the dispenser housing 12, But the staggering arrangement of these parts may provide more room/space for arranging such a drive arrangement 18 and/or the like in the spacer placement station. The staggering arrangement may additionally or alternatively enable that the dispensers 10 may be placed closer together.

Figure 18:
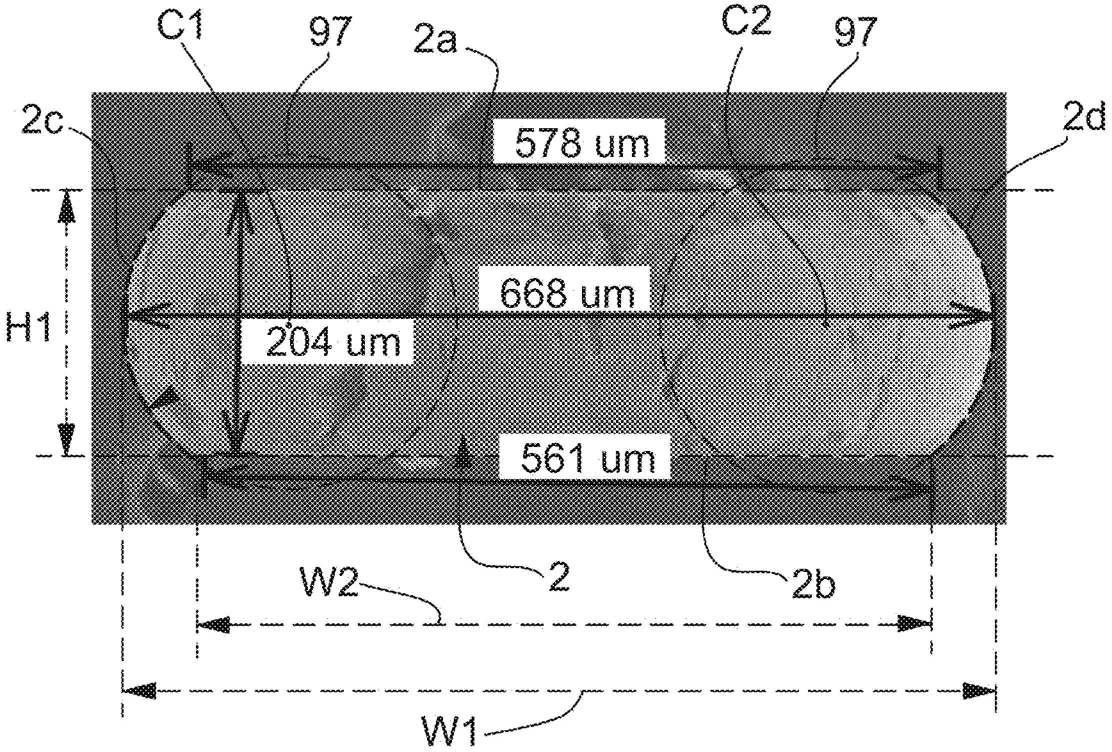
FIG. 18: illustrates a microscopic image of a spacer according to embodiments of the present disclosure.

FIG. 18 is a microscopic picture of a spacer 2 made from a spherical precision steel ball that has been compressed in a press (not illustrated) or the like to shape the contact surface 2*a*, 2*b* by plastic deformation. This provides that the spacer width W1 (in the illustrated example 0.67 mm) is significantly larger than the spacer height H1 (0.2 mm).

As can be seen, the compression of the steel ball provides that the convex side edge surfaces (2*c*, 2*d*) (imagined if looking at a cross section of the spacer), describes circular 97 arcs having non-coinciding centres C1, C2.

In other embodiments (not illustrated), ceramic balls or balls from another material may be processed, such as mechanically (for example by grinding) or chemically processed to have predefined and pre-shaped, such as flat, contact surfaces 2*a*, 2*b*. The convex side surfaces 2*c*, 2*d* may here describes minor circular arcs having a coinciding centre. In stull further embodiments, the spacers 2 may e.g. be cylindrical in shape and extend substantially linear between the surfaces 2*a*, 2*b*, or may have another shape.

It is generally understood that the spacers may be made from any suitable materials such as be made from, such as comprise or consist of metal, polymer material and/or ceramic.

In embodiments of the present disclosure, the maximum width W1, such as the maximum diameter, of the spacer 2 may be at least 2 times, such as at least 2.4 times or at least 2.8 times larger than the height H1 of the spacer 2. In FIG. 18, the maximum width W1, such as the maximum diameter, of the spacer 2 is about 0.668/0.204=3.3 times larger than the height H1 of the spacer 2.

In embodiments of the present disclosure, the maximum width W1, such as the maximum diameter, of the spacer 2 may be between 1.3 and 6 times, such as between 1.5 and 6 times, for example between 2 times and 4 times larger than the height H1 of the spacer 2.

In some embodiments of the present disclosure, the maximum width W1, such as the maximum diameter of the spacer 2 may be less than 0.8 mm, such as less than 0.6 mm, such as less than 0.4 mm. In certain embodiments of the present disclosure, the diameter of the spacer may be 0.3 mm or less.

In FIG. 18, the width W2 (such as diameter) of the contact surfaces 2*a*, 2*b* is approximately 0.87 times the maximum width W1 (such as diameter) of the spacer 2.

The compressive load on each of at least 50%, such as at least 70% of the spacers 2 in a VIG unit (see e.g. FIGS. 13 and 15) for a cylindrical spacer 2 or a spacer with curved outer side edge surfaces 2*c* and plane contact surface 2*a*, 2*b* as described previously, in a "square spacer grid" of 40×40 mm2 (i.e. distance of substantially 40 mm between neighbouring/adjacent spacers), may amount to at least 0.5 GPa, such as at least 0.8 Gpa, such as substantially 1 Gpa. In some embodiments, the compressive load on at least 80% or 90%, such as substantially all spacers may be between 0.5 Gpa and 2 Gpa, such as between 0.6 and 1.3 Gpa.

It is generally understood that the tolerances for the spacers 200 in the spacer storage 11 and/or the distributed spacers may in embodiments of the present disclosure may be ±30 micron, such as ±20 micron, or ±10 micron or less. For example, spacer height H1 may be 0.2 mm with a ±30 micron, such as ±20 micron, or ±10 micron tolerance.

For example, maximum spacer width W1 may be for example 0.44 mm or 0.66 mm with a ±40 micron, such as ±20 micron, or ±10 micron tolerance. The tolerances of the spacer width W1 may in some embodiments of the present disclosure be less restrictive that the tolerance requirements to the spacer height H1.

It may be preferred that surfaces 2*a*, 2*b* of spacers are shaped/designed so as not allow to trap pockets of gasses between glass surface and pillar surface, and hence the contact surface 2*a*, 2*b* flatness may in embodiments of the present disclosure be substantially flat and/or comprise one or more grooves/furrows and/or the like to reduce the risk of trapping gasses in between the glass sheet surfaces 3*a*, 4*a* and the contact surfaces 2*a*, 2*b*.

Outgassing from the spacers 2 should be minimized. Particularly outgassing of non-getterable species should be avoided.

As can be seen from e.g. FIG. 1*a*, the collection sheet 15 in embodiments of the present disclosure may comprise a single sheet of material having a substantially continuous/constant thickness TH1 between the collection sheet centre and towards the collection sheet centre CDC.

FIG. 19 illustrates a collection sheet 15 according to further embodiments of the present disclosure, comprising a thickened part 15*e* at the collection sheet centre. In FIG. 19, the collection sheet 15 comprises a thickened part 15*e* placed with a distance DIS5 from the outer sheet boundary/periphery 15*d*, and the thickened part 15*e* has a centre that is coinciding with the centre CDC of the collection sheet 15 and the rotation axis RAX. The thickened part 15*e* may e.g. help to increase the structural integrity of the collection sheet 15. The thickness TH1 (see FIG. 1*a*) may still be the same as disclosed previously at the area of the collection hole 15*a*, but the thickness of the entire collection sheet 15 may change/vary between the boundary/periphery 15*d* and the centre CDC. The thickened part 15*e* may in embodiments of the present disclosure be integrated/unitary with the part of the sheet 15 comprising the collection hole 15. In other embodiments, the thickened part 15*e* may be attached to the sheet 15 by mechanical and/or chemical fastening means. In some embodiments, the thickened part may additionally or alternatively provide the interface between the collection sheet and a shaft 27 (not illustrated in FIG. 19).

In embodiments of the present disclosure, the surface 17*a* part of the upper housing part 12 facing the thickened part 15*e* may be adapted to the shape and size of the thickened part. Hence, for the embodiment of the present disclosure, the surface 17*a* may have a concavely extending surface (not illustrated). In certain embodiments of the present disclosure, a vacuum channel or the like may be provided in a part of the thickened part 15*e*, for example in order to provide a vacuum path/duct interface between a shaft and the collection hole 15*a*.

Figure 20:
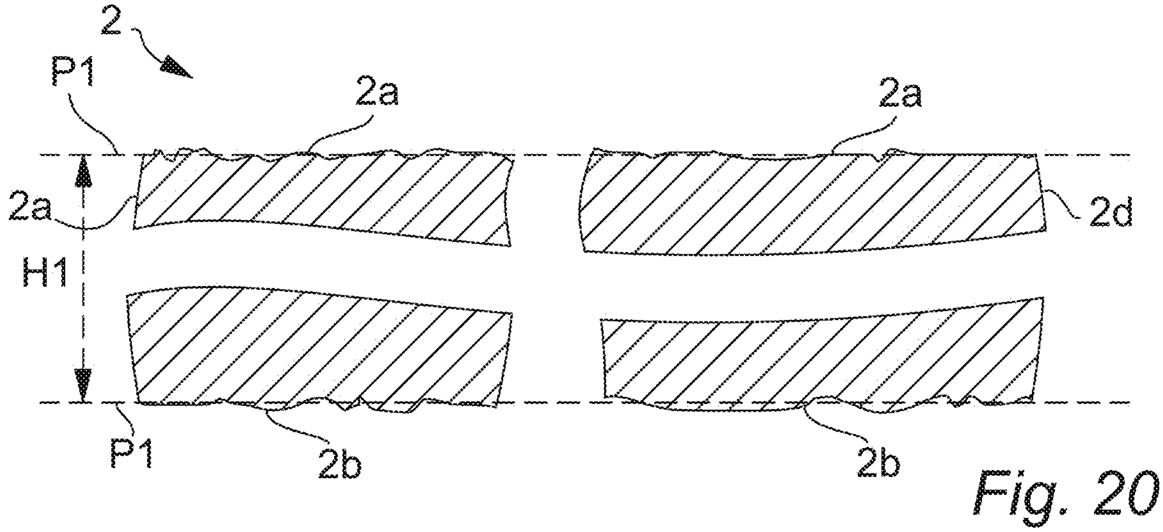
FIGS. 20-21: illustrate various embodiments of predefined, pre-shaped, flat, such as plane, contact surfaces of a spacer, according to further embodiments of the present disclosure.
Figure 21:
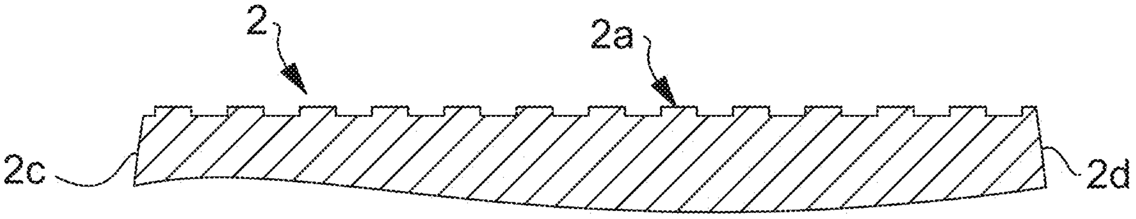

FIGS. 20 and 21 illustrates schematically and in cross section different surface topologies of the contact surface(s) 2*a*, 2*b* of the spacers 2 according to various embodiments of the present disclosure.

In FIG. 20, the surface structure of the contact surface 2*a*, 2*b* is provided due to the manufacturing method of the spacer. This may e.g. be provided by one or more of compressing, plastically deforming, moulding and/or sintering or the like of a suitable spacer material into a spacer comprising predefined flat contact surfaces. Here, the surface topology is to be considered flat, but some degree of surface variation may still be accepted. In FIG. 20, the opposite flat contact surfaces 2*a*, 2*b* has a surface shape, such as a surface roughness, that varies relative to a mean line plane P1. In some embodiments, this variation may be less than ±30 micron, such as less than ±10 micron of the spacer height H1, relative to the mean line or mean plane P1 defined by the respective contact surface 2*a*, 2*b*. The mean line or plane may be defined by the average surface roughness of the respective spacer contact surface 2*a*, 2*b*. The surface roughness may e.g. be determined according to ISO 4287:1997 standard, or similar, and the contact surface variation may e.g. be an average, or arithmetic average, of surface height deviation/variation from the mean line p1. For example, this may be defined by a Ra roughness parameter.

FIG. 21 illustrates a contact surface 2*a* where a certain degree of surface variation of the surface 2*a* is intentionally provided by e.g. furrows in order to e.g. reduce capture of air/gas in between the glass sheet surface and contact surface of the spacer. However, this may still be considered a flat contact surface.

Figure 22:
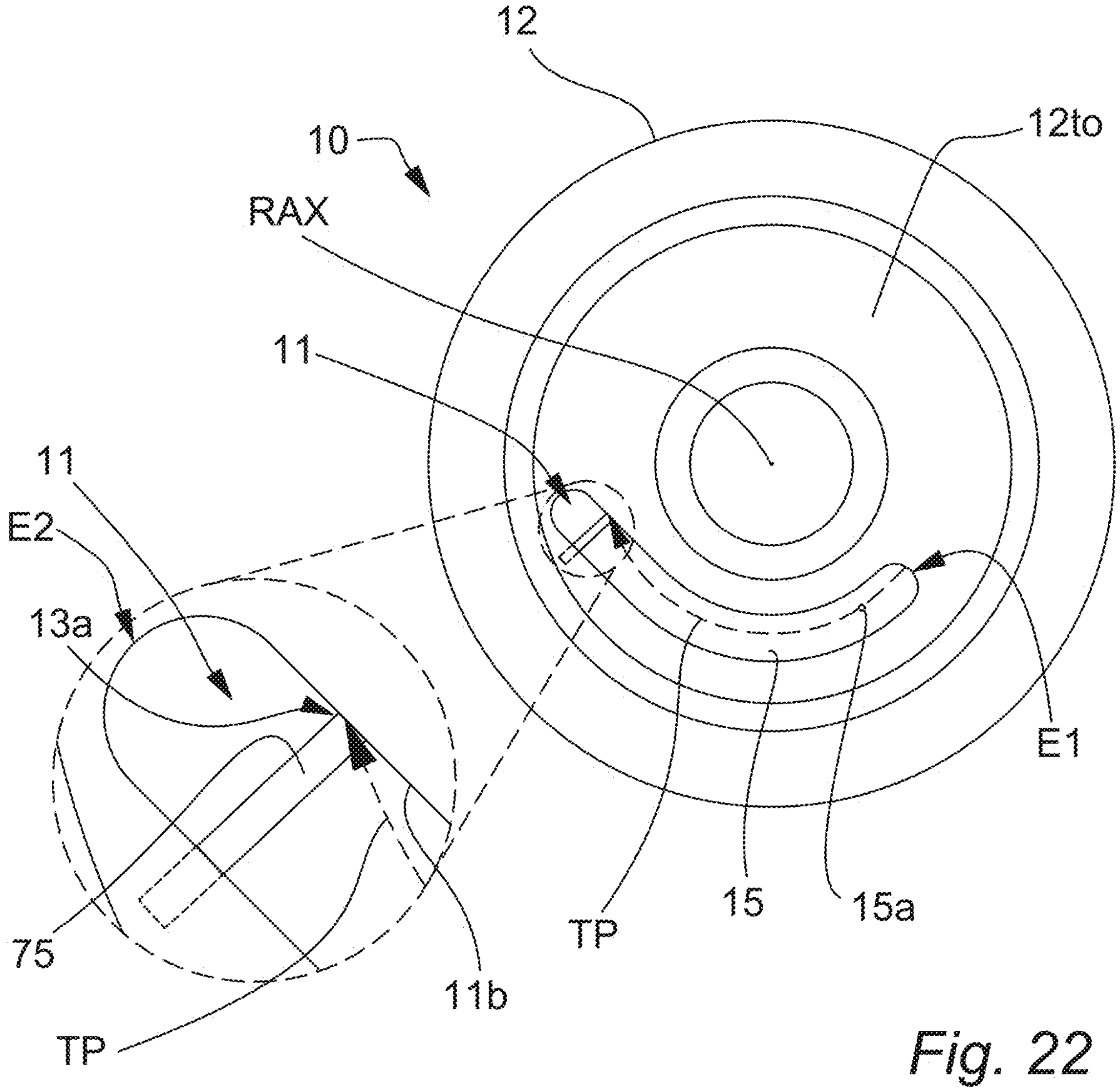
FIG. 22: illustrates a dispenser comprising a protruding member extending into a spacer storage compartment, according to embodiments of the present disclosure.

FIG. 22 illustrates schematically a dispenser 10 according to various embodiments of the present disclosure, seen from above.

In FIG. 22, the dispenser 10 comprises a protruding member 75 extending into the spacer storage compartment 11. The protruding member 75 may help to increase the chance of successfully collecting a spacer 2 from the spacer storage compartment 11.

The spacers 2 are however not illustrated in FIG. 22 in order to improve understanding. Spacers may surround the protruding member 75 and one or more spacers arranged above the protruding member may support on the protruding member 75.

In FIG. 22, the dispenser comprises one protruding member 75. It is however understood that in other embodiments of the present disclosure, the dispenser 10 may comprise a plurality of protruding members 75 extending into the spacer storage compartment 11 at different locations in the compartment 11. See FIGS. 27C and 27D.

In FIG. 22, the protruding member 75 is a pin. Embodiments hereof is described in more details further below. The pin 75 extends so as to partly or fully cover the collection hole 15*a* at a certain position during the travel of the collection hole 15*a* along the traveling path TP in the storage compartment.

In the embodiment of FIG. 22, the protruding member 75 is placed substantially above the entrance 13*a* where the collection hole 15*a* enters the guidance space 13.

The inventors have by tests seen indications that the protruding member 75 may improve consistency with regard to collecting a spacer 2 from the storage 11. Additionally or alternatively, the protruding member 75 may help to reduce the occurrence of jamming situations.

FIG. 22 moreover illustrates an embodiments of the present disclosure where a part of the spacer storage 11 is curved/arc shaped and moreover comprises a part, such as a straight or curved part, that is non-coincident with the rotation axis RAX.

The first movement (of e.g. the collection disc) to collect a spacer in the storage, and the further movement (of e.g. the collection disc) to deliver the spacer at the dispenser outlet may, as also previously described, be a movement around a rotation axis RAX. The spacer storage compartment 11 is elongated and extends partly around the rotation axis, thereby providing an at least partly arc shaped spacer storage compartment 11. In FIG. 22, the spacer storage compartment 11 is shaped so that the collection hole 15*a* enters into the guidance space 13 (with a collected spacer) at an entrance position 13*a*. In FIG. 22, the entrance position 13*a* is located between ends E1, E2 of the elongated spacer storage compartment 11, underneath the compartment side wall 11*b*. This is obtained by providing that the end area of the storage 11 proximate the second end E2 comprises a part extending linear/straight, rather than circular. Hence, at the first storage compartment 11 end E1, the collection hole (See traveling path TP) may enter at the first end E1. However, the second compartment end E2 is displaced to a position more distant from the rotation axis RAX than the first end, and this also provides that the wall surface 11*a* facing and abutting the storage compartment 11 has a distance from the rotation axis RAX at the entrance 13*a* that is larger than at the distance between axis RAX and the entrance end E1. The shape and/or extension of the elongated spacer storage compartment 11 when seen from above may hence have the shape of a, so to say, wry/twisted smile.

Further embodiments (not illustrated), the entrance position 13*a* may be located underneath the wall 11*a* instead of at the end E1 or underneath wall 11*b*.

Hence it is understood that the spacer storage compartment 11 in some embodiments (as e.g. illustrated in FIG. 22 and several other figures described below) may be shaped so that the collection hole 15*a* enters into the guidance space 13 at an entrance position 13*a* located underneath a wall 11*a*, 11 *b* of the compartment that extends between the ends E1, E2 of the elongated spacer storage compartment 11.

In other embodiments, the entrance position 13*a* may be located at the end E2 of the elongated, curved/arc shaped spacer storage 11, as e.g. illustrated in FIGS. 7 and 8.

The dispenser housing 12 may as previously described be grounded 70, and/or another charge modulation system may be provided. The protruding member 75 may be connected to a grounding connection through the housing 12.

Figure 23:
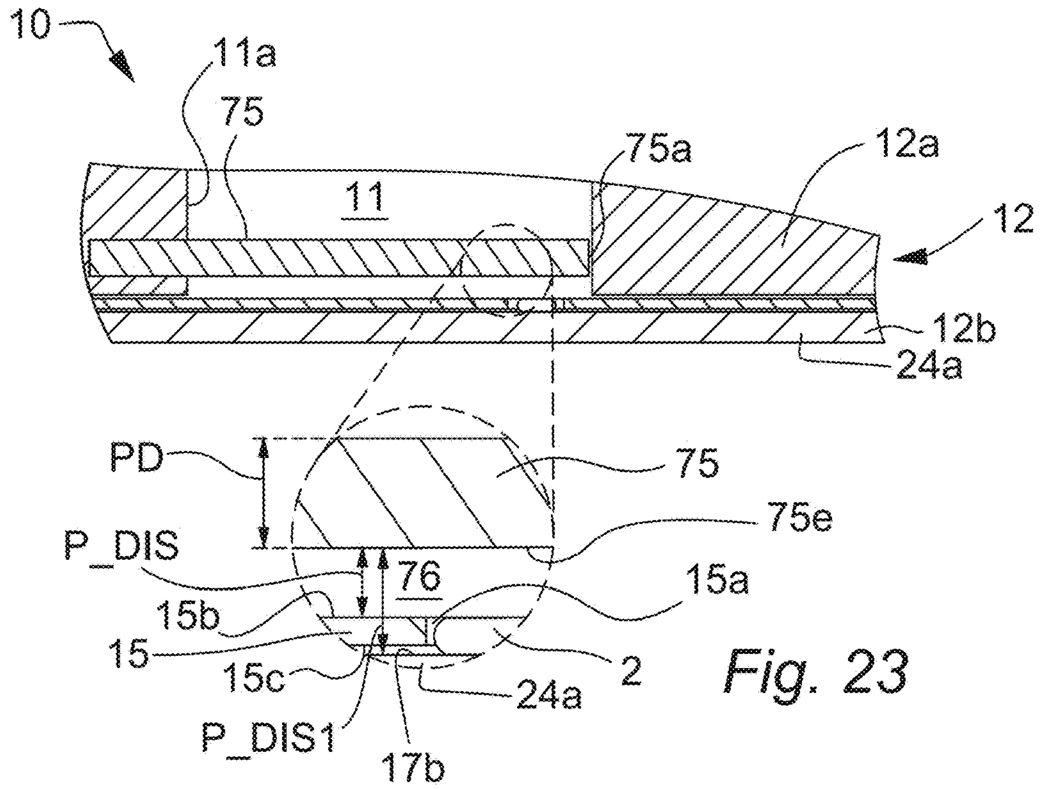
FIGS. 23-23*a*: illustrates various embodiments of a dispenser comprising a protruding member arranged with a distance to a collection sheet, according to different embodiments of the present disclosure.
Figure 23A:
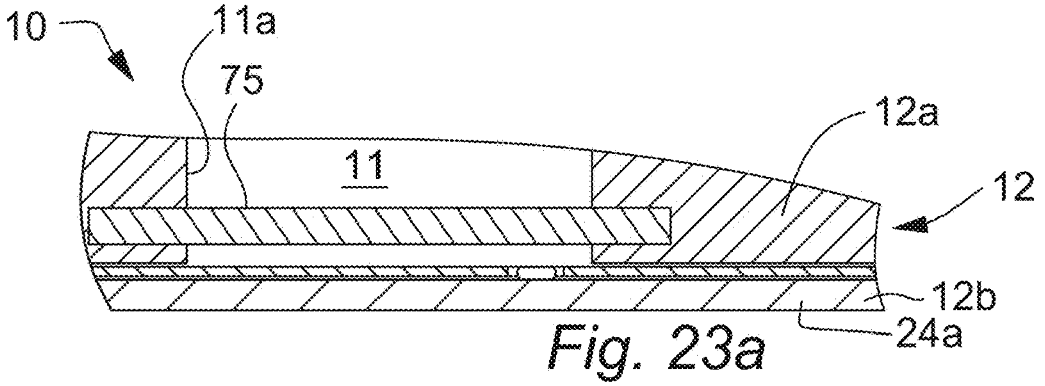

FIGS. 23 and 23*a* illustrates schematically and in cross section a dispenser 10 according to various embodiments of the present disclosure, comprising a protruding member 75. The protruding member 75 is fixated at one end and is suspended to extend into the spacer storage compartment 11 from the surface 11*a*. A free end 75*a* of the protruding member may be placed proximate the entrance area 13*a* (See e.g. FIG. 22) where the collection hole 15*a* enters the guidance space 13.

The protruding member 75 in FIG. 23, such as a pin, may be considered a cantilever beam. In other/further embodiments, the protruding member 75 may be supported at both ends (not illustrated in FIG. 23, see FIG. 23*a*)

The collection hole 15*a* may in some embodiments pass below a part of a half part, or quarter part, of the protruding member 75 that is proximate the unsupported/free end 75*a* of the protruding member 75. This may help to provide that the resiliency of the pin 75 may provide positive effects on the orientation of a spacer in the compartment 11 and/or collection hole, so that an increased chance of successful spacer collection may be obtained.

The protruding member 75 may have a length of at least 0.5 mm, such as at least 1 mm, for example at least 3 mm, for example at least 5 mm. This length may extend in a length direction away from a side surface 11*a*, 11*b* facing the storage 11. The length of the protruding member may in embodiments of the present disclosure be at least ⅙, such as at least ½, such as at least ¾ of the width of the storage 11 at the area of the protruding member. However, in some embodiments, the length of the protruding member may substantially correspond to the width of the storage 11 at the area of the protruding member 75. This may also depend on the desired resiliency of the protruding member/and/or from which side the protruding member extends.

In some embodiments of the present disclosure, the spacers 2 in the spacer storage 11 may have a spacer width W1 that is larger than the height H1 of the spacer 2. See e.g. FIGS. 2*a* and 2*b*.

As can be seen, the protruding member 75 is arranged with a distance P_DIS to the collection sheet 15 surface 15*b*. Hereby, an intermediate space 76 is provided between the collection sheet 15 and the protruding member 75.

The protruding member 75 may in some embodiments have a length of less than 20 mm, such as less than 15 mm, such as less than 10 mm.

As illustrated, a distance P_DIS between the protruding member 75 and the collection sheet 15 surface 15*b* is provided. The distance P_DIS extends between a lower edge 75*e* of the protrusion that faces the collection sheet 15.

In some embodiments, this distance P_DIS may be smaller than the spacer width W1, such as at least 20% or at least 40% smaller than the spacer width W1.

In some embodiments, the distance between the protruding member 75 and the housing surface 17*b* of the bottom wall 24 of the bottom part 12*b* is smaller than the spacer width W1, such as at least 20% or at least 40% smaller than the spacer width W1.

This may provide that when a spacer is placed in the collection hole, the protruding member 75 may directly or indirectly help to arrange the spacer 2 so that a contact surface (see 2a and 2b of FIGS. 2a/2b) of the spacer supports on the surface 17a. E.g. a spacer that stands on a side surface 2c (see FIGS. 2a and 2b) may be manipulated by the The distance P_DIS between the protruding member 75 and the collection sheet 15 may in some embodiments be less than 5 mm such as less than 3 mm.

The distance P_DIS between the protruding member 75 and the collection sheet 15 may in some embodiments be less than 1 mm such as less than 0.6 mm, such as 0.4. mm or less, such as 0.3 mm or less.

The distance P_DIS1 between the protruding member 75 and the housing surface 17b of the bottom wall 24 of the bottom part 12b may in some embodiments be less than 5 mm such as less than 3 mm.

The distance P_DIS1 between the protruding member 75 and the housing surface 17b of the bottom wall 24 of the bottom part 12b may in some embodiments be less than 1 mm such as less than 0.6 mm, such as 0.3 mm or less.

The distance P_DIS1 between the protruding member 75 and the housing surface 17b of the wall 24 of the bottom part 12b may in some embodiments be larger than 0.1 mm, such as larger than 0.2 mm, such as larger than 0.4 mm.

In some embodiments, the distance P_DIS between the protruding member 75 and the collection sheet 15 may be larger than 0.1 mm, such as larger than 0.2 mm, for example 0.3 mm or larger.

In some embodiments of the present disclosure, the distance P_DIS between the protruding member 75 and the collection sheet 15 surface 15b may be larger than the spacer height H1 and smaller than the spacer width W1.

In some embodiments of the present disclosure, the distance P_DIS1 between the protruding member 75 and the housing surface 17b of the bottom wall 24 of the bottom part 12b may be larger than the spacer height H1 and smaller than the spacer width W1.

The distance P_DIS1 may in embodiments of the present disclosure be a distance to a wall part comprising the surface 17b on which the collected spacer 2 support, such as slide, during travel towards the spacer outlet 16. In some embodiments, the bottom wall part surface 17b may be a surface of a housing wall, such as an exterior housing wall or another housing/dispenser wall that is placed between (not illustrated) an exterior housing wall and the collection sheet 15.

In some embodiments of the present disclosure, the protruding member 75, such as a pin, has a width, such as a diameter PD, of less than 3 mm, such as less than 2 mm, such as less than 1 mm. The width PD may as illustrated extend in a direction away from the surface 15b of the collection sheet 15.

The inventors have provided tests using a pin having a diameter of between 0.5 mm and 0.9 mm, e.g. between 0.8-0.9 mm, and this provided a good result.

In one or more embodiments of the present disclosure, the protruding member 75, such as a pin, has a width, such as a diameter, of between 0.3 mm and 5 mm, such as between 0.5 mm and 2 mm, such as between 0.7 and 1.2 mm.

In some embodiments of the present disclosure, the protruding member 75 may be configured so as to engage with a spacer 2 at or in the collection hole 15a. An example hereof is illustrated schematically where a protruding member 75, in this case a pin, is seen in cross section in FIG. 24. Here a spacer 2 extends into the hole 15a, but does not support on the surface 17b with the major part of the contact surface 2a or 2b. instead it inclines out of the collection hole. The protruding member 75 may directly or indirectly engage the spacer 2 and/or a spacer (not illustrated in FIG. 24) in the storage 11 that directly or indirectly touches that spacer, and thereby provide spacer manipulation in order to induce the spacer 2 to support on a contact surface 2a, 2b inside the hole 15a, for example so that a contact surface 2a, 2b support on bottom wall part surface 17a.

Figure 24:
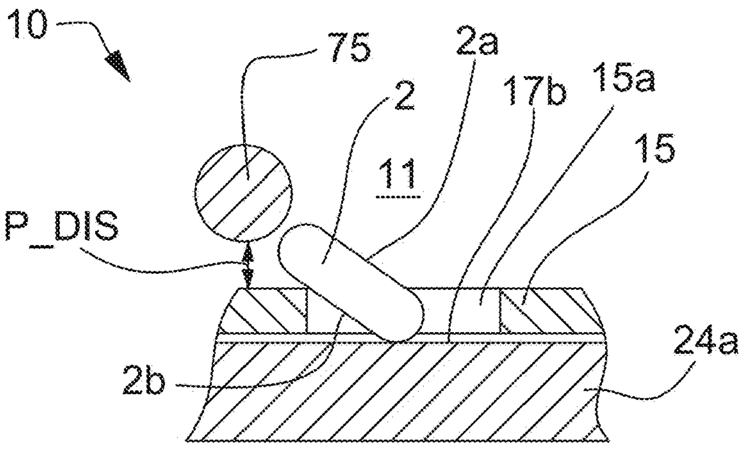
FIG. 24: illustrates an embodiment of the present disclosure where a protruding member is configured to engage with a spacer, according to embodiments of the present disclosure.

In FIG. 24, the protruding member 75 has a circular cross section. In other embodiments, the cross section of the protruding member 75 may be e.g. polygonal, such as triangular, rectangular, pentagonal, hexagonal or the like. The cross section of the protruding member 75 may either be substantially constant over the length of the protruding member or change over the length of the protruding member.

In some embodiments of the present disclosure, the protruding member 75 may be resilient so as to be displaceable by forces from one or more spacers acting on the spacer. The forces may originate from the relative displacement between housing 12 and collection sheet 15. This may e.g. help to reduce risk of spacer damage and/or help to provide improved rearranging of a spacer 2 in a collection hole 15a that is not arranged as desired therein. The resiliency may e.g. be obtained by arranging the protruding member to only be supported at one end, see e.g. FIG. 23. Additionally or Alternatively, the protruding member 75 may comprise a corrugated shape (not illustrated) to incorporate a spring feature in the protruding member 75. In still further embodiments, the protruding member 75, such as a pin, may be displaceable connected or fixated to one or more side walls 11a, 11 b of the storage. In some embodiments, this may be provided e.g. by the protruding member extending into the hole(s) and be displaceable, such as slidably, arranged therein. In some embodiments that may be the case in the embodiment of FIG. 24. Thereby one or more spacers in the storage 11 spacer may directly or indirectly deflect the protruding member. In other embodiments of FIG. 24, the protruding member may be firmly and non-displaceable attached to one or both side walls 11a, 11b.

The resiliency of the protruding member may e.g. be defined by the shape, size and/or material of the protruding member.

In other embodiments, the protruding member 75 may be stiff and substantially non-resilient to forces from spacers acting on the protruding member during normal dispenser use.

Figure 25:
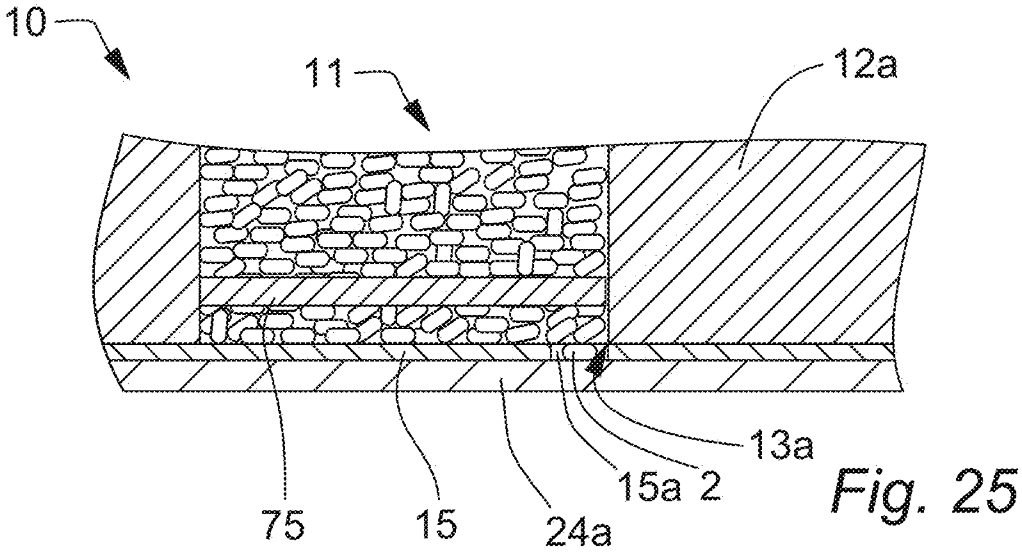
FIG. 25: illustrates an embodiment of the present disclosure where spacers support on a protruding member, according to embodiments of the present disclosure.

FIG. 25 illustrates schematically a cross section of a dispenser 10 according to embodiments of the present disclosure. Here, the protruding member 75 extends into the spacer storage 11 and as can be seen, some of the randomly orientated spacers 2 in the storage 11 supports on top of the protruding member 75 and the spacers in the storage surrounds partly or fully the protruding member. Hence, in some embodiments the protruding member 75 may take away or adjust a part of a weight load provided by the spacers in the storage 11 at the area of the collection hole when the collection hole 15 enter underneath the protruding member 75 opposite to the intermediate space 76 (See FIG. 23) when compared to other locations in the spacer storage compartment.

The protruding member may so to say extend in between the spacers in the spacer storage compartment as e.g. indicated in FIG. 25.

It is generally understood that the protruding member 75 in some embodiments may be fixed relative to the housing. In some embodiments, the protruding member 75 may be fixed to or integrated in the housing 12, such as to/in the upper part 12a of the housing.

In FIGS. 23a, 23 and 25, the protruding member comprises a pin that is fixated at/in the housing part 12a body. In this example by means of a bore or hole in the upper housing part 12$a$. The protruding member 75 may be of an electrically conducting material to provide galvanic connection to the housing and hence reduce the risk of static charge issues.

Figure 26:
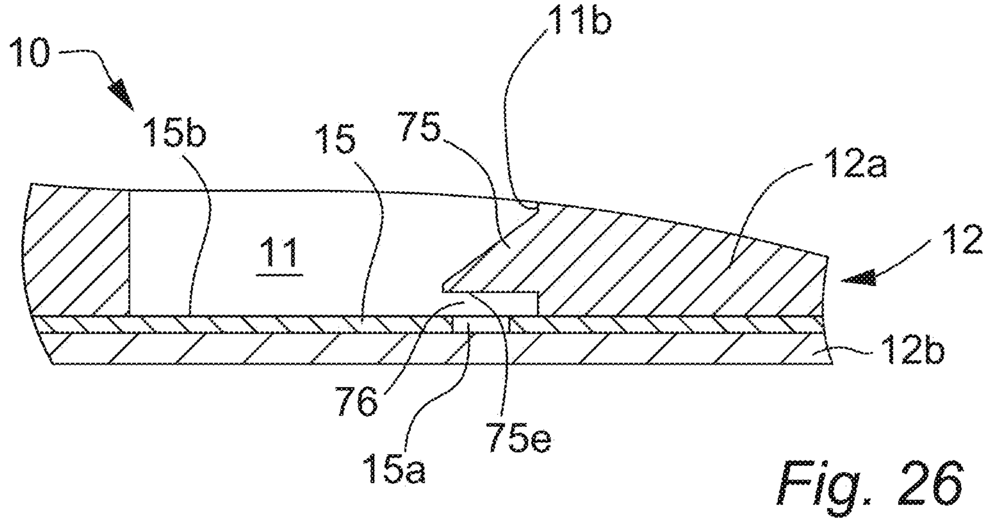
FIG. 26: illustrates an embodiment of the present disclosure where a protruding member is integrated in a housing, according to embodiments of the present disclosure.

FIG. 26 illustrates schematically a cross section of a dispenser 10 according to further embodiments of the present disclosure. Here the protruding member 75 is integrated in the housing 12, at the convex side wall 11$b$, e.g. to be unitary with the housing 12. This may e.g. be provided by milling, grinding, moulding or the like.

FIG. 26 moreover illustrates an embodiment where the protrusion 75 provides an overhang part that cover a at least partly or fully the collection hole 15$a$ during a part of the travel TPS of the collection hole through the spacer storage compartment 11. As can be seen, in some embodiments, the top of the protruding member 75 may be shaped to allow spacers 2 in the storage to slide off the top of the protruding member 75. In FIG. 26, the top of the protruding member inclines towards the collection sheet 15. In other embodiments, the top/and bottom) 75$e$ may be perpendicular to the wall and/or parallel to the collection sheet surface 15$b$.

FIGS. 27A-27E illustrates the spacer storage compartment 11 (seen from above) of a dispenser 10, where one or more protruding members 75 extend(s) into the spacer storage compartment 11, according to various embodiments of the present disclosure. The body of the dispenser (such as the body 12 as previously described) is omitted for simplicity.

Figure 27A:
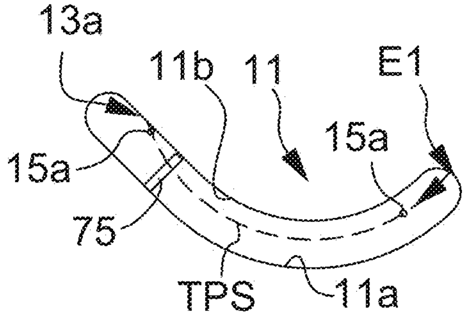
FIGS. 27A-27E: discloses different embodiments of a spacer storage compartment comprising one or more protruding members, according to various embodiments of the present disclosure.

In FIG. 27A, the protruding member 75 is arranged away from the entrance 13$a$ where the collection hole enters/moves into the guidance space. However, here, the protruding member is placed proximate the entrance 13$a$ when compared to the entrance area where the collection hole 15$a$ enters from the guidance space 13 to the compartment 11. In this case at the end E1 of the spacer storage compartment 11.

Figure 27B:
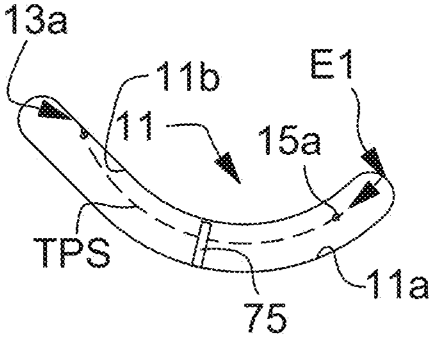

In FIG. 27B, the protruding member 75 is arranged away from the entrance 13$a$ where the collection hole moves into the guidance space. Here, the protruding member 75 is placed to cover a part of the traveling path TPS of the collection hole substantially midways between the entrance 13$a$ and the entrance area where the collection hole 15$a$ enters from the guidance space 13 to the compartment 11—in this case at the end E1 of the spacer storage compartment 11.

Figure 27C:
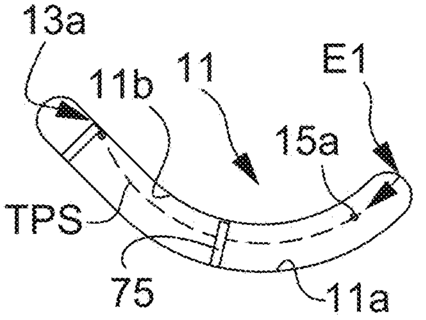

In FIG. 27C, the dispenser comprises a plurality of spaced apart protruding members 75. Two protruding members 75 are illustrated in FIG. 27C, but in other embodiments more than two, such as more than three, more than five or more than eight protruding members 75 may be provided in the spacer storage compartment. In FIG. 27C, a first protruding member 75 is arranged substantially opposite to the entrance 13$a$ where the collection hole enters the guidance space, and a further protruding member 75 is arranged "up stream" of the traveling path. In the example of FIG. 27C, the second/further protruding member is arranged substantially so as to cover a centre area of the traveling path with a substantially equal distance to the entrance where the collection hole 15$a$ enters the spacer storage 11 and the entrance 13$a$ where the collection hole (with a collected spacer) re-enters the guidance space 13. Naturally, another location for one or both protruding members 75 may be chosen in further embodiments of the present disclosure. The protruding members 75 may both, however, cover a part of the traveling path TPS with an intermediate space 76 as described previously arranged between the collection sheet 15 and the protruding member 75.

Figure 27D:
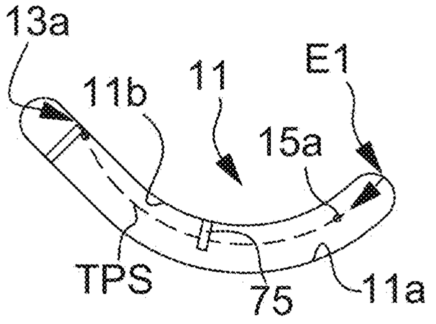

In FIG. 27D, the dispenser comprises a plurality of spaced apart protruding members 75 where the protruding members are of different types. For example, the protruding member arranged at the area of the entrance 13$a$ to the guidance space 13 may cover substantially the full width of the spacer storage whereas the other protruding member 75 is shorter and only extends partly into the spacer storage.

Figure 27E:
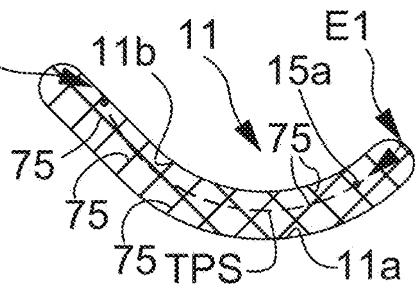

In FIG. 27E, the dispenser comprises a plurality of spaced apart protruding members 75 where the protruding members comprises and/or is provided by a grid of protruding members, such as a metal grid, comprising rods or pins extending in different direction in the spacer storage compartment 11 between walls 11$a$, 11$b$. E2, E1. The structure of the grid hence provides protruding members 75.

In some embodiments of the present disclosure (not illustrated), the dispenser 10 may comprise a plurality of protruding members 75 extending into the spacer storage 11 at different heights above the collection sheet.

In some embodiments of the present disclosure (not illustrated), the dispenser 10 may comprise a plurality of protruding members 75 of different resilience, different thickness and/or different length.

In some embodiments of the present disclosure, one or more of:

cross sectional shape of the protruding member 75,
cross sectional size of the protruding member 75,
length of the protruding member 75 and/or
distance P_DIS between the protruding member and the sheet 15 may vary between different protruding members 75 in the storage 11.

It is generally understood that in embodiments of the present disclosure, one or more of one or more protruding members may comprise or consist of a peg.

Figure 28:
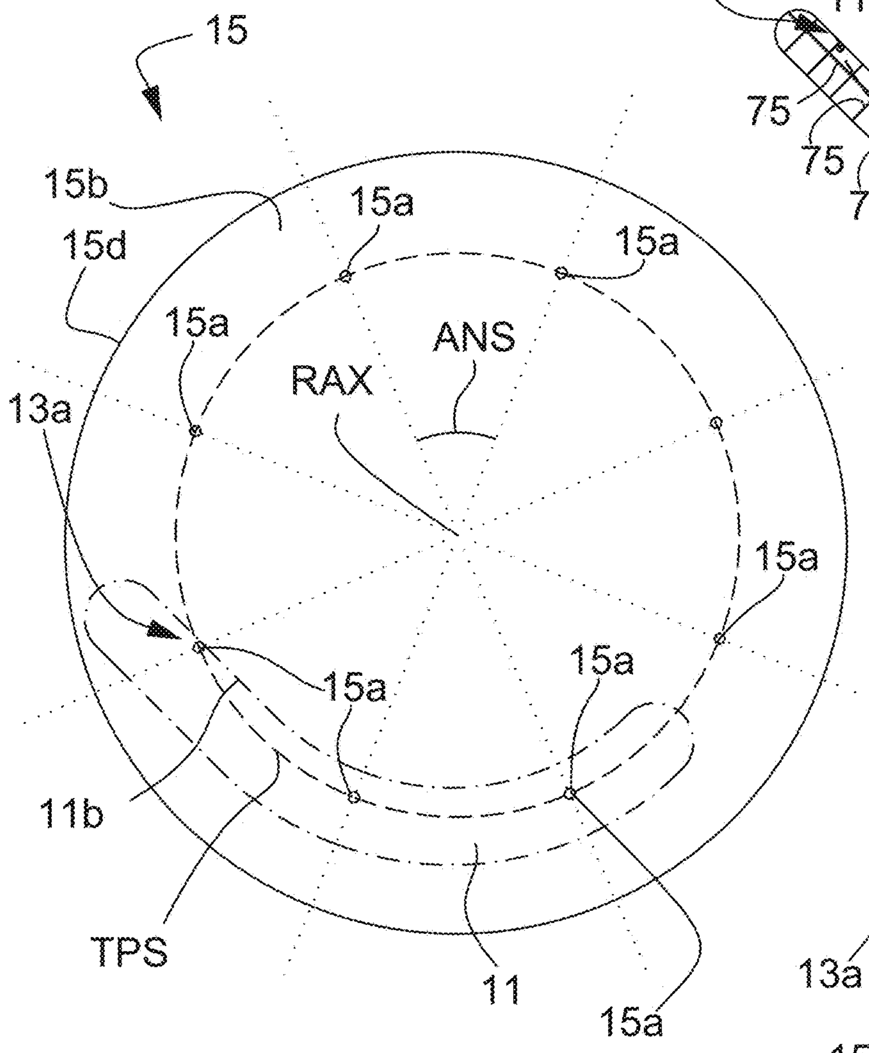
FIG. 28: illustrates a collection sheet comprising a plurality of collection holes, according to embodiments of the present disclosure.

FIG. 28 illustrates a collection sheet 15 comprising a plurality of collection holes 15$a$. Here, the collection sheet comprises eight holes, but fewer or more may also be provided in further embodiments. In some embodiments, as e.g. illustrated, a plurality of collection holes 15$a$ may be present in the spacer storage compartment to collect a spacer. In the embodiment of FIG. 28, three holes 15$a$ are present in the storage 11. The remaining holes 15$a$ will be covered by the upper housing part 12$a$. In FIG. 28, the dispenser housing is not illustrated for improved understanding. However the outer boundary of the spacer storage 11 is illustrated by dash/dotted lines. This lies within the outer boundary 15$d$ of the collection sheet 15.

The collection sheet 15 may in some embodiments of the present disclosure comprise between one and thirty collection holes 15$a$, such as between one and fifteen collection holes, such as between two and twelve collection holes (not illustrated).

The collection holes are evenly distributed with the same radial distance to the rotation axis RAX. The number of collection holes and the angular spacing ANS between adjacent collection holes may be configured so that the distance (along the traveling path TPS) between adjacent collection holes is smaller than the length of the traveling path TPS in the compartment 11.

Figure 28A:
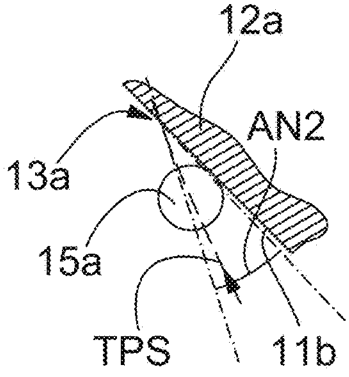
FIG. 28A: illustrate an angle at an entrance, according to embodiments of the present disclosure.

FIG. 28A illustrates an embodiment of the present disclosure wherein the collection hole 15$a$ enters into the guidance space at the entrance 13$a$. Here, the wall surface 11$b$ underneath which the collection hole 15$a$ enters 13$a$ into the guidance space may extend with an angle AN2 different from 90 degrees. IN some embodiments, the angle may be less than 90 degrees, e.g. less than 45 degrees or less than 25 degrees relative to the traveling path TPS. This angle AN2 is in FIG. 28A defined between tangents (dash-dotted lines)

to the surface 11*b* and the traveling path TPS respectively. This may e.g. be provided as illustrated in FIG. 22 (and also indicated in FIG. 28) by providing that the entrance position 13*a* is located between ends E1, E2 of the elongated spacer storage compartment 11, underneath the compartment side wall 11*b*.

Figure 29A:
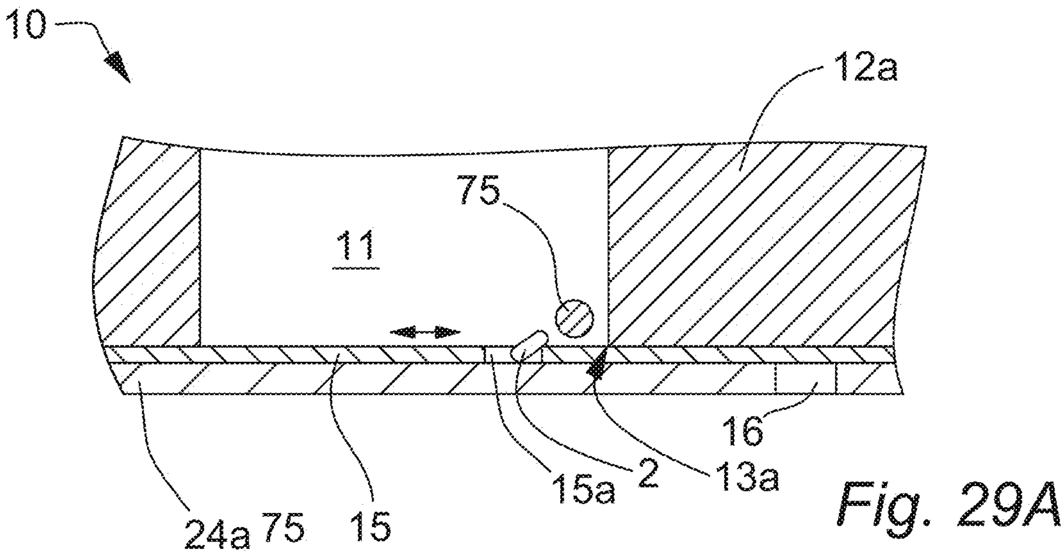
FIGS. 29A-29B: illustrates a dispenser of a reciprocating type, according to embodiments of the present disclosure.
Figure 29B:
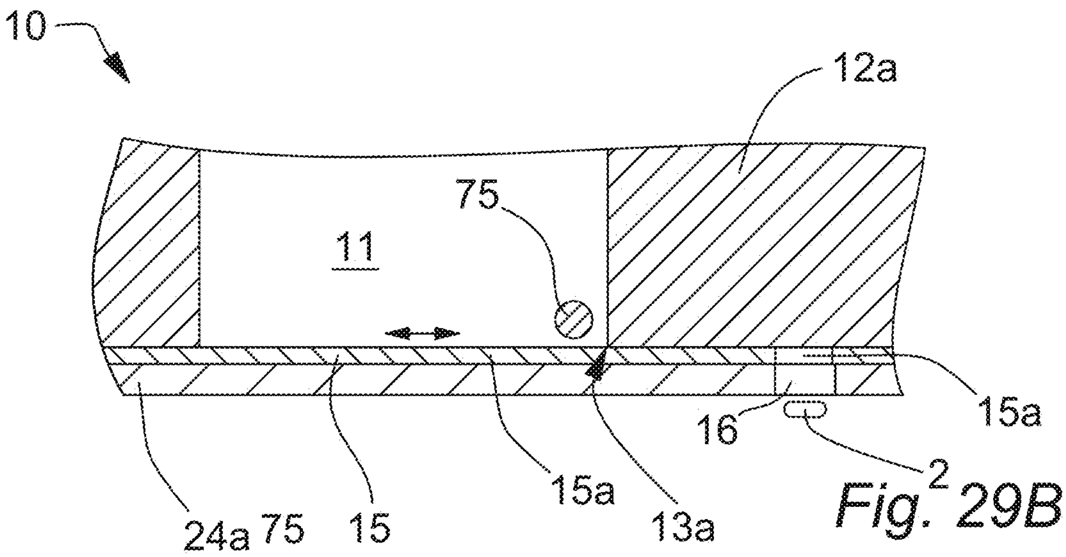

FIGS. 29A and 29B illustrates schematically and in cross section a reciprocating type dispenser 10 according to embodiments of the present disclosure. Here, the collection sheet 15 moves into the compartment 11 in a first linear, substantially non-rotating movement in order to collect a spacer 2 from the storage 11. Thereafter, the driving direction is reversed so that the collection hole 15*a* with a collected spacer 2 is moved (again in a linear motion) into the guidance space and delivers the collected spacer 2 through the dispenser outlet 16. The collection sheet may be displaced by means of an electric motor, a linear actuator or the like. The plurality of spacers in the storage 11 are not illustrated in FIGS. 29*a*-29*b* for simplicity. The dispenser type in FIGS. 29A-29B is hence of another type than the rotating type dispenser as e.g. described according to various embodiments above, where a relative rotational movement between the dispenser housing 12 and the collection sheet 15 is provided around a rotation axis. Both dispenser types are however of the collection sheet 15 type where a relative movement between collection sheet 15 and housing 12 is provided in order to collect and dispense a spacer 2, respectively.

Figure 30:
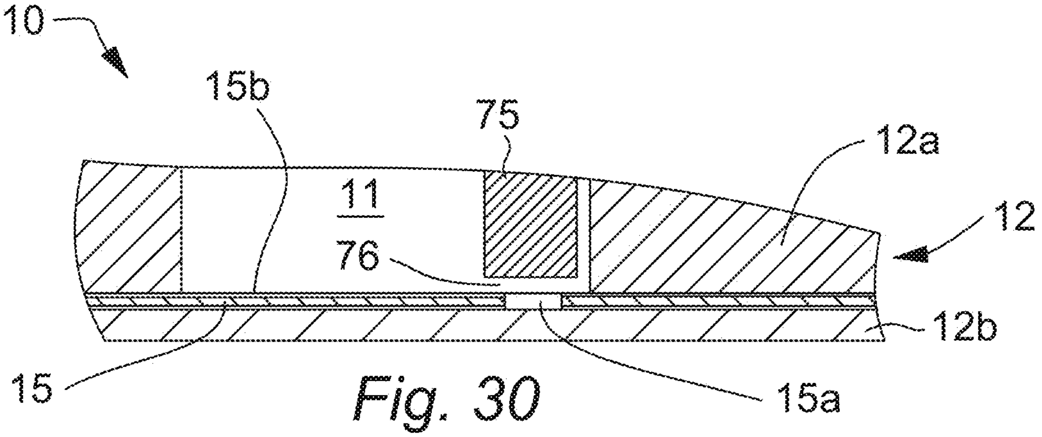
FIG. 30: illustrates a dispenser comprising a protruding member according to further embodiments of the present disclosure.

FIG. 30 illustrates an embodiment of the present disclosure where the protruding member 75 extends into the spacer storage compartment 11 from the top of the dispenser 10 instead of extending from the side surface of the upper housing part 12*a*.

Figure 31:
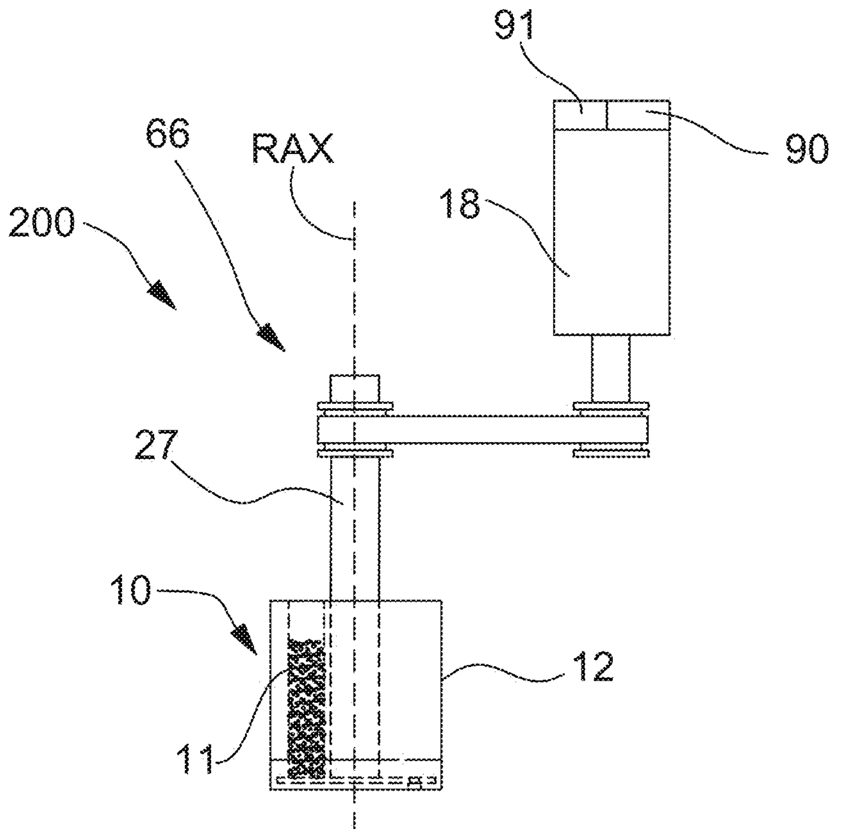
FIGS. 31-32: illustrates a dispenser system for detecting jamming situations, according to embodiments of the present disclosure.
Figure 32:
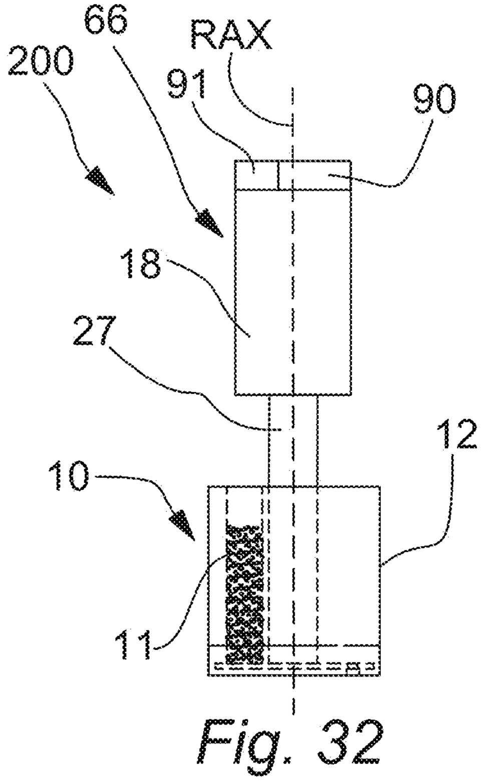

FIGS. 31 and 32 discloses schematically different embodiments of the present disclosure, for solving or reducing jamming issues. In the FIGS. 31 and 32, the driver 18 for driving the collection sheet is a motor, such as an electric motor, for example a servo motor. A jamming sensor 90 may be provided. In other or additional embodiments a jamming timer may be provided.

The jamming sensor 90 in FIG. 31 may comprise a torque sensor. The driver 18 may comprise an integrated or external torque sensor 90. Some servo motors may comprise control circuitry and software supplied from the manufacturer where torque control may be enabled. Hence, the one or more sensors 90 such as a torque sensor, may be configured to provide input based on one or more of power consumption, voltage and/or consumed electric current of the electric motor.

When a jamming situation occur, this may be caused by a spacer being stuck in the dispenser. A stuck spacer 2 may result in an increase in power/current consumption by the driver 18. This may e.g. be caused by increased loads, such as torsion forces, in a driving part 66, 27 connected directly or indirectly to the driven part such as the collection sheet 15 of the dispenser. This may be registered in an advantageous way by means of a sensor arrangement, such as a torque sensor arrangement, of the driver.

In FIG. 32, the driver 18 drives the collection sheet 15 directly by means of an interconnecting shaft 27 that is configured to drive the collection sheet relative to the dispenser housing 12 (collection sheet is not illustrated in FIGS. 31 and 32). In FIG. 31, the driver drives the collection sheet 15 through an interconnecting drive arrangement 66 comprising the shaft 27, driven wheels and/or one or more belts or chains. The embodiment in FIG. 31 may e.g. be provided in order to optimize space, See e.g. also FIG. 17.

In both embodiments illustrated in FIGS. 31 and 32, the jamming sensor 90 may be arranged external to the dispenser 10, e.g. together with or integrated in the driver 18. In some embodiments, the jamming sensor 90 may be arranged external to the driver 18 and e.g. be configured to directly or indirectly measure power and/or current consumption at a power supply circuitry for powering the driver 18.

In additional or other embodiments of the present disclosure, the one or more jamming sensors 90 may comprise one or more of a strain gauge circuitry, such as a Wheatstone bridge circuit, a proximity sensor, an optical sensor, a speed sensor, and/or a magnetic sensor.

In still further embodiments, the jamming detection may be provided by means of a sensor-less solution by means of a timer, or a combination of a timer and one or more sensors 90, 22, 23. For example, if a spacer is not dispensed within a predetermined time interval, or if a portion of a movable part has not reached a certain location within a predetermined interval, This may indicate a jamming situation.

Figure 33:
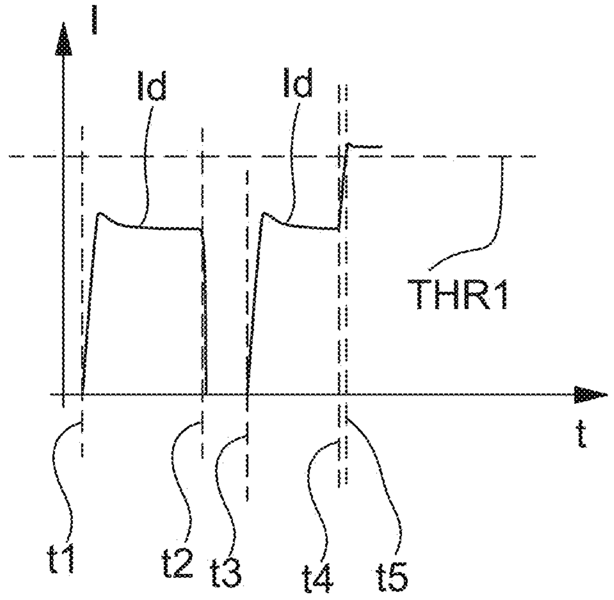
FIG. 33: illustrates detection of a jamming situation, according to embodiments of the present disclosure.

FIG. 33 illustrates schematically the operation of two dispensing situations by means of a dispenser 10 where power consumption of the driver 18 is monitored by monitoring the consumed current Id (see vertical axis) over time.

At time t1 (horizontal axis) the driver 18 is started in order to dispense a spacer 2. At time t2, the spacer has been dispensed (e.g. detected by means of a sensor 23 as e.g. previously described), and the driver is hence stopped. The current consumption between t1 and t2 may be considered a normal current/power consumption. During the time t1 and t2, another spacer may be collected from the spacer storage 11 by means of another collection hole and/or another routine (not illustrated) may be provided between t2 and t3 in order to collect a spacer.

At time t3, the driver 18 is started again to dispense a further spacer. However, at time t4, a sudden increase in power/current consumption Id is detected by the jamming sensor 90, and at time t5, the consumed current exceeds a threshold THR1. This may reflect that a jamming situation has occurred, and the driver/motor 18 may be stopped and/or one or more anti-jamming operations may automatically be initiated by a hardware controller in order to resolve the jamming situation.

The threshold THR1 may be or comprise a predetermined threshold such as a fixed threshold. The threshold THR may be determined based on experiential data and/or may be adapted dynamically over time.

It is understood that conversion circuitry may be configured to transform the consumed current into a torque value.

In some embodiments of the present disclosure, the threshold value THR1 may be below 10 Nm, such as below 3 Nm, for example below 1.5 Nm such as below 1 Nm.

In some embodiments of the present disclosure, the threshold value THR1 may be above 0.01 Nm, such as above 0.03 Nm, for example above 0.05 Nm.

In some embodiments of the present disclosure, the threshold value THR1 may be between 0.01 Nm and 10 Nm, such as between 0.03 Nm and 3 Nm, for example between 0.05 Nm and 1 Nm.

In some embodiments of the present disclosure, the threshold value THR1 may be set to e.g. 0.07, 0.08 or 0.09 Nm.

The above threshold value example may e.g. be relevant for a solution where a servo motor comprises torque sensor circuitry. It is however naturally understood that the threshold THR1 may be adapted based on e.g. sensor 90 type and/or point of measurement.

It is generally understood that the detection of the jamming situation may comprise monitoring one or more parameters (in FIG. 33 it is consumed current or a torque value derived therefrom) that is/are based on the input from the one or more sensors.

In embodiments of the present disclosure, a jamming controller 91 may provide one or more anti-jamming operations AJO when predetermined criteria is complied with. Such as criteria may e.g. comprise that the consumed power, current and/or a torque value exceeds a threshold THR1

These predetermined criteria may be based on the one or more monitored parameters Id. For example, when the monitored consumed current Id exceeds the threshold THR1, the predetermined criteria may be complied with. The predetermined criteria may comprise just one criteria or a plurality of predetermined criteria that needs to be complied with before it is determined that a jamming situation may have been detected.

Hence, the detection of a jamming situation may comprises monitoring one or more parameters Id that is/are based on the input from one or more sensors 90.

The predetermined criteria THR1 may be based on the one or more monitored parameters such as e.g. comprising:

one or more of power consumption and/or current consumption parameters, one or more measured and/or calculated torque value parameters, position sensor information, one or more predefined time intervals (by means of a timer)

one or more counters one or more speed sensors

In embodiments of the present disclosure, if a jamming situation is detected (e.g. as described above in relation to FIG. 33), a jamming controller 91 may provide/initiate one or more anti jamming operations.

For example, in some embodiments, the one or more anti-jamming operations may comprise operating the driver 18 according to a control scheme, such as a predefined control scheme. An embodiment of a control scheme is described in more details in FIG. 34.

Figure 34:
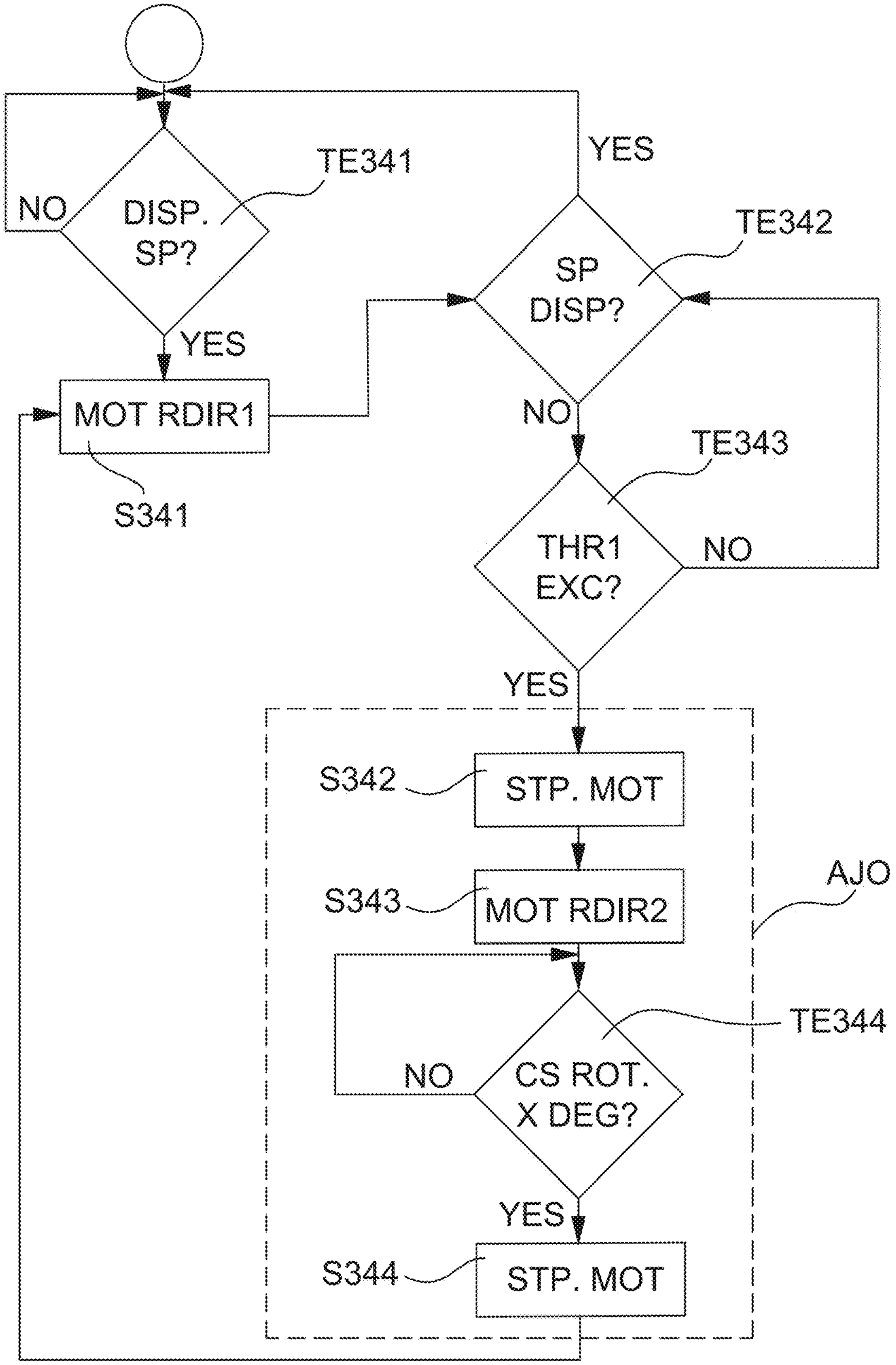
FIG. 34: illustrates providing an anti-jamming operation according to embodiments of the present disclosure.

FIG. 34 illustrates in a schematic flowchart an anti-jamming operation according to embodiments of the present disclosure. In test TE341, it is determined whether a spacer should be dispensed. If a spacer is to be dispensed, the driver 18 is started in step S341, and the collections sheet may hence be displaced in a first direction, such as linearly displaced or rotated or in a first rotation direction. This may correspond to time t1 or t3 in FIG. 33. A controller then monitors (Test TE342) if a dispenser has been dispensed as intended. This monitoring may e.g. be provided by means of a sensor 23 as e.g. previously described.

If no spacer has yet been dispensed, the jamming controller 91 monitors, in test (TE343) the one or more parameters to see if the predetermined criteria is complied with. For example by monitoring power consumption/current consumption of the driver 18 to monitor if the threshold THR1 is exceeded. As long as the criteria is/are not complied with, the dispenser is operated 10 in order to dispense a spacer.

If the criteria is/are complied with (see e.g. t5 of FIG. 33), one or more anti-jamming operations AJO are initiated.

In FIG. 34, the anti-jamming operation comprises that the driver 18 is stopped (Step S342-STP. MOT)). Then a relative movement between the collection sheet 15 and the housing 12 is provided in a direction opposite to the first driving direction (provided/initiated at step S343 MOT RDIR2) by means of the driver 18. This may comprise that the movement direction, such as rotation direction, of the collection sheet is reversed.

The jamming controller then tests (Test T344) if predetermined criteria are complied with. This may e.g. comprise that the collection sheet is driven a predetermined amount in said opposite direction initiated at step S343. This may e.g. be determined based on sensor input such as distance sensor input, angular sensor input, a timer and/or the like.

In FIG. 34, the test TE344 comprises monitoring directly or indirectly when the collection sheet has been rotated a predefined angular value in the said opposite direction. This may e.g. be obtained by means of control software already implemented in a controller of the driver, by means of one or more sensors monitoring the angular position of the collection sheet 15, by means of a timer and/or the like.

In some embodiments of the present disclosure, the relative movement (S343) between the collection sheet 15 and the housing 12 provided in the direction opposite to the first driving direction may provide that the collection hole 15*a* is moved at least 1 mm, such as at least 3 mm, for example at least 10 mm in the direction opposite to the first driving direction.

In some embodiments of the present disclosure, the collection hole 15*a* may be rotated (S343) at least 1°, such as at least 10° or at least 14° in the opposite direction around a rotation axis in the direction opposite to the first driving direction.

When the test TE344 is complied with, the driver 18 is stopped again (Step S344-STP. MOT), and a new try is initiated in order to try to dispense a spacer. In FIG. 34, this is provided by initiating step S341-MOT RDIR1 again. Thereby, the relative movement between the collection sheet 15 and the housing 12 by means of a driver 18 in the first driving direction is resumed in order to dispense a spacer.

The jamming controller 91 may be configured to provide the anti-jamming control illustrated in FIG. 34. The jamming controller 91 may comprise a hardware controller that is separate to a driver controller of the driver.

In some embodiments, the jamming controller 91 may be integrated in or be part of a hardware controller that may also provide distance control and/or other control of the dispenser. This controller may be integrated in the driver 18 or may be separate to the driver 18.

It is generally understood that the anti-jamming operation AJO may comprise one or more anti-jamming operations such as one or more of:

Operating the driver to reverse the collection sheet one or more times (see e.g. FIG. 34), Operating one or more vibrators to vibrate the dispenser housing 12 and/or the collection sheet (see e.g. FIG. 12 and description thereto), Stirring in the dispensers of the dispenser storage compartment 11, e.g. by means of a magnet such as an electro magnet and/or by means of a mechanical stirring, Vibrating and/or in other ways moving one or more protrusions 75 in the housing, Providing a fluid flow, such as suction and/or blow of air, in a vacuum path of the dispenser (see e.g. FIG. 4*a*-4*b*).

It is understood that in some embodiments, the anti-jamming operation may comprise just one of the examples mentioned above. In other embodiments, the anti-jamming operation may comprise a plurality of the examples mentioned above. In still further embodiments, the number and/or type of provided anti-jamming operations may be varied, such as increased. This may e.g. be the case if it is detected by the sensor 90 that a jamming situation has not been resolved despite providing a first anti-jamming operation. For example, the anti-jamming operation AJO of FIG. 34 may first be tried. If that does not work, it may be tried again in combination with e.g. using a vibrator and/or a fluid flow. This may e.g. be controlled in accordance with a predefine control scheme implemented by means of software code stored in a hardware data storage.

It is generally understood that one or more controllers for controlling dispensing of the spacers 2 during VIG unit manufacturing (see e.g. controllers as described above such as e.g. 22*c*, 31, 91 and/or a driver 18 controller) in relation to various embodiments of the present disclosure may comprise one or more microprocessors which execute appropriate software. For example, a processor system, such as processor subsystem, may be embodied by a single Central Processing Unit (CPU) or a combination or system of such CPUs and/or other types of processing units. The software for controlling e.g. the dispensing of spacers may have been downloaded and/or stored in a corresponding memory, e.g., a volatile memory such as RAM or a non-volatile memory such as Flash. Additionally or alternatively, the control of the dispensing of spacers may be implemented in the form of programmable logic, e.g., as a Field Programmable Gate Array (FPGA) or a Programmable Logic Controller (PLC). The control of the dispensing of spacers may be provided/executed by means of different, distributed hardware controllers and/or by means of a single hardware controller.

In embodiments of the present disclosure, the manufactured VIG unit may be for use in a building window. In some embodiments, the building window may be a roof window. In other embodiments, the building window may be a vertical window such as a façade window. In some embodiments, the VIG unit when used in a building window may be laminated at one or both sides of the VIG unit by means of an interlayer and a further glass sheet. In other embodiments of the present disclosure, the VIG unit may be used for e.g. cooling furniture such as in a door of a refrigerator or freezer and/or for heating furniture such as in a door of an oven. The VIG unit to enable a view through the VIG unit towards the goods stored in the interior of the cooling or heating furniture.

The invention claimed is:

1. A method of manufacturing a vacuum insulating glass unit, the method comprising:

providing a first glass sheet, dispensing a plurality of spacers comprising predefined, pre-shaped contact surfaces (2*a*, 2*b*) on a major surface of the provided glass sheet by means of at least one dispenser of a spacer dispensing system, wherein the dispenser comprises:

a housing comprising a guidance space placed between a first housing surface of an upper part of the housing and a second housing surface of a bottom part of the housing, wherein the upper part of the housing comprises a spacer storage compartment comprising a plurality of said spacers which are randomly orientated in the spacer storage compartment, a spacer outlet arranged at the bottom part of the housing, a collection sheet providing a bottom part of the spacer storage compartment, wherein the collection sheet comprises at least one collection hole extending between opposing major surfaces of the collection sheet, wherein the collection sheet is arranged in the guidance space, at least one protruding member extending into the spacer storage compartment with a distance (P_DIS) to the collection sheet so that an intermediate space is provided between the collection sheet and the protruding member, wherein the dispensing of spacers comprises:

providing a first relative movement between the collection sheet and the housing by means of a drive motor so that the collection hole is arranged at the bottom of the spacer storage compartment and collects a spacer from the spacer storage compartment prior to entering the guidance space, and providing a further, relative movement between the collection sheet and the housing so that the collection hole with the collected spacer enters the guidance space and is aligned opposite the spacer outlet so as to deliver the collected spacer to the spacer outlet and towards the major surface of the glass sheet, wherein the collection hole passes at least a part of the intermediate space during the first relative movement before entering the guidance space, the method further comprising providing a second glass sheet, sealing together the first glass sheet and the provided second glass sheet at the periphery of the glass sheets with the plurality of dispensed spacers arranged between major surfaces (3*a*, 4*a*) of the glass sheets so that a gap is provided between the first and second glass sheets, and evacuating the gap.

2. The method according to claim 1, wherein the protruding member comprises a pin.

3. The method according to claim 1, wherein the collection hole follows a predefined traveling path in the spacer storage compartment, and wherein the protruding member extends in a direction transverse to the traveling path, wherein the protruding member overlaps the traveling path.

4. The method according to claim 1, wherein the protruding member has a width of less than 3 mm.

5. The method according to claim 1, wherein the protruding member extends from a side wall of the housing, wherein the side wall comprises a surface facing the spacer storage compartment.

6. The method according to claim 1, wherein the protruding member is suspended as a cantilever beam, and/or wherein the collection hole passes below a part of the half part or the quarter part of the protruding member that is proximate a free end of the protruding member.

7. The method according to claim 1, wherein the distance between the protruding member and the collection sheet is less than 3 mm.

8. The method according to claim 1, wherein the distance between the protruding member and the collection sheet is smaller than the width of the spacer.

9. The method according to claim 1, wherein a distance (P_DIS1) between the protruding member and a surface of the bottom part of the housing is smaller than the width of the spacers, wherein said surface of the bottom part of the housing is a surface on which a collected spacer is configured to support during travel towards the spacer outlet.

10. The method according to claim 1, wherein the spacers in the spacer storage have a spacer width that is larger than the spacer height, wherein the spacer height is defined between oppositely directed predefined contact surfaces (2*a*, 2*b*) and wherein a side surface of the spacer extends between the predefined contact surfaces (2*a*, 2*b*).

11. The method according to claim 1, wherein the protruding member is arranged with a distance (P_DIS) to the collection sheet so as to intersect with a spacer that extend into the collection hole.

12. The method according to claim 1, wherein the protruding member is resilient so as to be displaceable by forces from a spacer acting on the protruding member.

13. The method according to claim 1, wherein the protruding member has a length of at least 0.5 mm.

14. The method according to claim 1, wherein said first and further relative movement between the collection sheet and the housing is a rotational movement around a rotation axis, wherein the collection sheet is rotated relative to the housing by means of the drive motor.

15. The method according to claim 1, wherein detection of a jamming situation is provided during said first and/or further relative movement, based on sensor input, and wherein a jamming controller provides one or more anti-jamming operations when predetermined criteria is complied with.

16. A dispenser for dispensing spacers on a major surface of a glass sheet during manufacturing of a vacuum insulating glass unit, wherein the dispenser comprises:

a spacer storage compartment for containing a plurality of randomly orientated spacers to be dispensed, a housing comprising a guidance space placed between a first housing surface of an upper part of the housing and a second housing surface of a bottom part of the housing, a spacer outlet, a collection sheet providing a bottom part of the spacer storage compartment, wherein the collection sheet comprises at least one collection hole extending between opposing major surfaces of the collection sheet, wherein the collection hole is a through hole and wherein the collection sheet is arranged in the guidance space, wherein a relative rotational movement between the collection sheet and the housing is configured to be provided around a rotation axis so that the collection hole is arranged at the bottom of the spacer storage compartment, and so that a further relative rotational movement between the collection sheet and the housing around the rotation axis provides that the collection hole enters the guidance space and is arranged opposite to the spacer outlet, wherein the upper part of the housing comprises said spacer storage compartment, and wherein the dispenser comprises at least one protruding member extending into the spacer storage compartment with a distance (P_DIS) to the collection sheet so that an intermediate space is provided between the collection sheet and the protruding member, wherein the collection hole is configured to pass at least a part of the intermediate space, wherein the dispenser is configured to dispense spacers according to the method of any of claims 1-15.

* * * * *